(12) United States Patent
Ko et al.

(10) Patent No.: US 9,635,684 B2
(45) Date of Patent: Apr. 25, 2017

(54) DEVICE TO DEVICE COMMUNICATION METHOD USING PARTIAL DEVICE CONTROL

(71) Applicant: Electronics and Telecommunications Research Institute, Daejeon (KR)

(72) Inventors: Young Jo Ko, Daejeon (KR); Jae Young Ahn, Daejeon (KR); Bang Won Seo, Daejeon (KR); Tae Gyun Noh, Daejeon (KR)

(73) Assignee: Electronics and Telecommunications Research Insitute, Daejeon (KR)

( * ) Notice: Subject to any disclaimer, the term of this patent is extended or adjusted under 35 U.S.C. 154(b) by 58 days.

(21) Appl. No.: 14/387,998

(22) PCT Filed: Apr. 26, 2013

(86) PCT No.: PCT/KR2013/003649
§ 371 (c)(1),
(2) Date: Sep. 25, 2014

(87) PCT Pub. No.: WO2013/162333
PCT Pub. Date: Oct. 31, 2013

(65) Prior Publication Data
US 2015/0078279 A1    Mar. 19, 2015

(30) Foreign Application Priority Data

Apr. 26, 2012 (KR) .................. 10-2012-0044122
Apr. 30, 2012 (KR) .................. 10-2012-0045827
(Continued)

(51) Int. Cl.
*H04W 72/14* (2009.01)
*H04L 1/24* (2006.01)
(Continued)

(52) U.S. Cl.
CPC ......... *H04W 72/14* (2013.01); *H04L 1/1861* (2013.01); *H04L 1/1864* (2013.01); *H04L 1/24* (2013.01);
(Continued)

(58) Field of Classification Search
None
See application file for complete search history.

(56) References Cited

U.S. PATENT DOCUMENTS 8,531,962 B2 * 9/2013 Chen ............... H04L 1/1854
370/236
8,687,479 B2 4/2014 Li et al.
(Continued)

FOREIGN PATENT DOCUMENTS

KR    1020100040920 A    4/2010

*Primary Examiner* — Eunsook Choi
(74) *Attorney, Agent, or Firm* — William Park and Associates LTD

(57) ABSTRACT

A device to device (D2D) communication method based on a partial device control is disclosed. According to the present invention, the D2D communication method and, particularly, to a partial device control method for D2D communication a relates to, and provides a D2D resource allocation and release method, a D2D HARQ process operating method, a link adaptation method comprising D2D link power control and adaptive modulation and coding (AMC), a D2D control information signaling method, a CSI reporting method for D2D communication, and contents of a CSI report. The present invention can enhance the advantages of and compensate for the disadvantages of both methods through the combination of a base station control a base station control type D2D communication method and a device control type D2D communication method.

9 Claims, 37 Drawing Sheets

(30) Foreign Application Priority Data

May 7, 2012 (KR) ........................ 10-2012-0048134
May 14, 2012 (KR) ........................ 10-2012-0050798

(51) Int. Cl.
  *H04L 1/18* (2006.01)
  *H04L 5/00* (2006.01)
  *H04W 76/02* (2009.01)

(52) U.S. Cl.
  CPC ......... *H04L 5/0055* (2013.01); *H04W 76/023* (2013.01)

(56) References Cited

U.S. PATENT DOCUMENTS

| | | | |
|---|---|---|---|
| 8,842,611 B2* | 9/2014 | Du | H04L 1/1887 370/328 |
| 8,934,393 B2* | 1/2015 | Hakola | H04L 1/1867 370/310 |
| 9,281,922 B2* | 3/2016 | Malkamaki | H04L 1/1812 |
| 2001/0011023 A1* | 8/2001 | Nishioka | H04W 52/50 455/522 |
| 2006/0168343 A1 | 7/2006 | Ma et al. | |
| 2007/0277082 A1* | 11/2007 | Matsumoto | H03M 13/1148 714/801 |
| 2010/0261469 A1 | 10/2010 | Ribeiro et al. | |
| 2011/0305179 A1 | 12/2011 | Wang et al. | |
| 2011/0317569 A1 | 12/2011 | Kneckt et al. | |
| 2012/0028672 A1 | 2/2012 | Chen et al. | |
| 2012/0093098 A1 | 4/2012 | Charbit et al. | |
| 2012/0163235 A1 | 6/2012 | Ho et al. | |
| 2012/0243431 A1 | 9/2012 | Chen et al. | |
| 2013/0010587 A1* | 1/2013 | Abrahamsson | H04L 1/1864 370/216 |
| 2014/0153390 A1* | 6/2014 | Ishii | H04W 76/023 370/230 |
| 2015/0078270 A1* | 3/2015 | Seo | H04W 52/46 370/329 |

* cited by examiner

FIG. 2
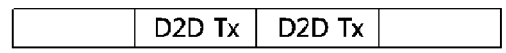
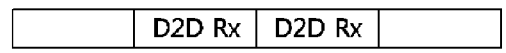
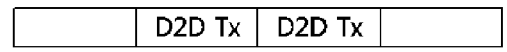
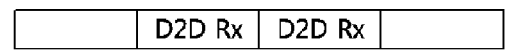
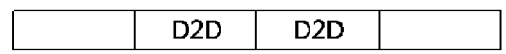
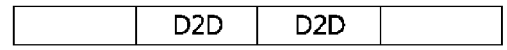
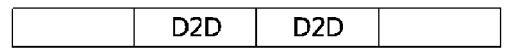
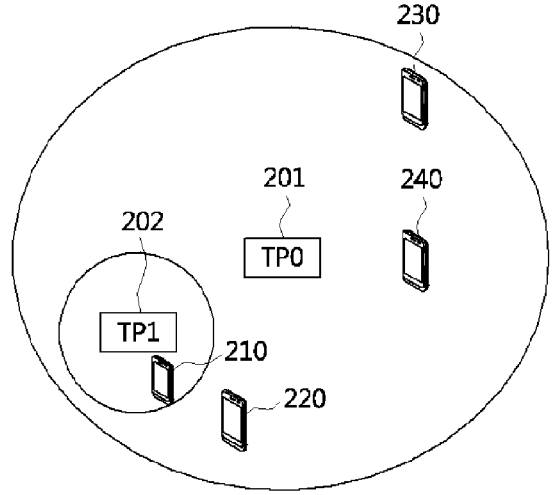

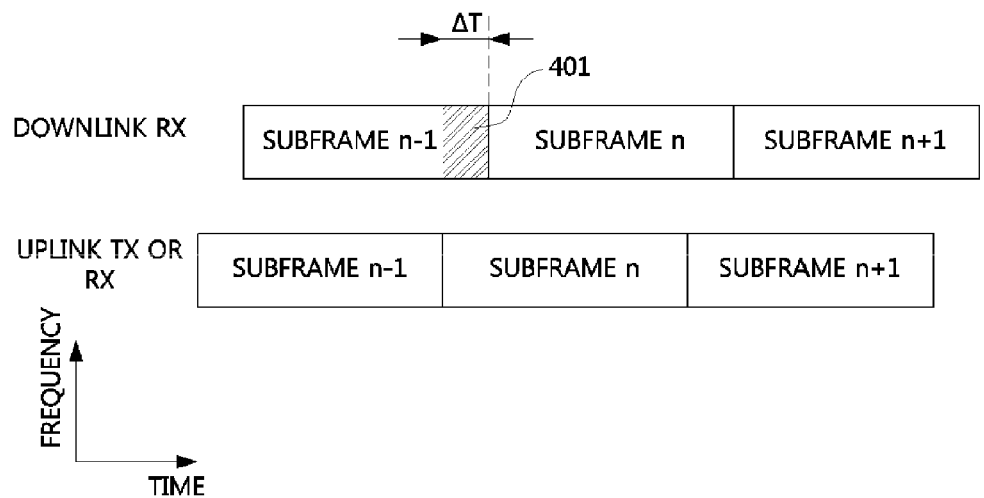

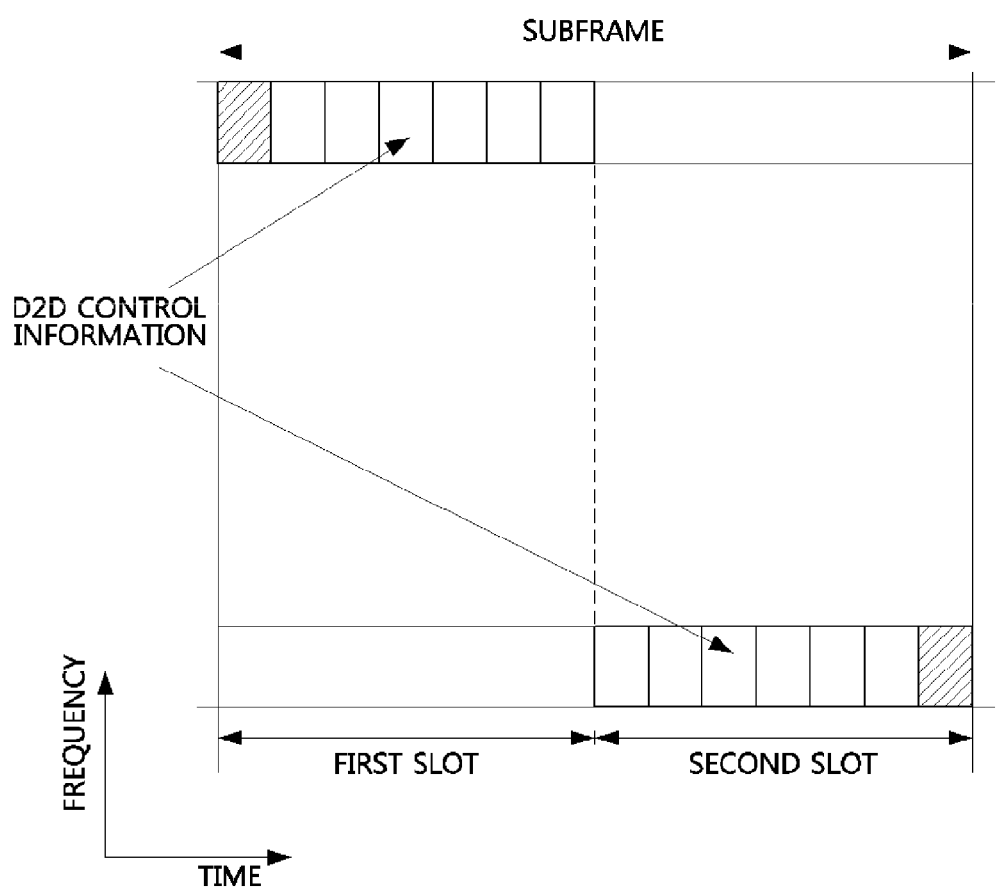

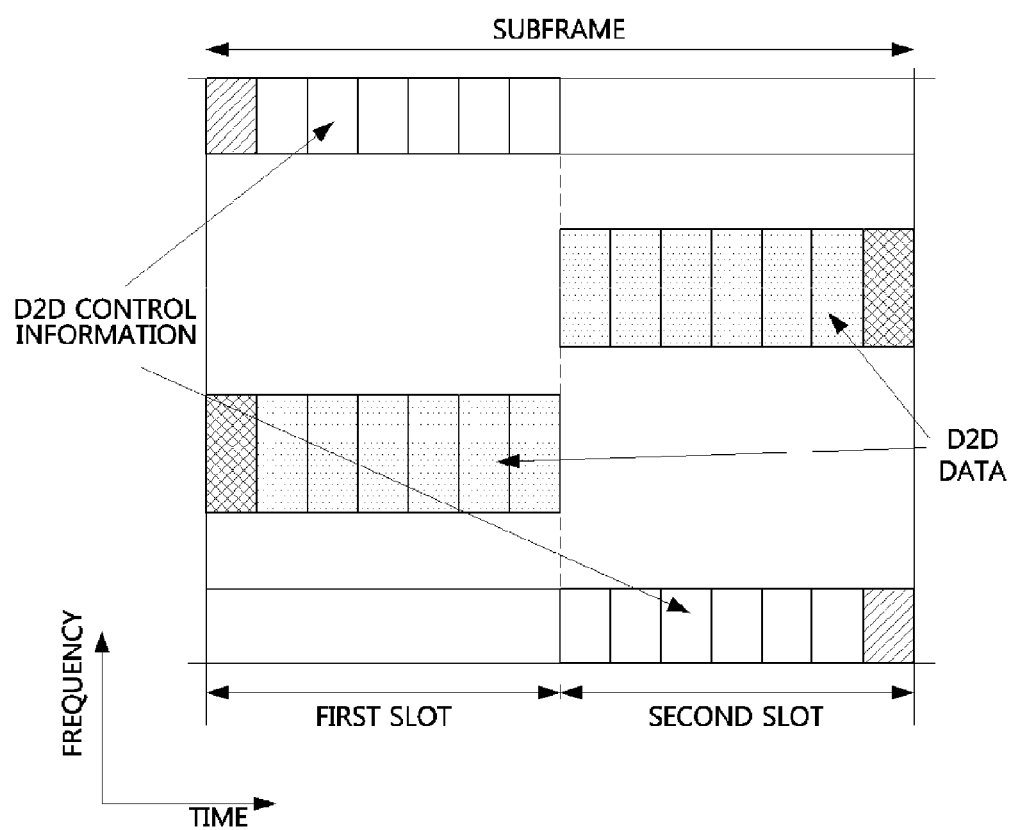

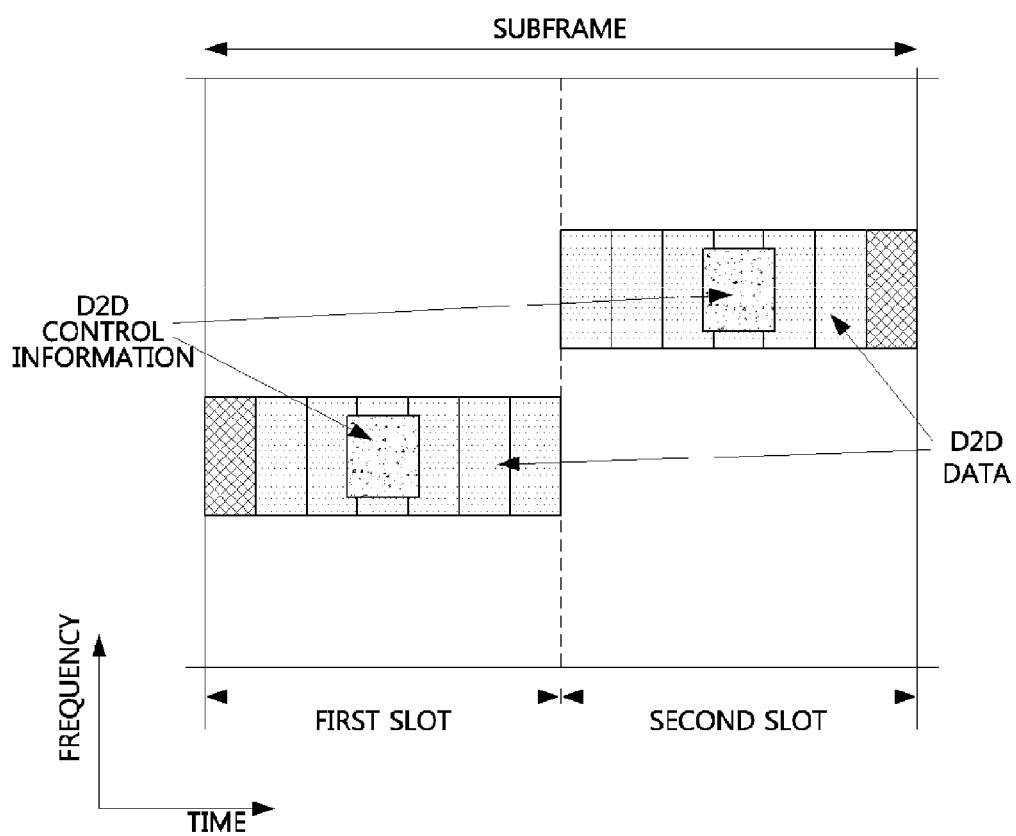

FIG. 13

| NUMBER | TYPES OF CONTROL INFORMATION COMBINATIONS | TX METHOD | |
| --- | --- | --- | --- |
| | | TX FORMAT | RESOURCE FOR USE |
| 1 | D2D-CSI | PUCCH FORMAT 2 | D2D-CSI RESOURCES |
| 2 | D2D-HARQ ACK | PUCCH FORMAT 1A/1B | D2D-HARQ ACK RESOURCES |
| 3 | D2D-SR | PUCCH FORMAT 1 | D2D-SR RESOURCES |
| 4 | D2D-CSI+D2D-HARQ ACK | PUCCH FORMAT 2A/2B | D2D-CSI RESOURCES |
| 5 | D2D-CSI+D2D-SR | D2D-SR TX FORMAT (NO D2D-CSI TX) | D2D-SR RESOURCES |
| 6 | D2D-SR+D2D-HARQ ACK | PUCCH FORMAT 1A/1B | D2D-SR RESOURCES |

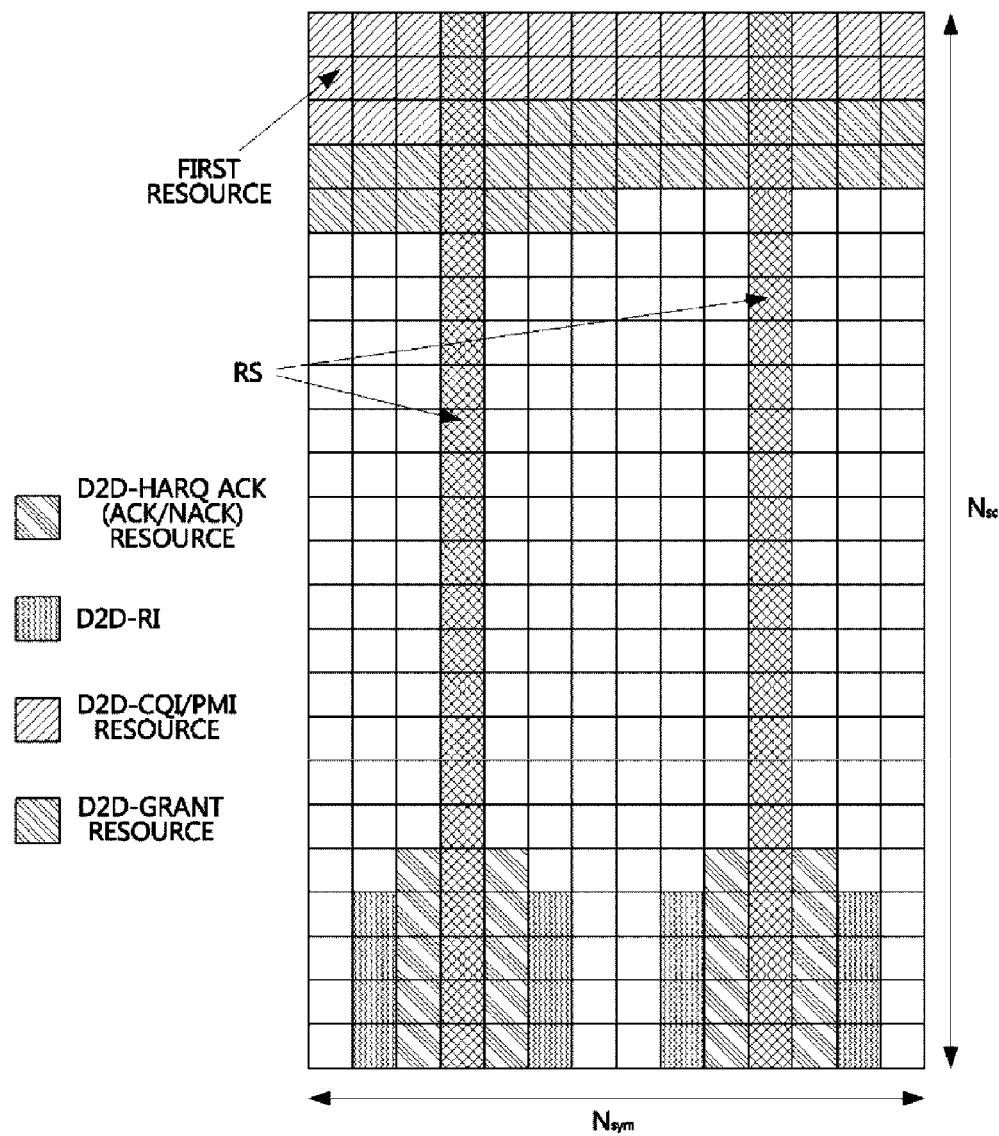

FIG. 24
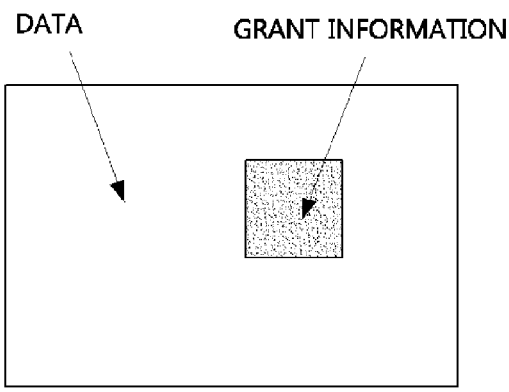
(A)
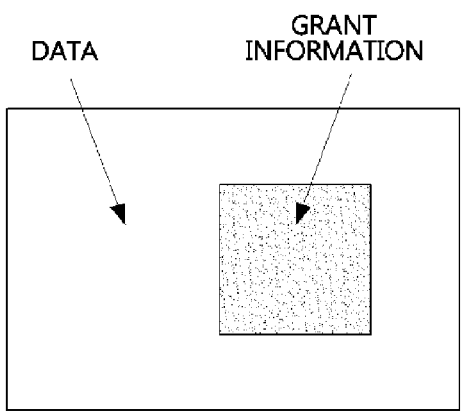 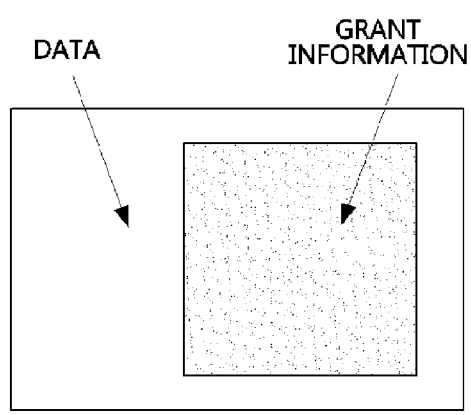
(B) (C)

(A) NORMAL CP            (B) EXTENDED CP

| PHYSICAL CHANNEL OF RESTRICTION-REGION SUBFRAME | TX RESCTRICTION METHOD | RX RESCTRICTION METHOD |
|---|---|---|
| C-PUSCH | METHOD 1 | N/A |
| C-PUCCH<br>C-PUCCH+C-PUSCH | METHOD 2 | N/A |
| D2D-PUSCH | METHOD 1 | METHOD 1 |
| D2D-PUCCH<br>D2D-PUCCH+D2D-PUSCH | METHOD 1 | METHOD 1 |

FIG. 30
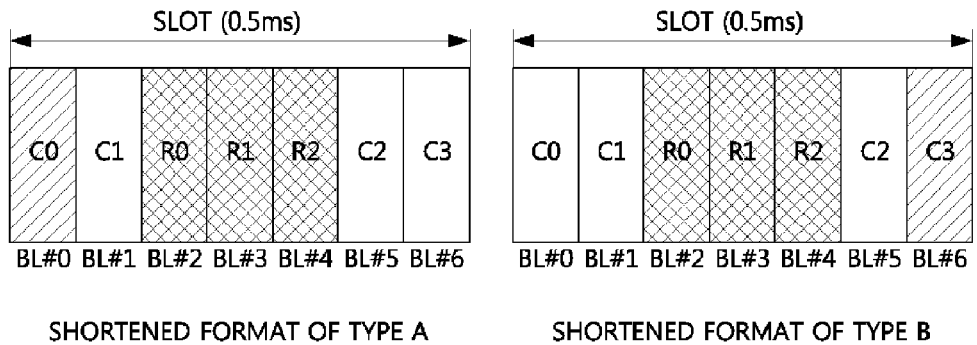
SHORTENED FORMAT OF TYPE A        SHORTENED FORMAT OF TYPE B
FIG. 31
| SEQUENCE INDEX i | DFT SEQUENCE [D$_i$(0), D$_i$(1), D$_i$(2)] |
|---|---|
| 0 | [1 1 1] |
| 1 | $[1 \; e^{j2\pi/3} \; e^{j4\pi/3}]$ |
| 2 | $[1 \; e^{j4\pi/3} \; e^{j2\pi/3}]$ |
FIG. 32
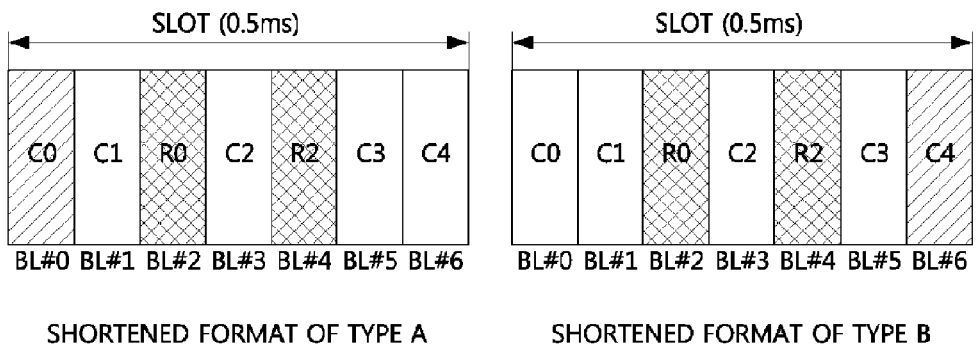
SHORTENED FORMAT OF TYPE A        SHORTENED FORMAT OF TYPE B

FIG. 35

| SEQUENCE INDEX i | Walsh SEQUENCE<br>[$W_i(0)$, $W_i(1)$, $W_i(2)$, $W_i(3)$] |
|---|---|
| 0 | [1  1  1  1] |
| 1 | [1 -1  1 -1] |
| 2 | [1  1 -1  1] |
| 3 | [1 -1 -1  1] |

FIG. 36

| UE | WALSH SEQUENCE INDEX OF FIRST SLOT | WALSH SEQUENCE INDEX OF SECOND SLOT |
|---|---|---|
| UE0 | 0 | 0 |
| UE1 | 1 | 1 |
| UE2 | 2 | 2 |
| UE3 | 3 | 3 |

FIG. 37

| UE | WALSH SEQUENCE INDEX OF FIRST SLOT | WALSH SEQUENCE INDEX OF SECOND SLOT |
|---|---|---|
| UE0 | 0 | 0 |
| UE1 | 1 | 2 |
| UE2 | 2 | 1 |
| UE3 | 3 | 3 |

|  | RESOURCE ALLOCATION TYPE A | RESOURCE ALLOCATION TYPE B | RESOURCE ALLOCATION TYPE C |
|---|---|---|---|
| SINGLE-ANTENNA TX | O (PERMITTED) | O | X |
| MULTI-ANTENNA TX | O (PERMITTED) | O | O |

FIG. 46

| NUMBER | TX MODE | NUMBER OF D2D-DM RS PORTS | OTHERS |
|---|---|---|---|
| 1 | SINGLE-ANTENNA PORT TX | 1 | |
| 2 | TWO-ANTENNA PORT TX | 1 OR 2 | |
| 3 | FOUR-ANTENNA PORT TX | 1, 2, 3 OR 4 | |

FIG. 47

| OCC SEQUENCE INDEX | OCC SEQUENCE |
|---|---|
| 0 | [1, 1] |
| 1 | [1, -1] |

FIG. 48

| | OCC [1, 1] | OCC [1, -1] |
|---|---|---|
| CS-0 | DM RS PORT 0 | |
| CS-1 | | DM RS PORT 1 |

FIG. 49

|       | OCC [1, 1]   | OCC [1, -1]  |
|-------|--------------|--------------|
| CS-0  | DM RS PORT 0 |              |
| CS-1  |              | DM RS PORT 1 |
| CS-2  | DM RS PORT 2 |              |

FIG. 50

|       | OCC [1, 1]   | OCC [1, -1]  |
|-------|--------------|--------------|
| CS-0  | DM RS PORT 0 |              |
| CS-1  |              | DM RS PORT 1 |
| CS-2  | DM RS PORT 2 |              |
| CS-3  |              | DM RS PORT 3 |

FIG. 51

| NUMBER | TX MODE | NUMBER OF D2D-CSI RS PORTS | OTHERS |
|--------|---------|----------------------------|--------|
| 1 | SINGLE-ANTENNA PORT TX | 1 | DM RS PORT FOR D2D-PUSCH DEMODULATION CAN BE USED AS D2D-CSI RS PORTS |
| 2 | TWO-ANTENNA PORT TX | 2 | |
| 3 | FOUR-ANTENNA PORT TX | 4 | |

FIG. 52

| NUMBER | TX MODE | NUMBER OF NECESSARY RS PORTS | OTHERS |
|---|---|---|---|
| 1 | SINGLE-ANTENNA PORT TX | 1 | |
| 2 | TWO-ANTENNA PORT TX | 3 OR 4 | |
| 3 | FOUR-ANTENNA PORT TX | 5, 6, 7 OR 8 | |

FIG. 53

| | FIRST SLOT | SECOND SLOT |
|---|---|---|
| CS-a | CSI RS PORT 0 | CSI RS PORT 1 |
| CS-b | CSI RS PORT 2 | CSI RS PORT 3 |

FIG. 54

| FIRST SLOT | SECOND SLOT |
|---|---|
| CSI RS PORT 0 | CSI RS PORT 1 |
| CSI RS PORT 2 | CSI RS PORT 3 |

FIG. 55

| LIF VALUE | LINK | |
|---|---|---|
| 0 | CELLULAR UPLINK | TX TO BASE STATION |
| 1 | D2D Tx | TX TO COUNTERPART UE |
| 2 | D2D Rx | RX FROM COUNTERPART UE |

FIG. 56

| LIF VALUE | LINK | MEANING |
|---|---|---|
| 0 | CELLULAR UPLINK | TX TO BASE STATION |
| 1 | D2D Tx 0 | TX TO UE 0 |
| 2 | D2D Rx 0 | RX FROM UE 0 |
| 3 | D2D Tx 1 | TX TO UE 1 |
| 4 | D2D Rx 1 | RX FROM UE 1 |
| 5 | D2D Tx 2 | TX TO UE 2 |
| 6 | D2D Rx 2 | RX FROM UE 2 |

FIG. 57

| TX MODE | DCI FORMAT | SEARCH SPACE | TX METHOD OF D2D-PUSCH CORRESPONDING TO PDCCH |
|---|---|---|---|
| MODE 1 | DCI FORMAT 0 | UE-SPECIFIC SEARCH SPACE DETERMINED ACCORDING TO JOINT SEARCH SPACE C-RNTI | SINGLE-ANTENNA PORT |
| MODE 2 | DCI FORMAT 0 | UE-SPECIFIC SEARCH SPACE DETERMINED ACCORDING TO JOINT SEARCH SPACE C-RNTI | SINGLE-ANTENNA PORT |
|  | DCI FORMAT 4 | UE-SPECIFIC SEARCH SPACE DETERMINED ACCORDING TO C-RNTI | MULTI-ANTENNA PORT SPATIAL MULTIPLEXING |

FIG. 58

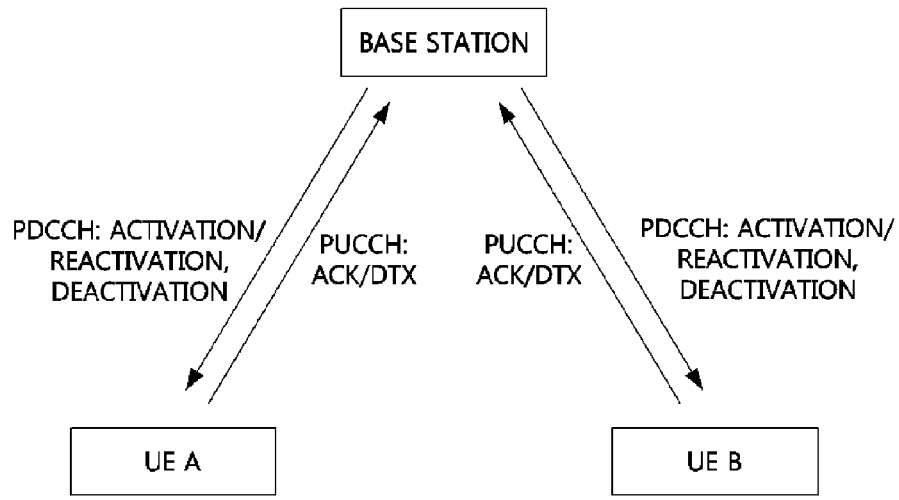

DEVICE TO DEVICE COMMUNICATION METHOD USING PARTIAL DEVICE CONTROL

TECHNICAL FIELD

The present invention relates to device-to-device (D2D) communication, and more particularly, to a D2D communication method based on partial user equipment (UE) control.

BACKGROUND ART

Device-to-device (D2D) communication denotes a communication method in which two adjacent user equipments (UEs) exchange data with each other directly, not through a base station. In other words, the two UEs become, respectively, a source and a destination of the data, to perform communication.

As an example, D2D can be used by a local media server that provides a large amount of data (e.g., programs of a rock concert, and information on musicians) to participants at a rock concert, etc., or it can be used for the purpose of offloading for sharing a load of a base station, and so on.

Here, each UE connects to a serving cell to perform telephone communication, Internet access, etc., using an existing cellular link, and can directly exchange the aforementioned large amount of data with the local media server operating as a counterpart UE of D2D communication according to a D2D scheme. Meanwhile, a D2D link is established not only between UEs having the same cell as a serving cell, but also between UEs having different cells as serving cells.

In such direct communication between UEs, according to a D2D communication method based on a cellular network, a UE wanting to communicate with another UE requests link configuration from a central node (a base station in a cellular network) taking control, and the central node allocates radio resources for direct communication between the two UEs when the counterpart UE is close to the UE, such that direct communication can be performed between the UEs. Here, almost all operations of the UEs are managed by the central node, and it is possible to reuse radio resources allocated for a cellular link or another D2D link for D2D communication.

Existing cellular communication and the above-described D2D communication each have their merits and demerits. Thus, it is expected that a communication scheme that combines cellular mobile communication and the above-described D2D communication will ultimately be generalized. However, it has not yet been determined which one of a base station and a UE will take control of D2D communication combined with a cellular network. Centralized control by a base station and distributed control by a UE each have their merits and demerits.

DISCLOSURE

Technical Problem

The present invention is directed to providing a device-to-device (D2D) communication scenario, a capability of a user equipment (UE) for performing D2D communication, a frequency band according to a frequency-division duplex (FDD) or time-division duplex (TDD) scheme, and a D2D communication scheme related to use of a subframe.

The present invention is also directed to providing time and frequency synchronization for D2D communication, a method of measuring and reporting proximity, measurement and reporting of a D2D reception (Rx) timing, and a method of transmitting and configuring a sounding reference signal (SRS) for D2D communication.

The present invention is also directed to providing a method of switching between a cellular link and a D2D link, and a scheduling restriction method for supporting both links.

The present invention is also directed to providing, as a partial UE control method for D2D communication, a D2D resource allocation and release method, an operation method of a D2D hybrid automatic repeat request (HARQ) process, a link adaptation method including power control and adaptive modulation and coding (AMC) of a D2D link, a method of signaling D2D control information, and a channel state information (CSI) reporting method and the content of a CSI report for D2D communication.

The present invention is also directed to providing a transmission (Tx) format of a control channel that is transmitted for D2D communication by a base station.

The present invention is also directed to providing a procedure of setting, activating, reactivating, and deactivating a D2D link as a procedure of using a D2D link for D2D communication.

Technical Solution

One aspect of the present invention provides a device-to-device (D2D) communication method performed as an operation method of a first user equipment (UE) performing D2D communication through a D2D link in which the first UE and a second UE participate, the D2D communication method including: detecting grant information in subframe n received from the second UE; and when grant information is detected, demodulating data included in subframe n on the basis of the detected grant information, and transmitting positive acknowledgement/negative acknowledgement (ACK/NACK) information on whether or not demodulation of the data has succeeded to the second UE in subframe n+k.

Here, the grant information may include at least some of the number of transmission (Tx) layers of the D2D link, codeword-specific new data indicators (NDIs) of the D2D link, codeword-specific redundancy versions (RVs) of the D2D link, codeword-specific modulation and coding schemes (MCSs) of the D2D link, and a power control command.

Here, the ACK information on whether or not demodulation of the data has succeeded may be configured to also indicate success in detecting the grant information.

Here, the D2D communication method may further include transmitting additional ACK/NACK information on whether or not grant information has been detected to the second UE in subframe n+k.

Here, the grant information may be received through a separate control channel region different from a D2D data channel (D2D-physical uplink shared channel (PUSCH)) region of subframe n.

Here, the grant information may be included in a D2D data channel (D2D-PUSCH) region of subframe n together with the data and received, and received through resources in the D2D-PUSCH region other than resources occupied by the data. At this time, the grant information may be received using the same number of Tx layers and the same MCS as the data in the D2D data channel (D2D-PUSCH) region of subframe n.

Here, the D2D communication method may further include, when detection of grant information fails, demodulating the data included in subframe n on the basis of previously detected grant information. At this time, the D2D communication method may further include, when detection of grant information fails, transmitting the ACK/NACK information on whether or not demodulation of the data has succeeded to the second UE in subframe n+k. Alternatively, the D2D communication method may further include, when detection of grant information fails, transmitting no ACK/NACK information on whether or not demodulation of the data has succeeded to the second UE.

Another aspect of the present invention provides a D2D communication method performed as an operation method of a first UE for measuring and reporting channel state information (CSI) on D2D communication in which the first UE and a second UE participate, the D2D communication method including: at a request of a base station, measuring and reporting first CSI on the whole or a part of an entire cellular band to the base station; receiving D2D resource allocation information based on the first CSI from the base station; and measuring and reporting second CSI on D2D resources based on the D2D resource allocation information to the second UE.

Here, the first CSI may be measured on the basis of a sounding reference signal (SRS) transmitted by the second UE, and reported to the base station periodically or at the request of the base station.

Here, the second CSI may be measured on the basis of a demodulation RS (DM-RS) or an SRS transmitted by the second UE.

Here, when the D2D resources based on the D2D resource allocation information are divided into non-consecutive first and second regions, the second CSI may include a precoding matrix indicator (PMI) to be applied to the first region and the second region in common.

Here, when the D2D resources based on the D2D resource allocation information are divided into non-consecutive first and second regions, the second CSI may include a PMI of the first region and a PMI of the second region.

Still another aspect of the present invention provides a D2D communication method performed as an operation method of a UE participating in D2D communication, the D2D communication method including: receiving D2D link configuration information for the D2D communication from a base station; and receiving scheduling information based on the D2D link configuration information from the base station.

Here, the D2D link configuration information may be received from the base station by radio resource control (RRC) signaling.

Here, the D2D link configuration information may include at least some of a UE identifier (ID) for a D2D link (D2D-radio network temporary identifier (RNTI)), a Tx link virtual cell ID, a reception (Rx) link virtual cell ID, an initialization value for determining a cyclic shift (CS) of a Tx link DM-RS, an initialization value for determining a CS of an Rx link DM-RS, resource allocation information on a Tx link data channel and control channel, and resource allocation information on an Rx link data channel and control channel.

Here, the scheduling information based on the D2D link configuration information may be received as a physical downlink control channel (PDCCH) from the base station.

Here, the scheduling information based on the D2D link configuration information may include information indicating at least one of activation, reactivation, and deactivation of a D2D link.

Advantageous Effects

It is expected that device-to-device (D2D) communication based on a cellular network in which cellular mobile communication and D2D communication are combined will be generalized in the future. Using a D2D communication method based on partial UE control according to the present invention as described above, it is possible to efficiently perform, in cellular-based D2D communication, time and frequency synchronization for the D2D communication, measuring and reporting of proximity, measuring and reporting of a D2D reception (Rx) timing, transmission (Tx) and configuration of a sounding reference signal (SRS) for the D2D communication, allocation and release of D2D resources, a D2D hybrid automatic repeat request (HARQ) process, link adaptation including power control and adaptive modulation and coding (AMC) of a D2D link, a method of signaling D2D control information, channel state information (CSI) reporting for D2D communication, and so on.

In other words, in a communication scheme in which cellular mobile communication and D2D communication are combined, centralized control by a base station and distributed control by a UE are performed in combination with each other for operation of D2D communication, such that efficient D2D communication can be performed.

The present invention provides D2D communication methods based on a cellular network optimized for a $3^{rd}$ Generation Partnership Project (3GPP) Long Term Evolution (LTE) system, and the technical spirit of the present invention can be applied to various cellular mobile communication systems as well as the 3GPP LTE system.

DESCRIPTION OF DRAWINGS

FIG. 2 is a conceptual diagram illustrating two types of Tx and reception (Rx) timings of a D2D link.

FIG. 3 is a table showing physical channels and signals for cellular communication and physical channels and signals for D2D communication.

FIG. 4 is a frame diagram illustrating a timing relationship between a downlink subframe and an uplink subframe of a user equipment (UE).

FIG. 10 to FIG. 12 are subframe diagrams showing examples of multiplexing schemes of D2D control information and data.

FIG. 13 is a table illustrating a control information Tx method in a subframe in which there is no D2D-physical uplink shared channel (PUSCH) Tx.

FIG. 14 and FIG. 15 are constitution diagrams of subframes illustrating mapping of resources used to transmit respective pieces of control information when the control information is inserted into a D2D-PUSCH and transmitted.

FIG. 24 is a conceptual diagram illustrating a concept of defining and using amounts of grant information resources as a plurality of levels.

FIG. 30 is a conceptual diagram showing shortened formats of a physical uplink control channel (PUCCH) format 1/1a/1b.

FIG. 31 is a table showing a length-3 discrete Fourier transform (DFT) sequence.

FIG. 32 is a conceptual diagram showing shortened formats of PUCCH format 2.

FIG. 35 is a table showing a length-4 Walsh sequence.

FIG. 36 and FIG. 37 are tables showing examples of use of Walsh sequences for interference equalization.

FIG. 46 is a table showing the number of demodulation reference signal (DM-RS) ports necessary for demodulation of a D2D-PUSCH according to a Tx mode set in a UE.

FIG. 47 is a table showing an example of an orthogonal cover code (OCC) sequence applied to a DM-RS.

FIG. 48 to FIG. 50 are tables showing examples of preferable assignment of cyclic shifts (CSs) and OCCs according to the number of Tx layers.

FIG. 51 is a table showing the number of D2D-CSI RS ports necessary according to a Tx mode.

FIG. 52 is a table showing a total number of RS ports (DM-RS+CSI-RS) necessary according to a Tx mode and the number of Tx layers.

FIG. 53 is a table showing resource mapping of CSI-RS ports.

FIG. 54 is a table showing slot assignment of CSI-RS ports.

FIG. 55 and FIG. 56 are tables showing meanings of values of a link indicator field (LIF).

FIG. 57 is a table showing PDCCH formats and D2D-PUSCH Tx methods set according to D2D-radio network temporary identifiers (RNTIs).

FIG. 58 is a conceptual diagram illustrating a D2D link scheduling procedure between a base station and a UE.

MODES OF THE INVENTION

Figure 1:
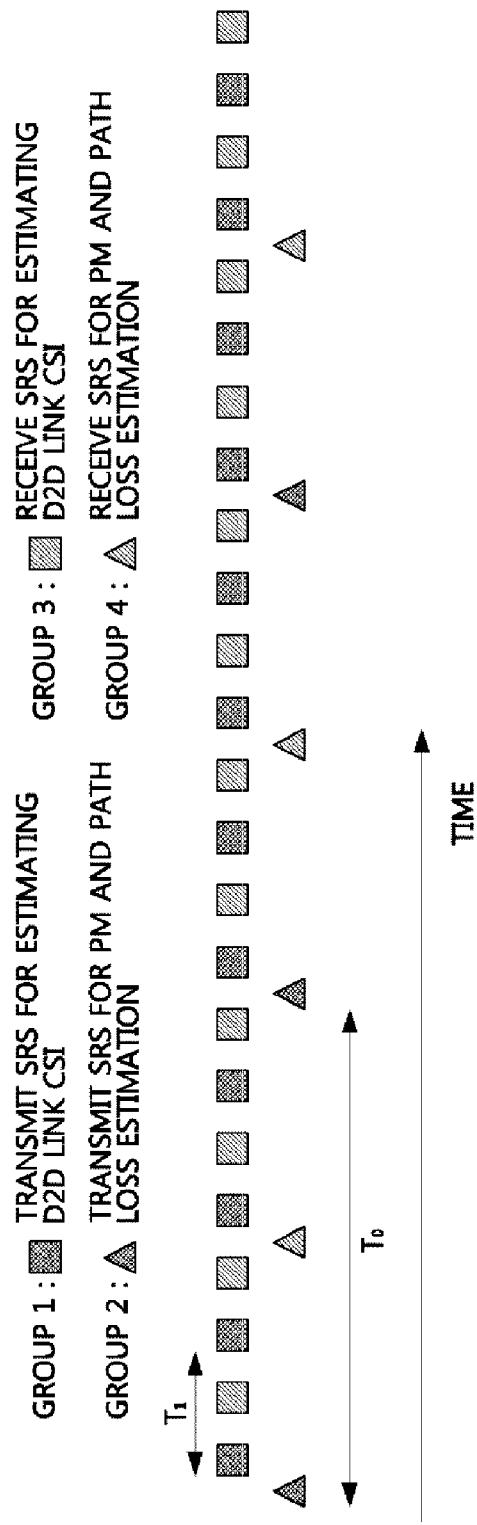
FIG. 1 is a conceptual diagram illustrating a sounding reference signal (SRS) grouping method in SRS transmission (Tx) for device-to-device (D2D) communication.

While the present invention can be modified in various ways and can take on various alternative forms, specific embodiments thereof are shown in the drawings and described in detail below as examples.

However, there is no intent to limit the present invention to the particular forms disclosed. On the contrary, the present invention is to cover all modifications, equivalents, and alternatives falling within the spirit and scope of the appended claims.

The terminology used herein to describe embodiments of the invention is not intended to limit the scope of the invention. Singular forms include plural forms unless the context clearly indicates otherwise. It will be further understood that the term "comprises," "comprising," "includes," or "including," when used herein, specifies the presence of stated features, numbers, steps, operations, elements, components, or groups thereof, but do not preclude the presence or addition of one or more other features, numbers, steps, operations, elements, components, or groups thereof.

Unless otherwise defined, all terms including technical and scientific terms used herein are to be interpreted as is customary in the art to which the present invention belongs. It will be further understood that terms as those defined in a generally used dictionary are to be interpreted as having meanings in accordance with the meanings in the context of the relevant art and not in an idealized or overly formal sense unless clearly so defined herein.

The term "user equipment (UE)" used herein may refer to a mobile station (MS), user terminal (UT), wireless terminal, access terminal (AT), terminal, subscriber unit, subscriber station (SS), wireless device, wireless communication device, wireless transmit/receive unit (WTRU), mobile node, mobile, or other terms. Various embodiments of a UE may include a cellular phone, a smart phone having a wireless communication function, a personal digital assistant (PDA) having a wireless communication function, a wireless modem, a portable computer having a wireless communication function, a photographing apparatus such as a digital camera having a wireless communication function, a gaming apparatus having a wireless communication function, a music storing and playing appliance having a wireless communication function, an Internet home appliance capable of wireless Internet access and browsing, and also portable units or UEs having a combination of such functions, but are not limited to these.

The term "base station" used herein generally denotes a fixed or moving point that communicates with a UE, and may be a common name for Node-B, evolved Node-B (eNode-B), base transceiver system (BTS), access point, relay, femto-cell, and so on.

Hereinafter, exemplary embodiments of the present invention will be described in detail with reference to the accompanying drawings. To aid in understanding the present invention, like numbers refer to like elements throughout the description of the drawings, and the description of the same element will not be reiterated.

D2D Communication Scenario

There are three device-to-device (D2D) communication scenarios including 1) a scenario permitting only D2D communication between UEs in the same cell, 2) a scenario permitting only D2D communication between UEs belonging to the same base station, and 3) a scenario permitting D2D communication between UEs without restriction regarding cells and base stations to which they belong. The first scenario permits D2D communication between UEs belonging to the same cell only, and the second scenario permits D2D communication between UEs belonging to cells managed by the same base station only. Finally, the third scenario permits D2D communication between UEs regardless of cells and base stations to which they belong.

According to constitutions of receivers of UEs, the UEs can be classified into two types.

A first type of UE has one reception (Rx) radio frequency (RF) device. In a UE having one Rx RF device, Rx through a downlink frequency band and Rx through an uplink frequency band cannot be performed at the same time.

A second type of UE has two Rx RF devices. In a UE having two Rx RF devices, Rx through a downlink frequency band and Rx through an uplink frequency band can be performed at the same time.

Meanwhile, use of a frequency band and a subframe in D2D communication may be classified according to a case in which an uplink frequency band is used for D2D data communication and a case in which downlink and uplink frequency bands both are used for D2D data communication.

First, the case in which an uplink frequency band is used for D2D data communication will be described.

In a frequency-division duplex (FDD) cellular system, a UE uses a downlink frequency band and an uplink frequency band for cellular communication, and uses the uplink frequency band for D2D data communication. To exchange control information for D2D communication, it is possible to use the downlink frequency band and the uplink frequency band both as needed.

In a time-division duplex (TDD) cellular system, a UE uses downlink subframes and uplink subframes for cellular communication, and uses uplink subframes for D2D data communication. To exchange control information for D2D communication, it is possible to use downlink subframes and uplink subframes both as needed.

Next, the case in which a downlink frequency band and an uplink frequency band both are used for D2D data communication will be described.

In an FDD cellular system, a UE uses a downlink frequency band and an uplink frequency band for cellular communication, and uses the downlink frequency band and the uplink frequency band both for D2D data communication. In a TDD cellular system, a UE uses downlink subframes and uplink subframes for cellular communication, and uses downlink and uplink subframes for D2D data communication. To exchange control information for D2D communication, the uplink frequency band and the downlink frequency band both are used.

As for a timing of D2D communication, when D2D data communication is performed in an uplink subframe, D2D transmission (Tx) in an uplink frequency band may be performed according to a timing of cellular uplink Tx. When D2D data communication is performed in a downlink subframe, downlink D2D Tx may be performed according to a timing of cellular downlink Tx.

Basic Considerations for D2D Communication

1) Use of Frequency Band and Subframe

In an FDD cellular system, a UE uses a downlink frequency band and an uplink frequency band for cellular communication, and uses the uplink frequency band for D2D data communication. To exchange control information for D2D communication, it is possible to use the downlink frequency band and the uplink frequency band both as needed.

In a TDD cellular system, a UE uses downlink subframes and uplink subframes for cellular communication, and uses uplink subframes for D2D data communication. To exchange control information for D2D communication, it is possible to use downlink subframes and uplink subframes both as needed.

2) Time and Frequency Synchronization

A UE detects a reference signal (RS) transmitted by a counterpart UE of D2D communication, thereby achieving time and frequency synchronization necessary for D2D Rx. To this end, a base station notifies the UE of RS Tx setting information on the counterpart UE of the D2D communication by radio resource control (RRC) signaling. As an RS for time and frequency synchronization, an SRS can be used.

In this case, the SRS may be periodically transmitted using a wideband.

3) Proximity Measurement and Reporting (a) Proximity Measurement from Uplink Subframe Signal A UE may be configured to measure a reference signal received power (RSRP), reference signal received quality (RSRQ), etc., from an SRS of a counterpart UE, and report the measurement results at a measurement request of a base station. To this end, the base station may be configured to notify the UE of the corresponding SRS Tx setting information on the counterpart UE of D2D communication by RRC signaling.

(b) Proximity Measurement from Downlink Subframe Signal

To minimize a problem caused in uplink Tx due to SRS Rx, a proximity measurement (PM) RS for PM may be transmitted in a downlink subframe. PM is intended to check a long-term property of a channel, and even in the case of FDD, it is possible to consider that reciprocity is established between a downlink frequency band and an uplink frequency band. Thus, a downlink RS can be used in PM. In other words, for PM, a UE transmits a signal such as a channel state information (CSI) RS through a downlink, and a counterpart UE reports a result of measuring the corresponding RS to a base station.

Tx of a PM RS through a downlink has merits of making it possible to solve problems of rate matching, new format design, etc. caused by SRS Rx through an uplink, but various problems may be caused by the Tx of a PM RS through a downlink. Typically, there may be a problem that downlink Rx of downlink subframes that transmit a PM RS by a PM-RS-transmitting UE is limited. Also, there may be a problem that much interference is superimposed on a cellular link of a neighboring cell.

4) D2D Rx Timing Measurement and Reporting

At a measurement request of a base station, a UE may measure an Rx timing of an uplink subframe transmitted by a D2D counterpart UE and report the measured Rx timing to the base station. A value reported to the base station by the UE may be a difference between the Rx timing of an uplink subframe transmitted by the D2D counterpart UE and an uplink subframe Tx timing or a downlink subframe Rx timing of the UE.

The UE measures and reports the D2D Rx timing to the base station, and the base station may not permit D2D communication when the Rx timing that is the reported result does not belong to a cyclic prefix (CP), and only permit D2D communication when the Rx timing belongs to the CP.

Alternatively, the UE may measure and report an uplink subframe Rx timing of the D2D counterpart UE to the counterpart UE. A value reported to the counterpart UE by the UE may be a difference between the uplink subframe Tx timing of the UE and an uplink subframe Rx timing of the D2D counterpart UE.

5) SRS Tx

A base station may request a UE participating in D2D communication to transmit an SRS. To this end, the UE is notified of SRS Tx setting information by RRC signaling.

(a) Use of SRS

An SRS is used for synchronization of an uplink subframe time and frequency of a UE, PM, and estimation of path loss. When the SRS is used for estimating path loss, a receiving UE should be notified of an SRS Tx power. The SRS can also be used for estimating CSI on a D2D link.

(b) SRS Configuration

A base station may transmit cell-specific SRS subframe configuration information as system information. The cell-specific SRS subframe configuration information may include a cell-specific SRS subframe configuration period and a subframe offset parameter (e.g., srs-SubframeConfig).

For SRS Tx and Rx, the base station may deliver the following SRS Tx parameters according to each UE.

Cell identifier (ID) ($N_{ID}^{Cell}$) or virtual cell ID used instead of cell ID SRS sequence group number u (TS 36.211 Sec. 5.5.1, 5.5.1.3) and SRS base sequence number v (TS 36.211 Sec. 5.5.1.4) are determined according to a cell ID or a virtual cell ID.

Tx comb parameter (transmissionComb or transmissionComb-ap)

Start physical resource block (PRB) parameter ($n_{RRC}$)

SRS continuous time parameter (duration)

SRS Tx period and SRS subframe offset parameter (srs-ConfigIndex)

SRS Tx bandwidth (srs-Bandwidth, $B_{SRS} \in \{0, 1, 2, 3\}$)

SRS frequency hopping bandwidth (srs-HoppingBandwidth)

SRS cyclic shift (CS) (cyclicShift or cyclicShift-ap)

Number of antenna ports used for SRS Tx ($N_{ap}$)

To improve SRS Rx quality between UEs in D2D communication between the D2D UEs belonging to different cells, cell-specific SRS subframes may be configured the same as each other, or configured such that the UEs can transmit and receive an SRS at a position at which the SRS subframes overlap each other.

A base station may classify use of SRSs into Tx for PM, Rx for PM, Rx for measuring D2D link CSI, Tx for measuring D2D link CSI, measurement of CSI on a cellular link, etc., and transmit use-specific configuration information to a UE as needed.

When an SRS is used to measure path loss of a D2D link, the SRS should be transmitted with a fixed Tx power, and a receiving UE should be notified of the Tx power value, such that the UE can estimate the path loss.

(c) SRS Grouping Method

In an SRS grouping method, SRS Tx is not separately set according to SRS use, but one piece of SRS configuration information is given to a UE, SRS Tx opportunities corresponding to the configuration information are classified into a plurality of groups, and an appropriate SRS for a use is transmitted or received according to each group.

FIG. 1 is a conceptual diagram illustrating an SRS grouping method in SRS Tx for D2D communication.

Referring to FIG. 1, a UE transmits an SRS for PM and estimation of path loss in a first group. Also, in a second group, the UE transmits an SRS for measuring D2D link CSI. A Tx power spectral density of an SRS and that of D2D data are kept at a fixed ratio.

In a third group, the UE receives an SRS transmitted by a counterpart D2D

UE for PM and estimation of path loss. Also, in a fourth group, the UE receives an SRS transmitted by the counterpart D2D UE to measure D2D link CSI.

6) Understanding of D2D UE Rx Timing

A downlink follows a downlink timing of existing cellular communication. Cellular Tx and D2D Tx of an uplink subframe follows an uplink timing of existing cellular communication. This is intended to minimize interference in cellular communication. D2D Rx through an uplink frequency band is performed by acquiring or tracking a timing of a transmitting UE.

Tx and Rx timings of a D2D link may be classified into two types. FIG. 2 is a conceptual diagram illustrating two types of Tx and Rx timings of a D2D link.

First, Type B is a general Rx timing relationship of a D2D UE in a cell having one Tx and Rx point, and Type A is an Rx timing relationship that can be established between D2D UEs in a cell having a plurality of Tx and Rx points.

Assuming a line of sight (LOS) environment, a time difference $\Delta T_{B \to A}$ between an uplink subframe of UE A and an uplink subframe of UE B at UE A is given by Equation 1 below.

$$\Delta T_{B \to A} = T_B - T_A = -\frac{d_B}{C} + \frac{d_{AB}}{C} - \left(-\frac{d_A}{C}\right) = \frac{(d_A - d_B)}{C} + \frac{d_{AB}}{C} \quad \text{Equation 1}$$

A time difference $\Delta T_{A \to B}$ between an uplink subframe of UE B and an uplink subframe of UE A at UE B is given by Equation 2 below.

$$\Delta T_{A \to B} = T_A - T_B = \frac{1}{C}(d_B - d_A) + \frac{d_{AB}}{C} \quad \text{Equation 2}$$

Here, C is the propagation velocity of an electromagnetic wave (3×10^(8) m/s), $d_A$ is a distance between UE A and a downlink Tx point of UE A, $d_B$ is a distance between UE B and a downlink Tx point of UE B, and $d_{AB}$ is a distance between UE A and UE B.

When UEs share the same downlink Tx point (in FIG. 2, UE 3 230 and UE 4 240, of which a maximum time difference can be 2R/C. R is a cell radius), $\Delta T_{B \to A}$ and $\Delta T_{A \to B}$ both are equal to or greater than 0. In other words, a signal of a counterpart UE always arrives at the same time as or later than that of a UE.

However, when UEs belong to different downlink Tx points (in FIG. 2, UE 1 210 and UE 2 220, of which a maximum time difference can be 3R/C according to locations. R is a cell radius), there may be a case in which $\Delta T_{B->A}<0$ or $\Delta T_{A->B}<0$. In other words, a signal of a counterpart UE can arrive earlier than that of a UE.

Problem of Switching Between/Simultaneously Supporting Cellular Link and D2D Link 1) Semi-Static Mode Switching Semi-static mode switching denotes a method of switching between cellular communication and D2D communication of a UE by RRC signaling. Cellular communication and D2D communication are not simultaneously performed.

2) Semi-Dynamic Mode Switching

Semi-dynamic mode switching denotes a method of configuring a D2D communication link through RRC signaling of a base station and activating or deactivating the D2D link through media access control (MAC) signaling (MAC control element). The D2D link is used only while it is activated, and while the D2D link is activated, use of communication through a cellular link is very limited or is not made. Through activation/deactivation, it is possible to switch between cellular communication and D2D communication on a relatively short time scale.

3) Support for Simultaneous Cellular/D2D Using Dynamic Switching

Dynamic switching denotes a method in which cellular communication and D2D communication of a UE are simultaneously performed, and switching between the two kinds of communication can be dynamically made in units of subframes.

FIG. 3 is a table showing physical channels and signals for cellular communication and physical channels and signals for D2D communication.

In the table of FIG. 3, for the convenience in distinguishing, physical channels used for existing cellular communication are indicated by adding "C-" in front of them, and those used for D2D communication are indicated by adding "D2D-" in front of them.

4) Problem of Simultaneously Receiving Downlink and Uplink in FDD Cellular System (a) Scheduling Limitation for UE Having One Rx RF Device A UE having one Rx RF device cannot simultaneously perform Rx in a downlink frequency band and Rx in an uplink frequency band, which should be taken into consideration.

FIG. 4 is a frame diagram illustrating a timing relationship between a downlink subframe and an uplink subframe of a UE.

Referring to FIG. 4, while a D2D UE is performing D2D Rx in uplink subframe n, it is impossible to receive a part of downlink subframe n and a part of downlink subframe n−1. In other words, while a D2D UE is performing D2D Rx in uplink subframe n, it is impossible to receive a region 401.

In particular, when a UE is far away from a base station, there may be a large timing difference $\Delta T$ between an uplink and a downlink, and it may be impossible to receive some orthogonal frequency division multiplexing (OFDM) symbols of downlink subframe n−1.

The base station manages uplink timing advance (TA) of the UE, and thus knows a timing relationship between the downlink and the uplink. Thus, when the D2D UE performs D2D Rx in uplink subframe n, the base station can know OFDM symbols that cannot be received in downlink subframe n and downlink subframe n−1.

A base station should perform limited scheduling in consideration of the following:

A pageable downlink subframe configured for a UE should not collide with D2D Rx of the UE.

A physical downlink control channel (PDCCH) that transmits downlink control information (DCI) format 3/3A including a power control command to a UE should not collide with D2D Rx of the UE A PDCCH that transmits a cellular downlink or uplink grant to a UE should not collide with D2D Rx of the UE A physical hybrid automatic repeat request (HARQ) indicator channel (PHICH) transmitted to a UE should not collide with D2D Rx of the UE. When C-PUSCH Tx of a UE occurs in uplink subframe n−4, a PHICH corresponding to the C-PUSCH is transmitted in downlink subframe n. Thus, when a D2D UE performs D2D Rx in uplink subframe n, C-PUSCH Tx should not occur in uplink subframe n−4.

For this reason, when the number of a subframe in which D2D Rx occurs is n, a UE having one Rx RF device does not perform PDCCH monitoring on downlink subframe n. When a base station configures a subframe in which D2D Rx of a UE occurs such that it is possible to know the subframe in advance, the UE does not monitor a PDCCH in the downlink subframe. Here, D2D Rx denotes a case in which the UE should perform Rx in the whole or a majority of an uplink subframe, such as D2D-PUSCH Rx and D2D-physical uplink control channel (PUCCH) Rx, and does not include a case in which Rx is only performed in the last OFDM symbol of a subframe, such as SRS Rx.

When a difference between an uplink timing and a downlink timing is very small and equal to or less than a CP length, and the number of a subframe in which D2D Rx occurs is n, physical downlink shared channel (PDSCH) resource element (RE) mapping of downlink subframe n−1 may not be affected. However, due to a large difference between an uplink timing and a downlink timing, it may be impossible to receive some downlink OFDM symbols in a section temporarily overlapping D2D Rx normally. In this case, when the number of a subframe in which the D2D Rx occurs is n, a part of downlink subframe n−1 can be excluded from PDSCH RE mapping.

For example, when the D2D UE performs D2D Rx in uplink subframe n in FIG. 4, some OFDM symbols overlapping the D2D Rx in downlink subframe n−1 can be excluded from PDSCH resource mapping. A base station can notify the UE of such resource mapping limitation information. Since the base station and the UE know a timing difference between an uplink and a downlink, it is also possible to set a resource mapping limitation in a standard in advance on the basis of the timing difference.

In another method, when the number of a subframe in which D2D Rx occurs is n, the whole of downlink subframe n−1 can be excluded from PDSCH resource mapping. A base station can notify a UE of a subframe in which no PDSCH is transmitted. Since the base station and the UE know a timing difference between an uplink and a downlink, it is also possible to set a resource mapping limitation in a standard in advance on the basis of the timing difference.

Partial UE Control-Based D2D Communication Method

Partial UE control-based D2D communication mentioned herein denotes D2D communication partially controlled by each of a base station and a UE. The base station allocates resources to be used for the D2D communication to the UE. It is preferable to use a partial UE control-based D2D communication method in the aforementioned semi-static mode switching and semi-dynamic mode switching.

1) Cellular Connection State

A UE performing D2D communication maintains an RRC connected state.

From a specific downlink subframe configured for the UE by a base station, a PDCCH (or enhanced PDCCH (EPD-CCH)) delivered from the base station should be monitored, and a PDSCH should be received according to the content of the PDCCH.

UEs receive a TA command from the base station to maintain synchronization with a cellular uplink. To this end, the UEs periodically transmit RSs (SRSs or demodulation (DM)-RSs) to the base station. D2D Tx is performed using cellular uplink resources in synchronization with the cellular uplink.

2) Acquisition of Basic Information Between UEs

UEs participating in D2D Tx and Rx should exchange system information including antenna setting information, such as UE categories and the numbers of transmitter and receiver antennas, and Tx and Rx capabilities, such as maximum Tx and Rx transport block (TB) size. A base station may deliver basic information on the D2D transmitting and receiving UEs to the respective UEs.

A counterpart UE should know information such as a cell ID (or virtual cell ID) and a radio network temporary identifier (RNTI) (or virtual RNTI) that are used by a UE in a process of scrambling D2D data and control information and other processes. The base station provides such information to the UEs.

3) D2D Resource Allocation and Release (a) SPS-Based Semi-Static D2D Resource Allocation Similarly to semi-persistent scheduling (SPS) used in existing cellular communication, a base station can allocate D2D communication resources to UEs participating D2D Tx and Rx.

Figure 5:
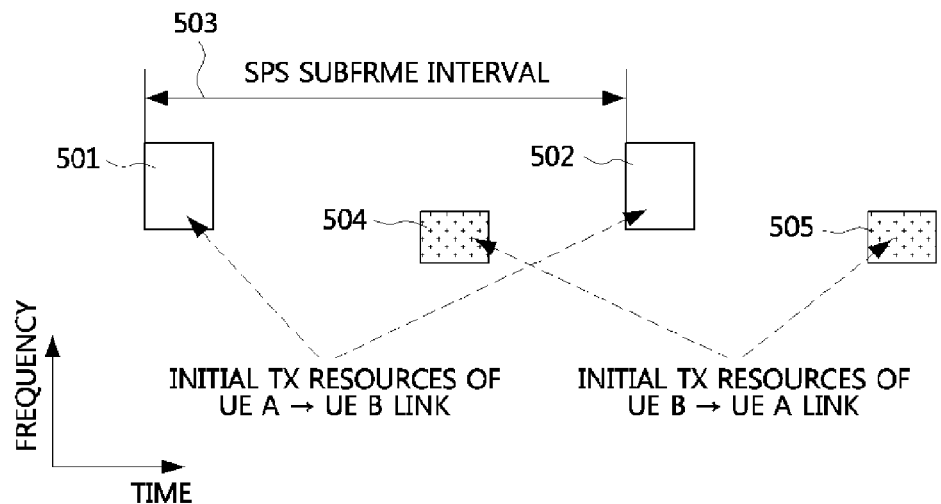
FIG. 5 is a conceptual diagram illustrating semi-persistent scheduling (SPS)-based resource allocation for D2D communication.

FIG. 5 is a conceptual diagram illustrating SPS-based resource allocation for D2D communication.

Referring to FIG. 5, Tx resources 501 and 502 for a D2D link from UE A to UE B may be allocated at SPS subframe intervals 503, and Tx resources 504 and 505 for a D2D link from UE B to UE A may be likewise allocated at predetermined SPS subframe intervals.

A base station performs activation, reactivation, and deactivation of resources using a PDCCH or an EPDCCH. Resource allocation for D2D-PUSCH Tx of a UE and resource allocation for D2D-PUSCH Rx may be performed separately or simultaneously.

(b) Resource Allocation in Units of HARQ Processes

A base station may allocate D2D communication resources in units of HARQ processes. One HARQ process used for D2D communication consists of all or some of subframes belonging to a HARQ process of a cellular uplink unit. A D2D HARQ uses synchronous HARQ, and at this time, a round trip time (RTT) of the D2D HARQ process may be set to 8×n (n is a positive integer) msec.

(c) D2D Resource Release Request by UE

A D2D transmitting or receiving UE may request D2D resource release from a base station.

(d) D2D Resource Release Request by Base Station

A base station may request release of D2D resource allocation from both or one of D2D transmitting and receiving UEs, or notify both or one of D2D transmitting and receiving UEs of D2D resource release.

4) D2D HARQ Process (a) Basic Tx Resource Structure and Signaling

Figure 6:
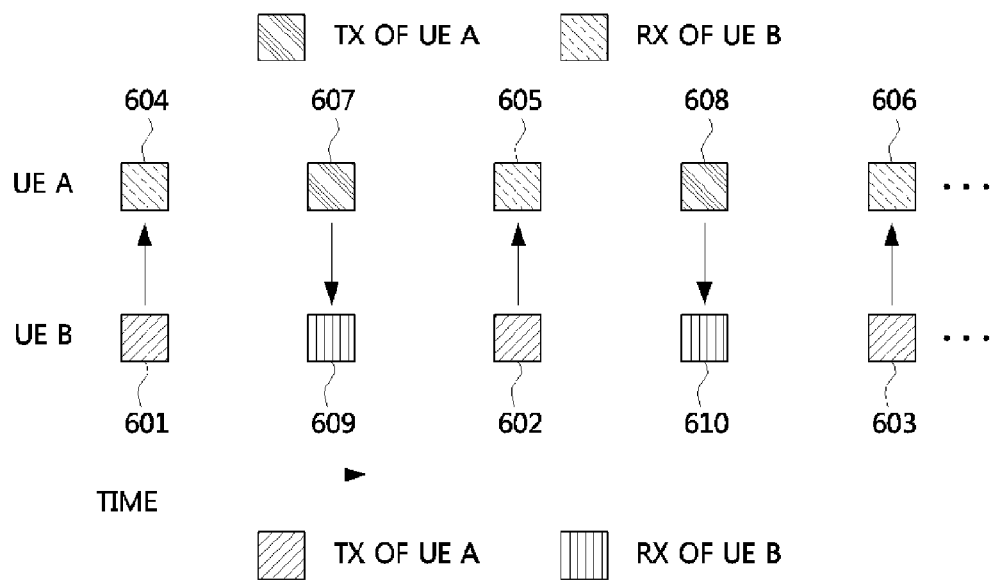
FIG. 6 is a conceptual diagram illustrating allocation of Tx and Rx resources for D2D communication.

FIG. 6 is a conceptual diagram illustrating allocation of Tx and Rx resources for D2D communication.

Referring to FIG. 6, a base station may set D2D communication Rx resources and Tx resources for each of two UEs performing D2D communication.

For example, Tx resources 601, 602 and 603 of UE B become Rx resources 604, 605 and 606 of UE A, and Tx resources 607 and 608 of UE A become Rx resources 609 and 610 of UE B. Here, subframes to which D2D Tx resources of each UE are allocated and subframes to which D2D Rx resources are allocated may have predetermined periods.

To transmit D2D data and control information to a counterpart UE, a UE always uses subframes in which allocated D2D Tx resources are positioned. However, an SRS transmitted in the last OFDM symbol of a subframe may be transmitted in a subframe separately set by a base station.

When a UE receives data in subframe n, the UE transmits D2D-HARQ positive acknowledgement (ACK) information (ACK or negative acknowledgement (NACK)) on data received in subframe n+k (k is a positive integer) to a counterpart UE. Here, subframe n+k may be a subframe to which Tx resources are allocated.

In the case of a Tx resource structure and signaling of one-way communication, a base station may set D2D communication Rx resources and Tx resources for each of two UEs performing D2D communication. A transmitting UE is notified of resources used for D2D data Tx and a D2D-HARQ ACK Rx subframe. A receiving UE is notified of resources used for D2D data Rx and a D2D-HARQ ACK Tx subframe.

In the case of a Tx resource structure and signaling of two-way communication, a base station may set D2D communication Rx resources and Tx resources for each of two UEs performing D2D communication. Each UE is notified of resources used for data Tx and a D2D-HARQ ACK Rx subframe for the corresponding Tx. Each UE is allocated resources used for data Rx and D2D-HARQ ACK Tx resources.

When a subframe transmitting a D2D HARQ-ACK accords with a subframe to which D2D data Tx resources are allocated, a UE may transmit a D2D HARQ-ACK and D2D data together in a subframe having resources allocated for data Tx.

(b) Adaptive Tx

Meanwhile, in the case of adaptive Tx, a UE transmitting data transmits grant or assignment information together with the data. In the case of non-adaptive HARQ retransmission, a UE transmitting data retransmits a part of grant information only.

5) Summary of D2D Link Adaptation (a) Comparison of Merits and Demerits of Link Adaptation Methods According to Control Subjects According to control subjects, link adaptation methods can be classified into transmitting UE control, receiving UE control, and base station control.

Figure 7:
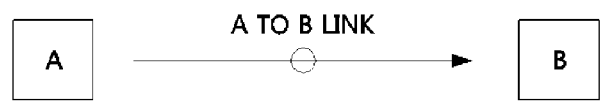
FIG. 7 is a conceptual diagram of a D2D link in which UE A transmits data to UE B.

FIG. 7 is a conceptual diagram of a D2D link in which UE A transmits data to UE B.

Link adaptation methods classified according to control subjects will be described below.

a-1) Base Station Control

Receiving UE B acquires CSI rank indicator (RI)/precoding matrix indicator (PMI)/channel quality information (CQI) about a A-to-B D2D link from an RS (e.g., SRS or DM RS) transmitted by transmitting UE A, and then transmits estimated CSI to a base station, and the base station determines and includes precoding, a modulation and coding scheme (MCS), power control, etc., in a D2D grant, and requests transmitting UE A to use the determined precoding, MCS, power control, etc., for Tx. Base station control has a merit in that resources can be relatively efficiently used by base station control, and a demerit in that overhead of control signaling is very large (i.e., a grant/assignment, a CSI report, a power headroom report (PHR), a buffer status report (BSR), etc. are necessary). This is because control signaling has no benefit for D2D communication at all.

a-2) Receiving UE Control

Receiving UE B acquires CSI on the A-to-B D2D link from an RS transmitted by transmitting UE A, determines precoding, an MCS, power control, etc., on the basis of the acquired CSI, includes the determined precoding, MCS, power control, etc., in a grant transmitted to UE A, and requests UE A to use the determined precoding, MCS, power control, etc., for Tx. Receiving UE control has merits in that no CSI report is necessary (i.e., CSI is acquired by receiving an SRS), and efficient link adaptation is possible. On the other hand, receiving UE control has a demerit in that a D2D grant channel is necessary, and a transmitting UE BSR and PHR are necessary.

a-3) Control by Transmitting UE Receiving Report of Receiving UE

Receiving UE B acquires CSI on the A-to-B D2D link from an RS transmitted by transmitting UE A, and reports the CSI to the transmitting UE. Transmitting UE A determines precoding, an MCS, power control, etc., and includes the determined precoding, MCS, power control, etc. in a grant transmitted to UE B. Transmitting UE control has merits in that no D2D grant channel is necessary, and no BSR and PHR are necessary, and has a demerit in that a D2D CSI report is necessary.

a-4) Control by Transmitting UE Receiving Simple Report of Receiving UE

Transmitting UE A may acquire CSI on the A-to-B D2D link from an RS transmitted by receiving UE B and a "no PMI reporting" report (will be described later) of UE B, and determines precoding, an MCS, power control, etc., used for Tx, on the basis of the acquired CSI. Meanwhile, this method uses channel reciprocity and thus can be used when there is no Tx-Rx path mismatch. Since the transmitting UE cannot know interference with the receiving UE, and an algorithm and performance of a receiver, the transmitting UE needs a report.

This method has merits in that overhead of a CSI report is relatively small, no D2D grant channel is necessary, and no BSR and PHR are necessary.

This method can be used for single-antenna port Tx. However, it may be necessary to check whether there is a problem of disagreement between the number of transmitting antennas and the number of receiving antennas, and according to implementation, an SRS may not be transmitted to all the receiving antennas.

Meanwhile, when this method is applied to multi-antenna port Tx, the problem of a UE Tx/Rx path mismatch may occur. Thus, it is necessary to examine the validity of whether Tx-Rx channel reciprocity can be applied due to the issue of UE calibration.

Consequently, in the case of single-antenna port Tx, control by a transmitting UE receiving a simple report of a receiving UE (a-4 method) is preferable, and in the case of multi-antenna port Tx, control by a transmitting UE receiving a report of a receiving UE (a-3 method; on the assumption that Tx/Rx channel reciprocity cannot be applied) is preferable. However, according to a configuration environment and an application example, implementation may vary from the description below.

6) Details of D2D Link Adaptation (a) Power Control Framework

In power control of a D2D link, a base station may be configured to set large-scale power control parameters for a UE, and the UE may be configured to perform small-scale power control within the set parameter ranges.

(b) Comparison Between D2D Power Control Methods

Link adaptation according to power control will be described in order of a data channel and a control channel.

b-1) Power Control and Link Adaptation of Data Channel

In semi-static power control, a Tx power is almost fixed, and a transmitting UE performs link adaptation according to CSI on a receiving UE. For accurate CSI estimation, the receiving UE should be notified of a power ratio of an RS to a data RE, and a PM RS having a fixed Tx power may be used for CSI estimation.

Figure 8:
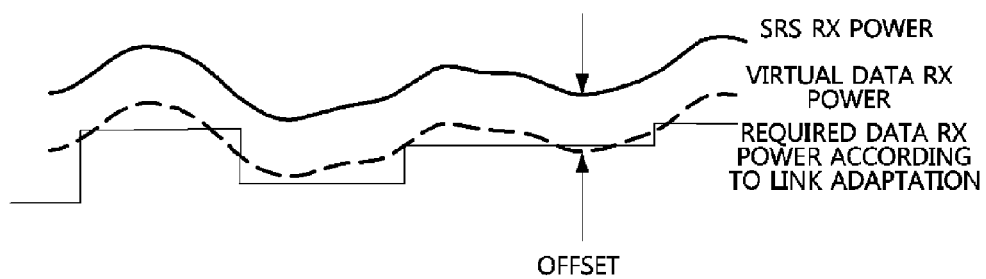
FIG. 8 is a conceptual diagram illustrating variable power control among D2D power control schemes.

FIG. 8 is a conceptual diagram illustrating variable power control among D2D power control schemes.

First, variable power control in which a receiving UE requests a transmitting UE to adjust power of the transmitting UE will be described. In this method, for accurate CSI estimation, the transmitting UE should be notified of a power ratio of an RS to a data RE, and a data-to-SRS power ratio/offset should be set in advance, such that the transmitting UE can perform Tx according to the power ratio/offset. This method may need a separate grant channel/power control command control channel (e.g., a PDCCH/EPDCCH of cellular communication). In addition, a PHR of the transmitting UE may need to be transmitted to the receiving UE.

Next, variable power control in which a transmitting UE autonomously adjusts an MCS and power with reference to a CSI report of a receiving UE will be described. In this method, the receiving UE can estimate CSI from an RS (SRS or DM-RS). To this end, the receiving UE should be notified of a power ratio/offset of an RS and a data RE.

Since it is necessary to change a Tx power due to an MCS change, a link quality change, etc., it is preferable for the transmitting UE to estimate CSI using an SRS whose Tx power is changed in connection with the Tx power of a data channel, unlike a PM RS having a fixed Tx power.

A power ratio/offset of a data RE and an SRS RE should be set in advance, and the receiving UE should be notified of the power ratio/offset. On the condition of a fixed power ratio/offset, the transmitting UE can adjust an SRS Tx power to cause a CSI report of the receiving UE to reflect a change in a data Tx rate, and adjust a power and an MCS somewhat from an ACK/NACK response of the receiving UE. Here, the receiving UE may notify the transmitting UE of a lack or surplus of power, but the notification may be inappropriate due to signaling overhead. In the case of non-adaptive Tx (resources for use and an MCS are fixed), link adaptation is performed by power control alone, and neither a separate grant channel/power control command control channel nor a PHR is necessary.

In the case of a data channel, even when a semi-static power is used in a cellular downlink, an MCS and a data Tx rate can be changed by adjusting the amount of allocated resources, but this is impossible in UE-control D2D.

Thus, in consideration of power consumption of a UE and efficient link adaptation, it is preferable to manage a data channel using a variable power. In the case of a data channel, a UE having the initiative in power control should be determined. In point-to-point (P-to-P) Tx, the initiative can be taken by either one of the UEs, but in point-to-multipoint (P-to-M) Tx, it is preferable for a transmitting UE to control power in consideration of CSI on receiving UEs. For this reason, in consideration of implementation and complexity of a standard, it is preferable for a transmitting UE to control power of a data channel.

b-2) Control Channel

Since there may be no separate CSI report on a control channel and is no HARQ, successful Rx should be ensured with one Tx. It is preferable for a UE receiving a control channel to directly request power control from a UE transmitting the control channel. Here, the transmitting UE includes a power control command for the control channel in grant information, and can change an MCS of grant information according to whether or not discontinuous Tx (DTX; failure to detect grant information) occurs. When there is no grant, a separate power control command control channel may be necessary, but is not essential.

(c) Power Control and AMC of D2D Data Channel c-1) Fixed Modulation Order-Adaptive Tx In fixed modulation order-adaptive Tx, a modulation order of D2D data is fixed at one of quadrature phase shift keying (QPSK), 16 quadrature amplitude modulation (QAM), 64 QAM, etc., in advance. Link adaptation is performed through resource allocation, a change in the size of a TB, and a change in a Tx power.

In this case, a UE transmitting data notifies a counterpart receiving UE of only the size of a TB among pieces of MCS information, through grant information.

A base station may determine a modulation order on the basis of a quality report on a D2D link of the receiving D2D UE, and notify the transmitting and receiving UEs of the determined modulation order.

c-2) Autonomous Power Control within Maximum Permissible Power

In autonomous power control within a maximum permissible power, a transmitting UE autonomously determines and uses a Tx power within a maximum permissible power. This method has a merit in that adaptive Tx can be relatively more free, and a demerit in that efficiency in interference control may deteriorate because a UE changes a Tx power in freedom.

c-3) Fixed Average Rx Power Control

A base station may make determinations on items below in consideration of situations of transmitting and receiving UEs, and notify the corresponding UE of the determinations.

D2D resource allocation

Average required Rx power $P_0$ in which an average Tx rate is taken into consideration. Here, the average required Rx power $P_0$ can be determined through consultation among the base station and the transmitting and receiving UEs.

Setup of a maximum available Tx power $P_{D2D\text{-}MAX}$ that can be used by the transmitting UE An SRS-to-PUSCH power ratio/offset. This value may be determined by a D2D data-receiving or -transmitting UE.

Figure 9:
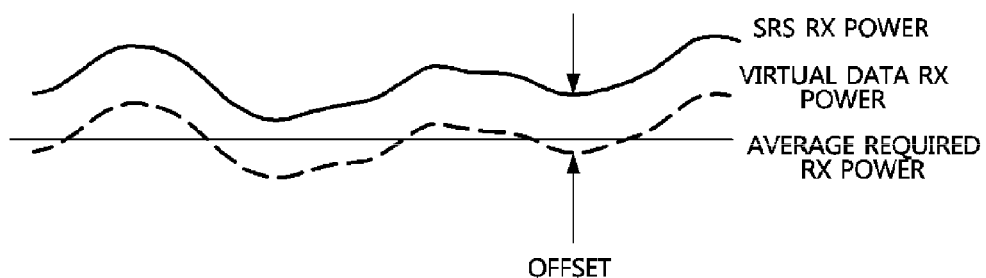
FIG. 9 is a conceptual diagram illustrating fixed average Rx power control among D2D power control schemes.

FIG. 9 is a conceptual diagram illustrating fixed average Rx power control among D2D power control schemes.

Meanwhile, a receiving UE may be configured to periodically report CSI corresponding to a current Rx power to a transmitting UE, and the transmitting UE may control D2D-SRS and D2D-PUSCH Tx power according to $P_0$ and a power ratio/offset, and perform link adaptation according to short-term channel switching on the basis of the CSI reported by the receiving UE. Here, the transmitting UE may be configured to control power within a limited range.

(d) Details of D2D Power Control d-1) Estimation of Path Loss of D2D Link

For open-loop power control, a UE may need to estimate path loss of a D2D link. The UE may measure an RSRP from an RS of a counterpart UE, and compare an RS Tx power value that has been transmitted from a base station to the UE itself in advance with a received power value, thereby calculating path loss of a D2D link. An RS used for PM may be used for estimation of path loss.

When the UE calculates a downlink path loss, a D2D link path loss $PL_{D2D,c}$ is given by Equation 3 below.

$$PL_{D2D,c} = \text{referenceSignalPower} - \text{higher layer filtered RSRP (dB)} \quad \text{[Equation 3]}$$

Here, an RS energy per RE (EPRE) value is used as referenceSignalPower, and RSRP measurement is performed on the same RS.

d-2) Power Control by Base Station

When a base station performs power control, the power control may be performed as described below according to channels and signals.

(In Case of D2D-PUSCH)

First, when a UE only transmits a D2D-PUSCH without transmitting a D2D-PUCCH in serving cell c, a Tx power $P_{D2D\text{-}PUSCH,\,c}(i)$ of the D2D-PUSCH in subframe i of serving cell c is determined using Equation 4 below.

$$P_{D2D\text{-}PUSCH,c}(i) = \min \begin{cases} P_{D2D\text{-}CMAX,c}(i), \\ 10\log_{10}(M_{D2D\text{-}PUSCH,c}(i)) + P_{O\_D2D\text{-}PUSCH,c}(j) + \\ \alpha_{D2D,c}(j) \cdot PL_{D2D,c} + \Delta_{TF,c}(i) + f_{D2D,c}(i) \end{cases} \quad \text{[Equation 4]}$$

$M_{D2D\text{-}PUSCH,\,c}(i)$ is the number of RBs indicating a bandwidth of D2D-PUSCH resources allocated to subframe i of serving cell c.

$P_{O\_D2D\text{-}PUSCH,\,c}(j)$ is given as the sum of $P_{0\text{-}NOMINAL\_D2D\text{-}PUSCH,c}(j)$ and $P_{0\_UE\_D2D\text{-}PUSCH,\,c}(j)$ (j=0, 1, and 2). Each value is given to the UE by the base station.

$PL_{D2D,c}$ is an estimated path loss of a D2D link, which is obtained by the UE through measurement of an RS of a counterpart UE.

A value of $\alpha_{D2D,c}(j)$ is given to the UE by the base station when j=0 or 1. Here, $\alpha_{D2D,}(2)=1$.

$\Delta_{TF,c}(i)$ is set to 0 when it is not used according to a determination of the base station, and is a value determined according to a data Tx format when it is used.

$f_{D2D,c}(i)$ is determined by a power control command delivered to the UE by the base station.

Next, when the UE simultaneously transmits a D2D-PUCCH and a D2D-PUSCH in serving cell c, a Tx power $P_{D2D\text{-}PUSCH,\,c}(i)$ of the D2D-PUSCH in subframe i of serving cell c may be determined using Equation 5 below.

$$P_{D2D\text{-}PUSCH,c}(i) = \min \begin{cases} 10\log_{10}(P_{D2D\text{-}CMAX,c}(i) - \hat{P}_{D2D\text{-}PUCCH}(i)), \\ 10\log_{10}(M_{D2D\text{-}PUSCH,c}(i)) + P_{O\_D2D\text{-}PUSCH,c}(j) + \\ \alpha_{D2D,c}(j) \cdot PL_{D2D,c} + \Delta_{TF,c}(i) + f_{D2D,c}(i) \end{cases} \quad \text{[Equation 5]}$$

Here, $\hat{P}_{D2D\text{-}CMAX,c}(i)$ is a linear value of $P_{D2D\text{-}PUCCH}(i)$.

When the UE transmits no D2D-PUSCH in serving cell c, for accumulative application of a transmit power control (TPC) command received in a DCI format, it is assumed that the D2D-PUSCH Tx power of the UE in subframe i of serving cell c is calculated using Equation 6 below.

$$P_{D2D\text{-}PUSCH,c}(i) = \min\{P_{D2D\text{-}CMAX,c}(i), P_{0\_D2D\text{-}PUSCH,c}(1) + \alpha_{D2D,c}(1) \cdot PL_{D2D,c} + f_{D2D,c}(i)\} \quad \text{[Equation 6]}$$

$P_{D2D\text{-}CMAX,c}$ (i) is determined by the UE with a back-off provided not to exceed a maximum Tx power value $P_{D2D\text{-}MAX}$ set by the base station, or determined by the UE itself in consideration of a maximum allowable Tx power value of the UE.

(In Case of D2D-PUCCH)

In subframe i of serving cell c, a Tx power $P_{D2D\text{-}PUCCH,c}(i)$ of a D2D-PUCCH may be determined using Equation 7 below.

$$P_{D2D-PUCCH}(i) = \min \begin{cases} P_{D2D-CMAX,c}(i), \\ P_{0\_D2D\text{-}PUCCH} + PL_{D2D,c} + h(n_{CQI}, n_{HARQ}, n_{SR}) + \\ \Delta_{F\_PUCCH}(F) + \Delta_{TxD}(F') + g_{D2D,c}(i) \end{cases} \quad \text{[Equation 7]}$$

$P_{D\_D2D\text{-}PUCCH}$ is given as the sum of $P_{0\_NOMINAL\_D2D\_PUCCH,c}$ and $P_{0\_UE\_D2D\_PUCCH,c}$. Each value is given to the UE by the base station.

$\Delta_{F\_PUCCH}$ (F) is 0 when D2D-PUCCH Tx is not configured to use two antenna ports, and is a value delivered from the base station to the UE when the D2D-PUCCH Tx is configured to use two antenna ports.

$h(n_{CQI}, n_{HARQ}, n_{SA})$ is a value determined according to a D2D-PUCCH format.

$g_{D2D,c}(i)$ is determined by a power control command delivered to the UE by the base station.

When the UE transmits no D2D-PUCCH in serving cell c, for accumulative application of a TPC command received in DCI format 3/3A, it is assumed that the D2D-PUCCH Tx power $P_{D2D\text{-}PUSCH,c}(i)$ of the UE in subframe i of serving cell c is calculated using Equation 8 below.

$$P_{D2D\text{-}PUSCH}(i) = \min\{P_{D2D\text{-}CMAX,c}(i), P_{0\_D2D\text{-}PUSCH} + PL_{D2D,c} + g_{D2D,c}(i)\}[\text{dBm}] \quad \text{[Equation 8]}$$

(In Case of D2D-SRS)

Here, a D2D-SRS denotes an RS that is used for a receiving UE to estimate CSI on a D2D link. In the case of a D2D-SRS, a Tx power $P_{D2D\_SRS,c}$ (i) in subframe i of serving cell c is determined using Equation 9 below.

$$P_{D2D-SRS,c}(i) = \min \begin{cases} P_{D2D-CMAX,c}(i), \\ P_{SRS\_OFFSET,c}(m) + 10\log_{10}(M_{D2D-SRS,c}) + \\ P_{0\_D2D\text{-}PUSCH,c}(j) + \alpha_{D2D,c}(j) \cdot PL_{D2D,c} + f_{D2D,c}(i) \end{cases} \quad \text{[Equation 9]}$$

$P_{SRS\_OFFSET,c}(m)$ is determined by the base station and transmitted to a D2D-SRS-transmitting UE, and the base station should also notify a D2D-SRS-receiving UE of $P_{SRS\_OFFSET,c}(m)$ such that the D2D-SRS-receiving UE can estimate CSI on a D2D link. Since $P_{D2D-SRS,c}(i)$ always has a difference of $P_{SRS\_OFFSET,c}(m)$ compared to $P_{D2D-PUSCH,c}(i)$, the D2D-SRS-receiving UE can estimate a power of data resources in consideration of $P_{SRS\_OFFSET,c}(m)$, after estimating a channel using a D2D-SRS, and thus can calculate CSI on the data resources.

d-3) Partial Power Control by UE

Partial power control methods by a UE may be classified into a method of maintaining a fixed average Rx power and a method of autonomously controlling power within a maximum permissible power.

First, as the method of maintaining a fixed average Rx power, a channel- and signal-specific power control method will be described.

(In Case of D2D-PUSCH)

First, when only a D2D-PUSCH is transmitted, a D2D-PUSCH Tx power $P_{D2D-PUSCH,c}(i)$ in subframe i of serving cell c of the UE may be determined using Equation 10 below.

$$P_{D2D-PUSCH,c}(i) = \min \begin{cases} P_{D2D-CMAX,c}(i), \\ 10\log_{10}(M_{D2D-PUSCH,c}(i)) + P_{0\_D2D-PUSCH,c}(j) + \\ \alpha_{D2D,c}(j) \cdot PL_{D2D,c} + f_{D2D,c}(i) \end{cases} \quad \text{[Equation 10]}$$

$M_{D2D-PUSCH,c}(i)$ is the number of RBs indicating a bandwidth of D2D-PUSCH resources allocated to subframe i of serving cell c.

$PL_{D2D,c}$ is an estimated path loss of a D2D link, which is obtained by the UE through measurement of an RS of a counterpart UE.

$P_{0\_D2D-PUSCH,c}(j)$ is set for the UE by a base station (or the receiving UE). $P_{D2D-CMAX,c}$ (i) is determined by the UE with a back-off provided not to exceed a maximum Tx power value $P_{D2D-MAX}$ set by the base station. $\delta_{D2D,c}(i)$ is set as $f_{D2D,c}(i)=0$ according to the fixed average Rx power maintenance method, or has a limited range that has been determined in advance or is determined by setting of the base station according to a method in which a transmitting UE autonomously makes a determination.

$\alpha_{D2D,c}(j)$ may be set to 1, or set to another value by the base station.

Next, when a D2D-PUSCH and a D2D-PUCCH are simultaneously transmitted, a D2D-PUSCH Tx power $P_{D2D-PUCCH}$ (i) in subframe i of serving cell c of a UE may be determined using Equation 11 below.

$$P_{D2D-PUSCH,c}(i) = \min \begin{cases} 10\log_{10}(\hat{P}_{D2D-CMAX,c}(i) - \hat{P}_{D2D-PUCCH}(i)), \\ 10\log_{10}(M_{D2D-PUSCH,c}(i)) + P_{0\_D2D-PUSCH,c}(j) + \\ \alpha_{D2D,c}(j) \cdot PL_{D2D,c} + f_{D2D,c}(i) \end{cases} \quad \text{[Equation 11]}$$

In the above equation, $\hat{P}_{D2D-CMAX,c}$ (i) is a linear value of $P_{D2D\_PUCCH}$ (i).

(In Case of D2D-PUCCH)

In a method in which a transmitting UE performs power control, a D2D-PUCCH Tx power $P_{D2D-PUCCH}$ (i) in a subframe i of serving cell c of the UE may be determined using Equation 12 below.

$$P_{D2D-FUCCH}(i) = \min \begin{cases} P_{D2D-CMAX,c}(i), \\ P_{0\_D2D-PUCCH} + PL_{D2D,c} + h(n_{CQI}, n_{HARQ}, n_{SR}) + \\ \Delta_{F\_D2D-PUCCH}(F) + \Delta_{TxD}(F') + g_{D2D,c}(i) \end{cases} \quad \text{[Equation 12]}$$

Here, $P_{0\_D2D\text{-}PUCCH}$ is set by the base station or a D2D-PUCCH receiving UE.

$P_{D\_D2D\text{-}PUCCH}$ is given as the sum of $P_{0\_NOMINAL\_D2D\text{-}PUCCH,\ c}$ and $P_{0\_UE\_D2D\text{-}PUCCH,\ c}$. Each value is set by the base station or the D2D-PUCCH receiving UE.

$\Delta_{TxO}(F')$ is 0 when D2D-PUCCH Tx is not configured to use two antenna ports, and is a value transmitted from the base station to the UE when the D2D-PUCCH Tx is configured to use two antenna ports.

$h(h_{CQI}, n_{HARQ}, n_{SA})$ is a value determined according to a D2D-PUCCH format.

$g_{D2D,c}(i)$ is determined by a power control command from the counterpart UE. In the case of a D2D-PUCCH, a power control command is received from a counterpart UE receiving the D2D-PUCCH to determine a Tx power. When the UE is configured not to receive a power control command from the receiving UE, $g_{D2D,c}(i)=0$.

(In Case of D2D-SRS)

Here, a D2D-SRS denotes an RS that is used for a receiving UE to estimate CSI on a D2D link. In the case of a D2D-SRS, a Tx power $P_{D2D\text{-}SRS,\ c}(i)$ in subframe i of serving cell c may be determined using Equation 13 below.

$$P_{D2D\text{-}SRS,c}(i) = \min \begin{Bmatrix} P_{D2D\text{-}CMAX,c}(i), \\ P_{SRS\_OFFSET,c}(m) + 10\log_{10}(M_{D2D\text{-}SRS,c}) + \\ P_{O\_D2D\text{-}PUSCH,c}(i) + \alpha_{D2D,c}(i) \cdot PL_{D2D} + f_{D2D,c}(i) \end{Bmatrix}$$ [Equation 13]

Here, $M_{D2d\text{-}SRS,\ c}$ is the number of RBs indicating a bandwidth of D2D-SRS resources allocated to subframe i of serving cell c.

$f_{D2D,c}(i)$ is set to 0 in the fixed average Rx power maintenance method, or has a limited range that has been determined in advance or is determined by setting of a base station.

$P_{SRS\_OFFSET,c}(m)$ is determined by the base station and transmitted to a D2D-SRS-transmitting UE, and the base station should also notify a D2D-SRS-receiving UE of $P_{SRS\_OFFSET,c}(m)$ such that the D2D-SRS-receiving UE can estimate CSI on a D2D link. Since $P_{D2D\text{-}SRS,c}(i)$ always has a difference of $P_{SRS\_OFFSET,c}(m)$ compared to $P_{D2D\text{-}PUSCH,c}(i)$ the D2D-SRS-receiving UE can estimate a power of data resources in consideration of $P_{SRS\_OFFSET,c}(m)$ after estimating a channel using a D2D-SRS, and thus can calculate CSI on the data resources.

Next, the method of autonomously controlling power within a maximum permissible power will be described according to channels and signals.

(In Case of D2D-PUSCH)

When only a D2D-PUSCH is transmitted in the method in which a transmitting UE performs power control, a D2D-PUSCH Tx power $P_{D2D\text{-}PUSCH,\ c}(i)$ in subframe i of serving cell c of the UE is determined using Equation 14 below.

$$P_{D2D\text{-}PUSCH,c}(i) = \min \begin{Bmatrix} P_{D2D\text{-}CMAX,c}(i), \\ 10\log_{10}(M_{D2D\text{-}PUSCH,c}(i)) + \alpha_{D2D,c}(i) \cdot PL_{D2D} + \\ f_{D2D,c}(i) \end{Bmatrix}$$ [Equation 14]

$M_{D2D\text{-}PUSCH,\ c}(i)$ is the number of RBs indicating a bandwidth of D2D-PUSCH resources allocated to subframe i of serving cell c.

$PL_{D2D,c}$ is an estimated path loss of a D2D link, which is obtained by the UE through measurement of an RS of a counterpart UE.

$P_{O\_D2D\text{-}PUSCH,\ c}(j)$ is set for the UE by a base station (or a receiving UE). $P_{D2D\text{-}CMAX,c}(i)$ is determined by the UE with a back-off provided not to exceed a maximum Tx power value $P_{D2D\text{-}MAX}$ set by the base station.

$\alpha_{D2D,\ c}(j)$ may be set to 1, or set to another value by the base station.

$f_{D2D,\ c}(i)$ is autonomously set by the transmitting UE in autonomous power control.

When a D2D-PUSCH and a D2D-PUCCH are simultaneously transmitted in the method in which a transmitting UE performs power control, a D2D-PUSCH Tx power $P_{D2D\text{-}PUCCH}(i)$ in subframe i of serving cell c of the UE may be determined using Equation 15 below.

$$P_{D2D\text{-}PUSCH,c}(i) = \min \begin{Bmatrix} 10\log_{10}(\hat{P}_{D2D\text{-}CMAX,c}(i) - \hat{P}_{D2D\text{-}PUCCH}(i)), \\ 10\log_{10}(M_{D2D\text{-}PUSCH,c}(i)) + \alpha_{D2D,c}(i) \cdot \\ PL_{D2D,c} + f_{D2D,c}(i) \end{Bmatrix}$$ [Equation 15]

In the above equation, $\hat{P}_{D2D\text{-}CMAX,\ c}(i)$ is a linear value of $P_{D2D\text{-}PUCCH}(i)$.

(In Case of D2D-PUCCH)

In the method in which a transmitting UE performs power control, a D2D-PUCCH Tx power $P_{D2D\text{-}PUCCH}(i)$ in subframe i of serving cell c of the UE may be determined using Equation 16 below.

$$P_{D2D\text{-}PUCCH,c}(i) = \min \begin{Bmatrix} P_{D2D\text{-}CMAX,c}(i), \\ P_{O\_D2D\text{-}PUSCH,c}(i) + PL_{D2D} + h(n_{CQI}, n_{HARQ}, n_{SR}) + \\ \Delta_{F\_D2D+PUCCH}(F) + \Delta_{TxD}(F') + g_{D2D,c}(i) \end{Bmatrix}$$ [Equation 16]

Here, $P_{0\_D2D\text{-}PUCCH}$ is set by a base station or a D2D-PUCCH receiving UE.

$P_{0\_D2D\text{-}PUCCH}$ is given as the sum of $P_{0\_NOMINAL\_D2D\text{-}PUCCH,\ c}$ and $P_{0\_UE\_D2D\text{-}PUCCH,\ c}$. Each value is set by the base station or the D2D-PUCCH receiving UE.

$\Delta_{TxO}(F')$ is 0 when D2D-PUCCH Tx is not configured to use two antenna ports, and is a value transmitted from the base station to the UE when the D2D-PUCCH Tx is configured to use two antenna ports.

$h(n_{CQI}, n_{HARQ}, n_{SA})$ is a value determined according to a D2D-PUCCH format.

$g_{D2D,\ c}(i)$ is determined by a power control command from the counterpart UE. In the case of a D2D-PUCCH, a power control command is received from a counterpart UE receiving the D2D-PUCCH to determine a Tx power. When the UE is configured not to receive a power control command from the receiving UE, $g_{D2D,\ c}(i)=0$.

(In Case of D2D-SRS)

Here, a D2D-SRS denotes an RS that is used for a receiving UE to estimate CSI on a D2D link. In the case of a D2D-SRS, a Tx power $P_{D2D\text{-}SRS,\ c}(i)$ in subframe i of serving cell c may be determined using Equation 17 below.

$$P_{D2D\text{-}SRS,c}(i) = \min \begin{Bmatrix} P_{D2D\text{-}CMAX,c}(i), \\ P_{SRS\_OFFSET,c}(m) + 10\log_{10}(M_{D2D\text{-}SRS,c}) + \\ P_{O\_D2D\text{-}PUSCH,c}(i) + \alpha_{D2D,c}(i) \cdot PL_{D2D} + f_{D2D,c}(i) \end{Bmatrix} \quad \text{[Equation 17]}$$

Here, $M_{D2D\text{-}SRS,\ c}$ is the number of RBs indicating a bandwidth of D2D-SRS resources allocated to subframe i of serving cell c.

$f_{D2D,\ c}(i)$ is autonomously set by a transmitting UE in autonomous power control, but should be the same value as in the D2D-PUSCH Tx power equation.

$P_{SRS\_OFFSET,\ c}(m)$ is determined by a base station and transmitted to a D2D-SRS-transmitting UE, and the base station should also notify a D2D-SRS-receiving UE of $P_{SRS\_OFFSET,\ c}(m)$ such that the D2D-SRS-receiving UE can estimate CSI on a D2D link. Since $P_{D2D\text{-}SRS,\ c}(i)$ always has a difference of $P_{SRS\_OFFSET,\ c}(m)$ compared to $P_{D2D\text{-}PUSCH,\ c}(i)$, the D2D-SRS-receiving UE can estimate a power of data resources in consideration of $P_{SRS\_OFFSET,\ c}(m)$ after estimating a channel using a D2D-SRS, and thus can calculate CSI on the data resources.

(e) Power Headroom Report (PHR)

When a receiving UE performs power control and controls link adaptation, a transmitting UE transmits a PHR to the receiving UE. For the PHR, only a D2D link should be taken into consideration, and a maximum power should be determined on the basis of a value set by a base station. Meanwhile, when the transmitting UE performs power control of a data channel, a PHR on the receiving UE may be unnecessary.

(f) Buffer Status Report (BSR)

When a receiving UE performs power control and controls link adaptation, a transmitting UE transmits a BSR to the receiving UE. The BSR is transmitted in a D2D-PUSCH of the UE. Meanwhile, when the transmitting UE performs power control and controls link adaptation, a BSR on the receiving UE may be unnecessary.

7) D2D L1/L2 Control Signaling

L1/L2 control information for D2D communication is transmitted using all or some of subframes in which Tx resources set by a base station are present. L1/L2 control signalings according to D2D communication may be classified into an L1/L2 control signaling transmitted to a counterpart UE with D2D data by a UE transmitting the D2D data, and an L1/L2 control signaling transmitted to a counterpart transmitting UE by a UE receiving data.

First, the L1/L2 control signaling transmitted to a counterpart UE with D2D data by a UE transmitting the D2D data may include grant information, and the grant information may include all or some of the following pieces of information:

The number of Tx layers (necessary in the case of multi-antenna port Tx)

A modulation and coding and a redundancy version (RV): Here, a modulation order, a TB size, and an RV may be provided according to codewords.

A new data indicator (NDI)

Whether or not the grant information (L1/L2 control signaling?) is a first Tx in an HARQ process (one bit per codeword)

A TPC command for a D2D-PUCCH. This is a power control command for a D2D-PUCCH transmitted by a counterpart UE, and can consist of two bits.

DM-RS CS and orthogonal cover code (OCC) indices. When a base station sets a DM-RS CS and an OCC for the UE, this piece of information may not need to be included.

Next, the L1/L2 control signaling transmitted to a counterpart transmitting UE by a UE receiving data may include all or some of the following pieces of information.

(D2D-HARQ ACK Information)

An ACK/NACK of D2D data Tx of a counterpart UE. This can consist of one bit or two bits.

(D2D-Scheduling Request (SR) Information)

This is a signaling used for a UE to which data Tx resources are not allocated to request data resource allocation from a counterpart UE.

(D2D CSI)

CSI on D2D resources allocated as Rx resources. For example, CSI may only include CQI and consist of four bits in the case of a single antenna port, and may include codeword #0 CQI, codeword #1 CQI, and rank and precoding information, and may consist of 11 bits when two antenna ports are used. When four antenna ports are used, CSI may include codeword #0 CQI, codeword #1 CQI, and rank and precoding information, and consist of 14 bits.

(a) Multiplexing of D2D Control Information and Data

Multiplexing of D2D control information and data may be performed in three ways.

FIG. 10 to FIG. 12 are subframe diagrams showing examples of multiplexing schemes of D2D control information and data.

FIG. 10 shows an example of a multiplexing scheme of only transmitting a D2D control channel, FIG. 11 shows an example of a multiplexing scheme of simultaneously transmitting a D2D control channel and a D2D data channel, and FIG. 12 shows an example of a multiplexing scheme of inserting D2D control information in a D2D control channel.

(b) D2D Grant Information Tx Format

When there is no other Tx in a subframe in which grant information is transmitted (FIG. 10), or grant information is simultaneously transmitted together with a separate D2D-PUSCH using a D2D-PUCCH (FIG. 11), PUCCH format 3 consisting of 48 coded bits or PUCCH format 2 consisting of 20 coded bits may be used. As channel coding for control information, convolutional or block coding may be used, and a shortened format or a further shortened format may be used to ensure a switching time period. A base station may be configured to allocate Tx resources.

When grant information is transmitted together in PUSCH Tx resources (FIG. 12), some of the PUSCH Tx resources may be occupied by L1/L2 control information. As channel coding, convolutional or block coding should be applied, and independent codewords should be formed. When the L1/L2 control information is inserted into OFDM symbols neighboring a DM RS, a reception success rate can be increased.

In the case of single carrier frequency division multiple access (SC-FDMA) Tx, L1/L2 control information may be modulated with the same modulation order as data. Thus, the amount of resources occupied by control information is determined by an MCS of the data, and in this case, the MCS information is applied to next data Tx and subsequent Tx.

In the case of OFDM Tx, modulation of L1/L2 control information may be fixed at QPSK. For link adaptation, it is possible to change a power and resource size of grant information. From among a plurality of resource amounts occupied by the grant information for link adaptation, a transmitting UE determines one resource amount and performs Tx. A receiving UE performs blind detection of grants corresponding to a plurality of resource amounts available for grant detection. In terms of use of electric power, it is advantageous that grant information is frequency-division multiplexed with data, and occurrence of decoding latency may be a problem.

(c) D2D HARQ-ACK Tx Format

When there is no D2D PUSCH Tx in a subframe in which D2D-HARQ ACK information is transmitted (FIG. 10), or D2D-HARQ ACK information is simultaneously transmitted together with a D2D-PUSCH using a separate D2D-PUCCH (FIG. 11), PUCCH format 1a may be used in the case of a HARQ ACK bit being one bit, and PUCCH format 1b may be used in the case of the HARQ ACK bit being two bits. At this time, a shortened format or a further shortened format may be used to ensure a switching time period.

When D2D-HARQ ACK information is transmitted together in PUSCH Tx resources (FIG. 12), repetition coding may be applied, and the amount of resources is determined according to an MCS. By positioning D2D-HARQ ACK information around a DM RS, a reception success rate can be increased. In the case of SC-FDMA Tx, D2D-HARQ ACK information may be modulated with the same modulation order as data.

(d) D2D Power Control Command Tx Format

A case in which a target channel of a power control command is a D2D-PUCCH (e.g., a D2D-HARQ ACK, or D2D-CSI) will be described.

When there is no other Tx in a subframe in which a power control command is transmitted (FIG. 10), or a power control command is simultaneously transmitted together with a D2D-PUSCH using a separate D2D-PUCCH (FIG. 11), the power control command may be transmitted as follows.

The power control command may not be transmitted, or transmitted using an additional Tx format. A power control command of one bit is transmitted using PUCCH format 1a, and a power control command of two bits is transmitted using PUCCH format 1b. Resources used for power control command Tx may be allocated by a base station.

Next, when the power control command is transmitted together in PUSCH Tx resources (FIG. 12), the power control command may be included in grant information, and encoded, modulated and transmitted together.

(e) D2D CSI Tx Format

When there is no other Tx in a subframe in which D2D-CSI is transmitted (FIG. 10), or D2D-CSI is simultaneously transmitted together with a D2D-PUSCH using a separate D2D-PUCCH (FIG. 11), the D2D-CSI may be transmitted using PUCCH format 2 or format 3. Resources (a period, an offset, and positions of resources for use) used for D2D-CSI reporting may be allocated by a base station.

When D2D-CSI is transmitted together in PUSCH Tx resources (FIG. 12), the D2D-CSI may be encoded, modulated and transmitted together with grant information.

(f) Classification of Simultaneous Tx

Cellular link (data and a control channel) Tx and D2D link (data and a control channel) Tx may be configured not to occur in the same uplink subframe. Here, cellular link Tx and D2D link Tx are made to not occur in the same uplink subframe except for an SRS.

Tx forms of data and control information in D2D communication are classified as described below according to multiplexing of the data and the control information on a time axis.

(Control Information Tx by Receiving UE in One-Way D2D Communication)

A D2D-CSI report is positioned in a D2D HARQ ACK Tx subframe if possible, and a D2D-CSI report period and a subframe offset are in accordance with a configuration.

Control information transmitted by a UE receiving D2D data to a counterpart UE is a D2D-HARQ ACK, D2D-CSI, and so on. A Tx form that can be transmitted in an uplink subframe in which Tx occurs from the viewpoint of a D2D data receiving UE may be one of a D2D-HARQ ACK, D2D-CSI+D2D-HARQ ACK, and D2D-CSI.

(Control Information Tx by UE in Two-Way D2D Communication)

A D2D-CSI report is positioned in a Tx subframe of a UE for data and a D2D HARQ ACK if possible, and a D2D-CSI report period and a subframe offset are in accordance with a configuration.

In two-way D2D communication, two D2D UEs transmit data, and Tx forms of an uplink subframe in which Tx occurs may be classified as described below. Among pieces of control information, a grant has a characteristic that it is always transmitted in the same subframe as data that is transmitted.

In a subframe in which data is transmitted, one Tx form may be used among (data+grant), (data+grant)+D2D-HARQ ACK, (data+grant)+D2D-CSI, and (data+grant)+D2D-CSI+D2D-HARQ ACK.

In a subframe in which no data is transmitted, one Tx form may be used among D2D-HARQ ACK, D2D-CSI+D2D-HARQ ACK, and D2D-CSI.

8) Change of PUCCH Tx Format According to Simultaneous Tx and Rx

When no additional Tx format is used for a power control command, simultaneous Tx cases as described below occur, and a PUCCH Tx format may be changed in each case.

(In Case of D2D-CSI+D2D-HARQ ACK)

PUCCH format 2+PUCCH format 1a->use PUCCH format 2a

PUCCH format 2+PUCCH format 1b->use PUCCH format 2b

PUCCH format 3+PUCCH format 1a->add 1 bit to information bits of PUCCH format 3

PUCCH format 3+PUCCH format 1b->add 2 bits to information bits of PUCCH format 3

(In Case of (D2D-CSI and D2D HARQ ACK Rx)+SRS Tx)

An effect may be exerted on a D2D Tx format. For example, there may be a need of a Tx format that uses neither OFDM symbol #5 nor #6 in a second slot.

(In Case of (D2D-CSI and D2D HARQ ACK Tx)+SRS Rx)

An effect may be exerted on a D2D link Tx format. For example, there may be a need of a Tx format that uses neither OFDM symbol #5 nor #6 in a second slot.

An effect may be exerted on a cellular link Tx format. For example, there may be a need of a Tx format that does not use OFDM symbol #0 in a first slot.

9) D2D Data Rx Process of UE

In a subframe in which a data channel (D2D-PUSCH) is transmitted, grant information may be transmitted together. A process in which a UE receives grant information and data is as follows:

First, a UE detects grant information from subframe n in which data is transmitted.

When grant detection fails, the UE transmits no ACK/NACK information (DTX).

When grant detection succeeds, the UE demodulates the data according to the grant information, and transmits ACK/NACK information on the data in subframe n+k (k is a positive integer).

A part (an MCS and the number of Tx layers) of grant information may be applied at the next data Tx time point and thereafter. When control information and data is transmitted in one data channel by SC-FDMA Tx, it is preferable for a control information symbol to have the same modulation order as a data symbol because it is possible to have a low peak-to-average power ratio (PAPR). For efficient link adaptation of control information including grant information, it is preferable to design the amount of resources occupied by the control information to change according to an MCS of data. In this case, a receiving UE should know MCS information in advance of data Tx to demodulate the data and the control information. In this case, grant information detection may fail, and data demodulation may succeed. To distinguish this case, the following method may be applied. In addition to an ACK/NACK of data, whether grant detection has succeeded or failed is reported. For example, by extending a bit-width of an ACK/NACK, it is possible to additionally indicate whether grant detection has succeeded or failed. Alternatively, it is possible to indicate whether or not grant detection has succeeded or failed using additional resources, and transmit the resources.

When an MCS among pieces of grant information is applied to data to be transmitted next time and subsequent data, a process in which a UE receives data is as follows:

The UE demodulates the data and the grant information in subframe n in which the data is transmitted.

The UE transmits only information about whether data demodulation has succeeded or failed, or information about whether data demodulation has succeeded or failed and information about whether grant Rx has succeeded or failed, in subframe n+k (k is a positive integer) to a counterpart UE.

10) Control Information Tx and Rx Process (a) Constitution of Grant Information

As described above, grant information may have the following elements:

The number of Tx layers
Codeword-specific NDIs
Codeword-specific RVs
Codeword-specific MCSs
A TPC command for a D2D-PUCCH In the case of single-antenna port Tx, the number of Tx layers is always one, and thus information on the number of Tx layers is necessary only for the case of multi-antenna port Tx. It is assumed that a mapping relationship between Tx layers and codewords has been determined in advance. In the case of Tx in which an MCS is fixed, MCS information may not be transmitted. Also, a TPC command for a D2D-PUCCH may not be transmitted according to a configuration.

(b) Control Information Tx in Subframe in which there is No D2D-PUSCH Tx

In a subframe in which there is no D2D-PUSCH Tx, control information is transmitted using a method as described below.

FIG. 13 is a table illustrating a control information Tx method in a subframe in which there is no D2D-PUSCH Tx.

When only D2D-CSI is transmitted, the control information is transmitted using PUCCH format 2, and resources for use are allocated by a base station. Here, the D2D-CSI denotes CSI on allocated D2D resources.

When only a D2D-HARQ ACK is transmitted, the control information is transmitted using PUCCH format 1a in the case of an ACK/NACK being one bit, and PUCCH format 1b in the case of the ACK/NACK being two bits. Resources for use are allocated by the base station.

When only a D2D-SR is transmitted, the control information is transmitted using PUCCH format 1. Resources for use are allocated by the base station.

When D2D-CSI and a D2D-HARQ ACK are transmitted together, the control information is transmitted using PUCCH format 2a in the case of an ACK/NACK being one bit, and PUCCH format 2b in the case of the ACK/NACK being two bits. Resources for use are allocated by the base station.

When D2D-CSI and a D2D-SR are transmitted together, the D2D-CSI is not transmitted, but only the D2D-SR is transmitted in D2D-SR Tx resources using PUCCH format 1.

When a D2D-SR and a D2D-HARQ ACK are transmitted together, the control information is transmitted using PUCCH format 1a in the case of an ACK/NACK being one bit, and PUCCH format 1b in the case of the ACK/NACK being two bits, and SR Tx resources are used as resources for use.

(c) Control Information Tx in Subframe in which there is D2D-PUSCH Tx

Methods of transmitting control information in a subframe in which there is D2D-PUSCH Tx include a method of inserting the control information in a D2D-PUSCH (method 1) and a method of transmitting the control information using a separate grant channel (method 2).

(Method 1: Insert Control Information in D2D-PUSCH)

According to the method of inserting control information in a D2D-PUSCH and transmitting the control information, it is necessary to determine the amount and positions of resources occupied by each piece of control information when the control information is inserted into a D2D-PUSCH and transmitted. The amount of resources occupied by control information in a subframe in which a D2D-PUSCH is transmitted is determined according to resource allocation, MCS information, and information on the number of Tx layers. Thus, a receiving UE can calculate the amount of resources occupied by control information from resource allocation information, and MCS information and the number of Tx layers included in grant information.

Figure 15:
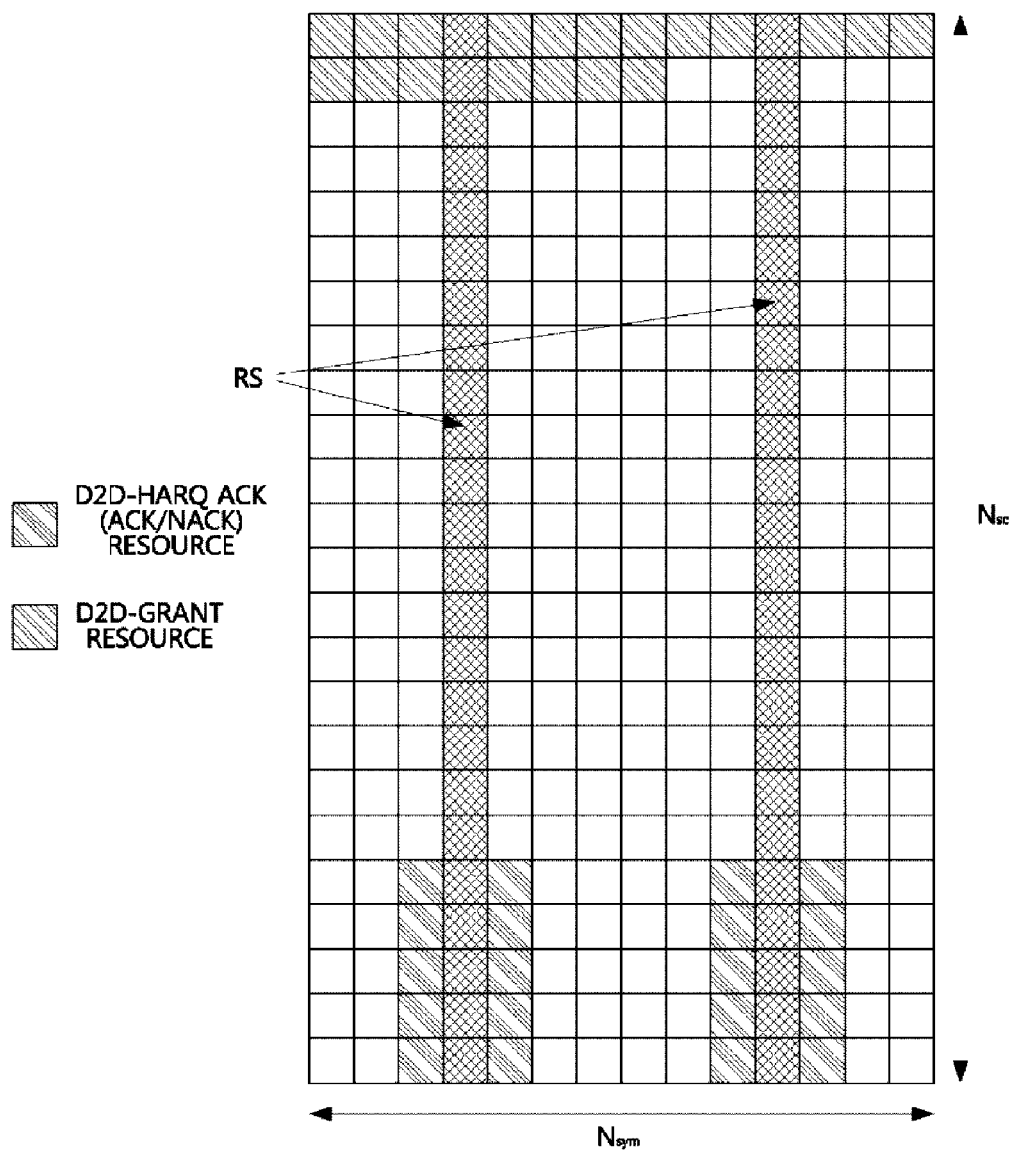

FIG. 14 and FIG. 15 are constitution diagrams of subframes illustrating mapping of resources used to transmit respective pieces of control information when the control information is inserted into a D2D-PUSCH and transmitted.

In the case of resource mapping for control information, when the control information is transmitted in a subframe in which there is a D2D-PUSCH, all the pieces of control information including grant information may be inserted into the D2D-PUSCH and transmitted.

When D2D-HARQ ACK information is transmitted, the D2D-HARQ ACK information occupies resources positioned around an RS.

When D2D-RI information is transmitted, the RI information occupies resources positioned around resources to which D2D-HARQ ACK information is mapped.

When D2D-CQI/PMI information is transmitted, the D2D-CQI/PMI information is sequentially mapped to resources in a left-to-right direction beginning with a first resource (the leftmost and uppermost resource in a subframe exemplified in FIG. 14). When all resources in the uppermost row are used, the D2D-CQI/PMI information is sequentially mapped to resources again in the left-to-right direction beginning with the leftmost resource in the second uppermost row. This is repeated until resource mapping ends.

When grant information and D2D-CQI/PMI information is transmitted together, D2D-CQI/PMI information is mapped as mentioned above, and the grant information is sequentially mapped to resources in the left-to-right direction beginning with a resource positioned just to the right of the last resource to which the D2D-CQI/PMI information is mapped. When all resources in the corresponding row are used, the grant information is sequentially mapped to resources again in the left-to-right direction beginning with the leftmost resource in a row just below the row. This is repeated until resource mapping ends.

On the other hand, when no D2D-CQI/PMI information is transmitted but grant information is transmitted, as shown in FIG. 15, the grant information is sequentially mapped to resources in the left-to-right direction beginning with a first resource (the leftmost and uppermost resource in a subframe of FIG. 15). When all resources in the uppermost row are used, the grant information is sequentially mapped to resources again in the left-to-right direction beginning with the leftmost resource in the second uppermost row. This is repeated until resource mapping ends.

Figure 16:
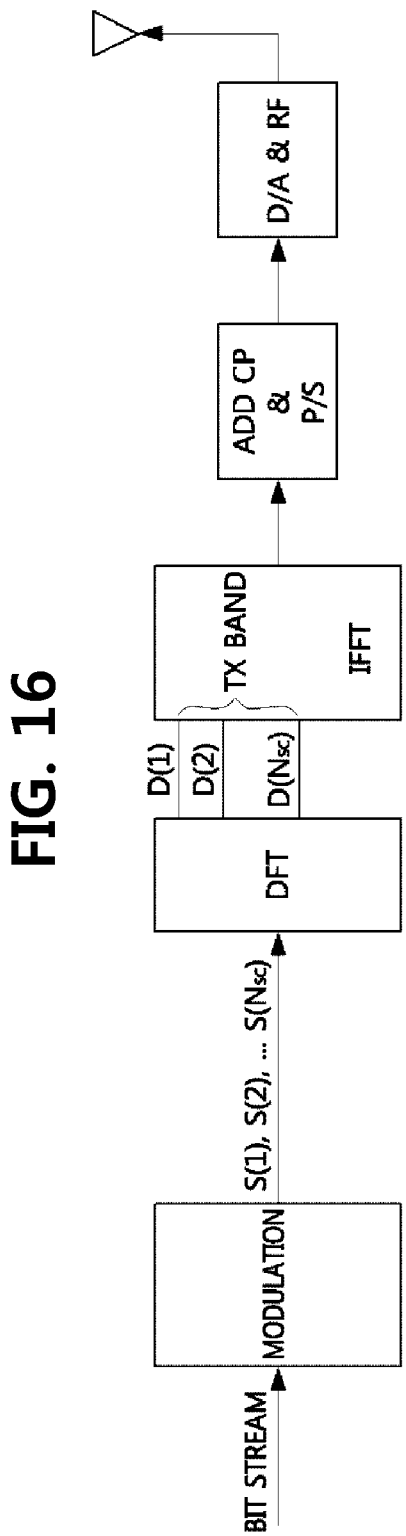
FIG. 16 is a block diagram showing a D2D-PUSCH Tx process in single carrier frequency division multiple access (SC-FDMA).

FIG. 16 is a block diagram showing a D2D-PUSCH Tx process in SC-FDMA.

In FIG. 14 and FIG. 15, each column consists of $N_{SC}$ resources, and modulation symbols sequentially mapped to the $N_{SC}$ resources correspond to symbol columns S(1), S(2), ... , and S($N_{SC}$) of FIG. 16. In other words, each of columns in FIG. 14 and FIG. 15 goes through a Tx process exemplified in FIG. 16. After discrete Fourier transform (DFT), a symbol column is mapped to $N_{SC}$ subcarriers and then goes through inverse fast Fourier transform (IFFT). Here, it should be noted that, when the amount of resources occupied by grant information is determined according to an MCS and the number of Tx layers, the MCS and the number of Tx layers are applied to the next D2D-PUSCH and subsequent D2D-PUSCHs.

To facilitate detection of D2D-CQI/PMI information even when a receiving UE fails in grant detection, the position of the D2D-CQI/PMI information is caused not to change according to whether or not there is grant information.

When Tx and Rx resource switching occurs, an MCS and the number of Tx layers for first Tx after the Tx and Rx resource switching should be exchanged between UEs, such that demodulation can be performed on the first Tx.

Since grant information is present all over a subframe, a UE can attempt data modulation only after the UE receives all subframes and then attempts to detect grant information. Thus, the problem of latency in data demodulation may occur, and it may be necessary to limit the size of a TB not to be excessively large.

(Method 2: Transmit Grant Information Using Separate Grant Channel)

Figure 17:
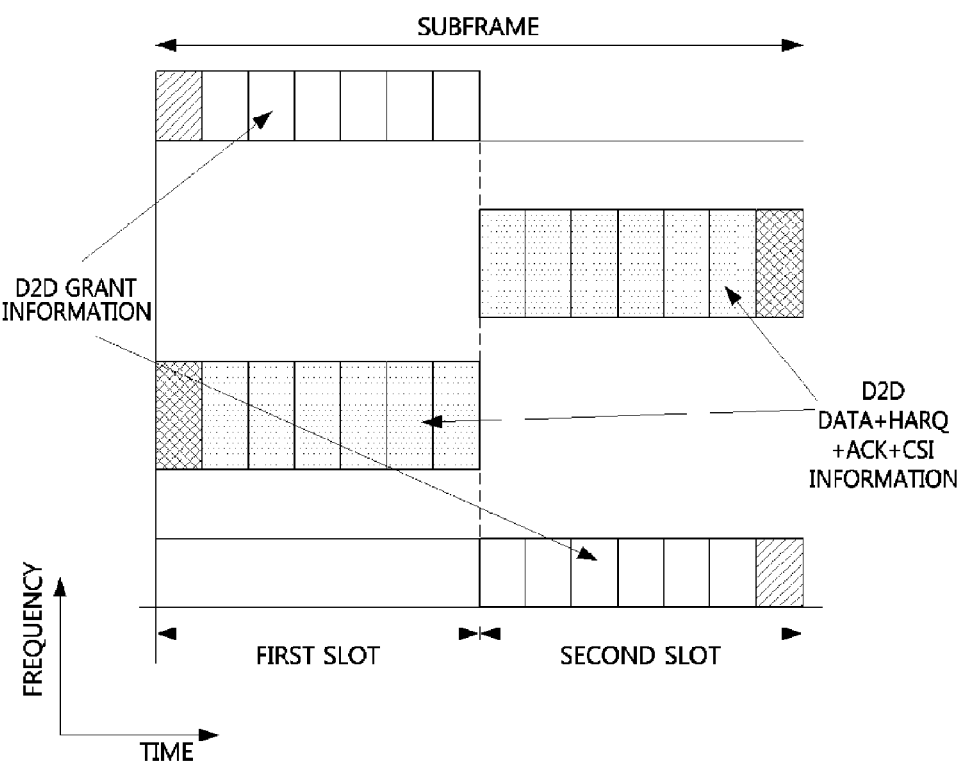
FIG. 17 is a diagram showing a configuration of resources when grant information is transmitted using a separate grant channel.

FIG. 17 is a diagram showing a configuration of resources when grant information is transmitted using a separate grant channel.

When grant information should be transmitted in a subframe in which a D2D-PUSCH is transmitted, as shown in FIG. 17, the grant information may be simultaneously transmitted with the D2D-PUSCH using a separate channel. Here, it is preferable to apply block coding to the grant information, and PUCCH format 2 or PUCCH format 3 may be used as a Tx format.

When Tx of grant information and D2D-CSI occur in the same subframe, the D2D-CSI is inserted into a D2D-PUSCH.

Figure 18:
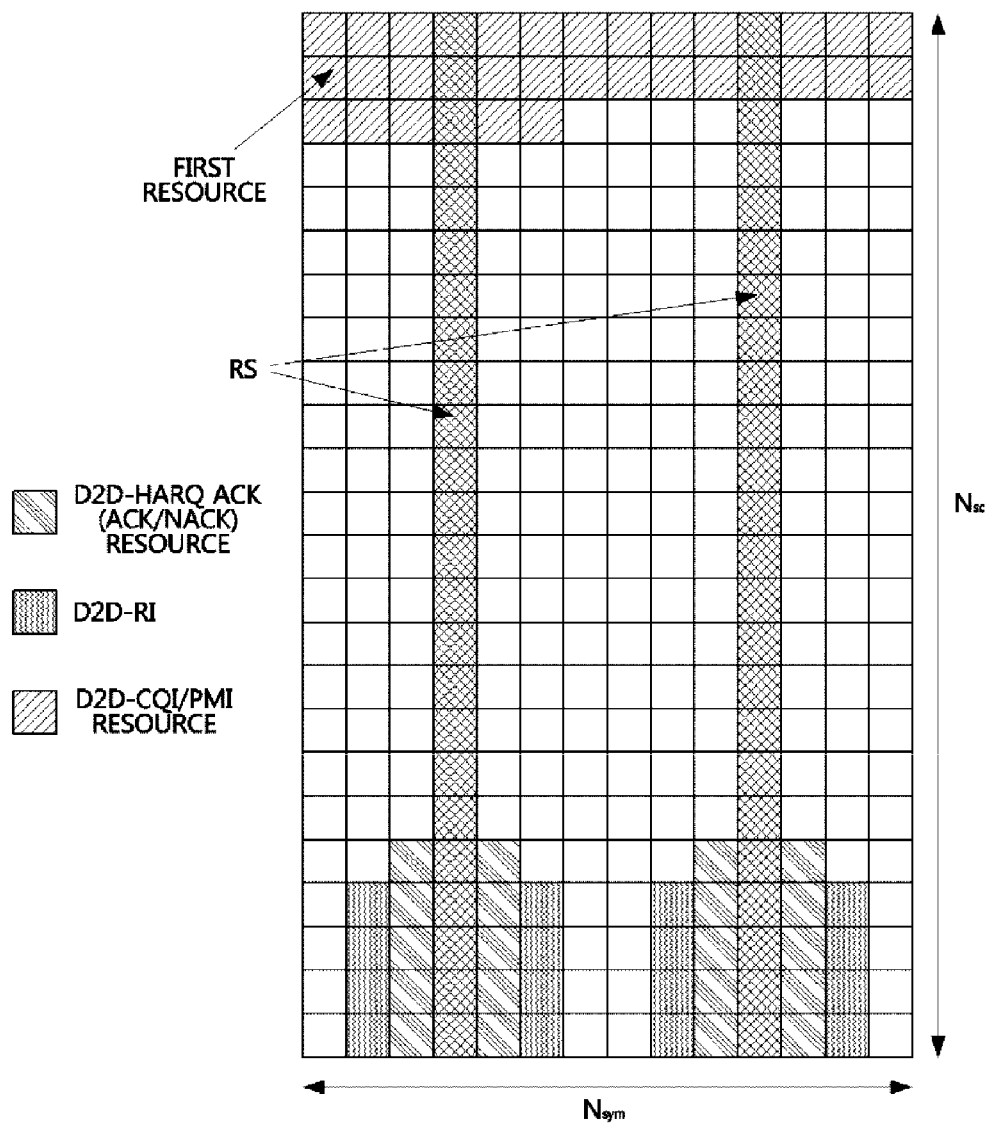
FIG. 18 is a diagram showing a configuration of resources showing positions of control information resources in a D2D-PUSCH resource grid.

FIG. 18 is a diagram showing a configuration of resources showing positions of control information resources in a D2D-PUSCH resource grid.

Referring to FIG. 18, when Tx of grant information and D2D-CSI occur in the same subframe, the D2D-CQI/PMI information is sequentially mapped to resources in the left-to-right direction beginning with a first resource (the leftmost and uppermost resource). When all resources in the uppermost row are used, the D2D-CQI/PMI information is sequentially mapped to resources again in the left-to-right direction beginning with the leftmost resource in the second uppermost row. D2D-RI information occupies resources positioned around resources to which D2D-HARQ ACK information is mapped.

When Tx of grant information and D2D-HARQ ACK information occur in the same subframe, the D2D-HARQ ACK information is inserted into a D2D-PUSCH. When D2D-HARQ ACK information is transmitted, the D2D-HARQ ACK information occupies resources positioned around an RS as shown in FIG. 18.

One of the above-described control information Tx methods, that is, method 1 and method 2, is selected as follows.

A base station or a D2D UE may select one of the two methods in consideration of quality of a D2D link, use and management of resources, etc., and transmit control information according to the selected method. In general, method 1 always transmits only one channel and thus has a lower PAPR than method 2 that simultaneously transmits two channels. When a signal to interference plus noise ratio (SINR) of a D2D link is high, method 2 may be selected, and when the SINR is low, method 1 may be selected. A base station may select one of the two methods in consideration of D2D link quality, resource management, etc., and notify D2D UEs of the selected method through signaling (e.g., RRC signaling).

Finally, when information about whether or not a grant has been detected is transmitted, the information may be indicated using one bit and transmitted with D2D-HARQ ACK information.

When the information is transmitted in a subframe in which there is D2D-PUSCH Tx, the information is inserted into the data channel (D2D-PUSCH). At this time, the bit indicating whether or not a grant has been detected is included in the number of bits of D2D-HARQ ACK information for resource mapping, and transmitted.

When the information is transmitted in a subframe in which there is no D2D-PUSCH Tx, the information may be transmitted using a PUCCH format. When D2D-HARQ ACK information is one bit, the one bit and the bit indicating whether or not a grant has been detected are transmitted using PUCCH format 1b.

When D2D-HARQ ACK information is two bits, one of the following methods may be used.

Using PUCCH format 3, the bit indicating whether or not a grant has been detected is additionally included in information bits, encoded, and transmitted.

The information is transmitted using PUCCH format 1b, and Tx resources are changed according to whether or not a grant has been detected.

(d) Channel Coding of Control Information

In the case of grant information, when the grant information is inserted into a D2D-PUSCH and transmitted, the grant information is separately encoded. When the amount of grant information is small, it is advantageous to apply block coding, and when the amount of grant information is large, it is advantageous in terms of performance to insert a cyclic redundancy check (CRC) and then apply convolutional coding. Meanwhile, when grant information is transmitted in a separate control channel, block coding is applied to the grant information.

In the case of D2D-HARQ ACK information, when D2D-HARQ ACK is transmitted in a D2D-PUSCH, it is preferable to apply repetition coding because the D2D-HARQ ACK has an amount of information of one bit or two bits. It is preferable to puncture some of data resources as Tx resources used for the D2D-HARQ ACK. The reason is that, because there may be a case in which No D2D-HARQ ACK is transmitted due to failure to detect a grant from a D2D-PUSCH transmitted from a counterpart UE, it is preferable to design data (D2D-SCH) resource mapping not to be affected by whether or not a D2D-HARQ ACK is transmitted. In other words, when a D2D-HARQ ACK is transmitted, it is transmitted in positions of data symbols, and thus the data symbols are punctured. This is because, when rate matching is used, a UE receiving data should perform blind demodulation in consideration of both DTX of a counterpart UE and Tx of a D2D-HARQ ACK.

When a D2D-HARQ ACK is transmitted in a separate control channel using PUCCH format 3, block coding is applied. When PUCCH format 1a/1b is used, a Tx method of the format is employed without channel coding.

In the case of D2D-CSI, description will be first made regarding a situation in which a D2D-RI and a D2D-CQI/PMI are transmitted in a D2D-PUSCH. A D2D-RI has an amount of information of one bit or two bits, it is preferable to apply repetition coding to the D2D-RI, and the D2D-RI uses some of data resources. To the resources occupied by the D2D-RI, a rate-matching method of excluding resources occupied by a D2D-RI from data mapping resources in advance without puncturing data symbols is applied. To a D2D-CQI/PMI, it is advantageous to apply block coding when the amount of D2D-CQI/PMI information is small. When the amount of grant information is large, it is advantageous in terms of performance to insert a CRC and then apply convolutional coding.

Next, a situation in which a D2D-RI and a D2D-CQI/PMI are transmitted in a separate control channel will be described. In this case, it is preferable to apply block coding as channel coding of a D2D-CQI/PMI as well as a D2D-RI.

11) Process of Transmitting and Receiving Data and Grant Information

Various grant Tx methods described below may be taken into consideration.

Except for the case of initial, first, or new HARQ Tx assigned by SPS, even a subframe to which D2D-PUSCH resources are allocated may not actually transmit a D2D-PUSCH according to a buffer status, and thus a receiving UE needs to check whether or not D2D-PUSCH Tx has actually occurred from grant information.

On the other hand, in the case of initial Tx assigned by SPS, a receiving UE should at least assume that D2D-PUSCH Tx occurs in an allocated subframe. In this case, a D2D-PUSCH may be transmitted according to the number of Tx layers and MCS information reported to the UE in advance, or the number of Tx layers and an MCS may be changed through grant information. A point in time at which a change in the number of Tx layers and the MCS is applied varies according to a method by which grant information is transmitted, which will be described later.

According to the above description, in initial HARQ Tx, cases of grant information Tx as mentioned below should be taken into consideration.

(In Case of Initial Tx not Assigned by SPS (e.g.; Resource Allocation in Units of HARQ Process))

A transmitting UE transmits grant information together with a D2D-PUSCH.

(In Case of Initial Tx Assigned by SPS)

[Case 1] A transmitting UE may or may not transmit a grant together with a D2D-PUSCH.

[Case 2] A transmitting UE always transmits a grant together with data.

[Case 3] A transmitting UE does not transmit a grant and only transmits data.

In HARQ retransmission, cases of grant information Tx as mentioned below are taken into consideration.

[Case 1R] A transmitting UE may or may not transmit a grant together with a D2D-PUSCH.

[Case 2R] A transmitting UE always transmits a grant together with data in retransmission.

[Case 3R] A transmitting UE transmits no grant in retransmission.

When a receiving UE receives no grant in a subframe in which retransmission occurs, a D2D-PUSCH is demodulated by using existing information (the number of Tx layers and an MCS) and circularly increasing an RV index value.

Figure 19:
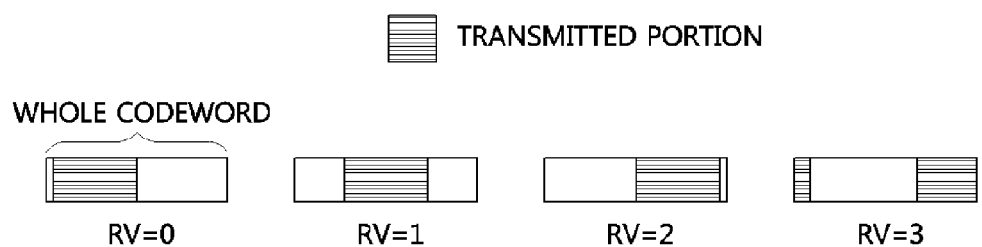
FIG. 19 shows examples of a codeword portion actually transmitted according to a redundancy version (RV) index in non-adaptive retransmission.

FIG. 19 shows examples of a codeword portion actually transmitted according to an RV index in non-adaptive retransmission.

In initial Tx, a codeword portion corresponding to RV=0 is transmitted, and the transmitted codeword portion varies when RV=1, RV=2, and RV=3 as shown in the drawing. In non-adaptive retransmission, a current RV index value is circularly increased by one, and demodulation is performed without grant information. When there are a total of four RVs, a circular increase in the RV index value denotes that the RVs are changed into (RV+1) mod 4.

Thus, from the viewpoint of a UE receiving a grant, a procedure of receiving a grant and data, and processing and transmitting feedback should be established for the three following cases:

An Rx and feedback procedure for a case in which a grant may or may not be transmitted An Rx and feedback procedure for a case in which a grant is transmitted together with data An Rx and feedback procedure for a case in which only data is transmitted without a grant When a D2D-PUSCH is transmitted and received, D2D Tx and Rx UEs should know which one of the three cases a current situation is in advance, according to a standard or through signaling with a base station or a counterpart UE. According to a subframe in which the D2D-PUSCH is received, the receiving UE may apply one of the three cases. For example, when initial Tx resources are allocated by SPS, and initial Tx and retransmission are configured in advance to follow [Case 1] and [Case 3] respectively, the receiving UE performs a procedure of receiving data and a grant and processing and transmitting feedback determined according to Rx cases respectively set in a subframe in which initial Tx occurs and a subframe in which retransmission occurs.

(a) Grant Information is Transmitted in D2D-PUSCH

It is assumed that UE A transmits data to UE B. UE A transmits grant information necessary to demodulate the data to UE B.

Here, it is assumed that the grant information is transmitted in a data channel (i.e., D2D-PUSCH) together with data, modulation symbols delivering the grant information have the same modulation order as data modulation symbols, the number of the grant information modulation symbols is determined according to the number of data Tx layers and an MCS, and resources in which modulation symbols are transmitted are determined when the number of modulation symbols occupied by the grant information is determined.

It is assumed that UE B knows the number of Tx layers and an MCS applied to the data and the grant in a subframe in which the grant information is delivered. In other words, it is assumed that, when there is grant information, UE B can know the number and positions of modulation symbols occupied by the grant information in a D2D-PUSCH. The amount and positions of resources occupied by the data correspond to resources other than resources occupied by the grant information and positions of the resources other than the positions of the resources occupied by the grant information.

From a viewpoint of a receiving UE that receives a grant, a method of receiving a grant and data and processing and transmitting feedback will be described below.

(Method in which Grant is Included and Transmitted in Data Rx Subframe)

(Method 1)

Receiving UE B attempts grant detection.

Figure 20:
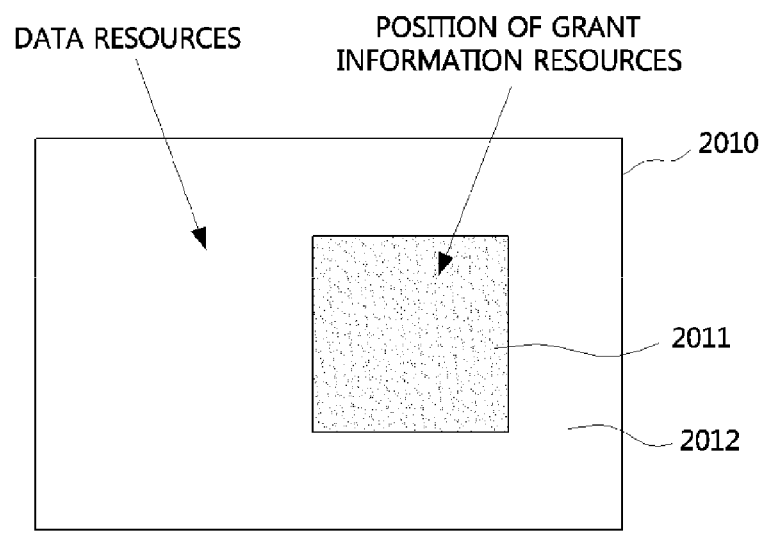
FIG. 20 is a conceptual diagram illustrating an example of multiplexing of data and grant information.

When it is determined that a grant has been successfully detected, demodulation is attempted according to grant information assuming that data symbols have been mapped to data mapping resources other than resources occupied by the grant information. FIG. 20 is a conceptual diagram illustrating an example of multiplexing of data and grant information. Data mapping resources 2010 are classified into resources 2011 occupied by grant information and resources 2012 to which data symbols are mapped.

When the grant detection fails, data demodulation is attempted on the basis of existing grant information. At this time, the demodulation is attempted assuming that the data symbols have been mapped to the data mapping resources other than resources occupied by the grant information.

When the data demodulation succeeds, an ACK is transmitted to UE A, and when the data demodulation fails, an NACK is transmitted to UE A.

Whether or not the grant detection has succeeded is not transmitted to UE A.

In method 1, transmitting UE A does not know whether or not the grant detection of receiving UE B has succeeded, and thus selecting an MCS to be used for a next D2D-PUSCH becomes uncertain. Also, there is a demerit in that the amount of grant resources should be specified as one size according to the number of Tx layers and an MCS so as to enable data demodulation even when the grant detection fails. When the grant detection fails, data demodulation is attempted without knowing the number of Tx layers, an NDI, and an RV included in grant information, and thus incorrect data demodulation may be attempted.

(Method 2)

Receiving UE B attempts grant detection.

When it is determined that a grant has been successfully detected, demodulation is attempted according to grant information assuming that data symbols have been mapped to data mapping resources other than resources occupied by the grant information.

When the grant detection fails, data demodulation is attempted on the basis of existing grant information (by increasing an RV index value by one in the case of retransmission). At this time, the demodulation is attempted assuming that the data symbols have been mapped to the data mapping resources other than resources occupied by the grant information.

Whether or not the data demodulation has succeeded and whether or not the grant detection has succeeded is transmitted to UE A.

Method 2 has a merit in that transmitting UE A can know whether or not receiving UE B has detected a grant, but this involves signaling overhead for reporting whether or not a grant has been detected. Also, there is a demerit in that the amount of grant resources should be specified as one size according to an MCS so as to enable data demodulation even when the grant detection fails. When the grant detection fails, data demodulation is attempted without knowing the number of Tx layers, an NDI, and an RV included in grant information, and thus incorrect data demodulation may be attempted.

(Method 3)

Figure 21:
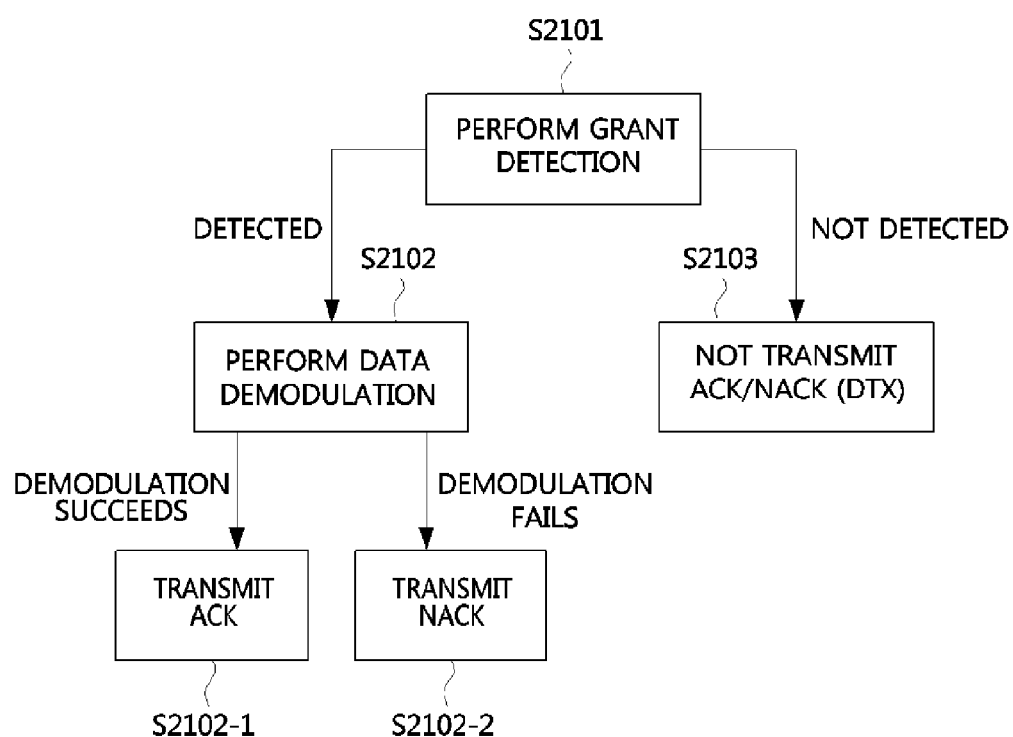
FIG. 21 is a conceptual diagram illustrating an example of an operation procedure of a UE for a subframe in which grant information and data are simultaneously transmitted.

FIG. 21 is a conceptual diagram illustrating an example of an operation procedure of a UE for a subframe in which grant information and data are simultaneously transmitted.

Receiving UE B attempts grant detection (S2101).

When it is determined that a grant has been successfully detected, demodulation is attempted according to grant information (S2102), assuming that data symbols have been mapped to data mapping resources other than resources occupied by the grant information (see FIG. 20 described above).

When the grant detection fails, DTX (no Tx of an ACK/NACK) is performed (S2103).

When the grant detection succeeds, and the data demodulation succeeds, an ACK is transmitted to UE A (S2102-1), and when the data demodulation fails, an NACK is transmitted to UE A (S2102-2).

In method 3, transmitting UE A can know whether or not receiving UE B has detected a grant. When UE B transmits no ACK/NACK signal (DTX state), UE A transmits data and grant information in the next data subframe using grant information applied to a grant that has been successfully detected most lately. For the purpose of link adaptation of grant information, a plurality of amounts of grant information symbols may be configured for a given MCS, and a UE may perform blind detection.

Among pieces of grant information, the number of Tx layers, an NDI, and an RV are applied to demodulation of data transmitted in a subframe in which a grant is transmitted.

(Rx and Feedback Procedure in Method in which Grant May or May not be Transmitted in Data Rx Subframe)

(Method 1)

Receiving UE B attempts grant detection.

Figure 22:
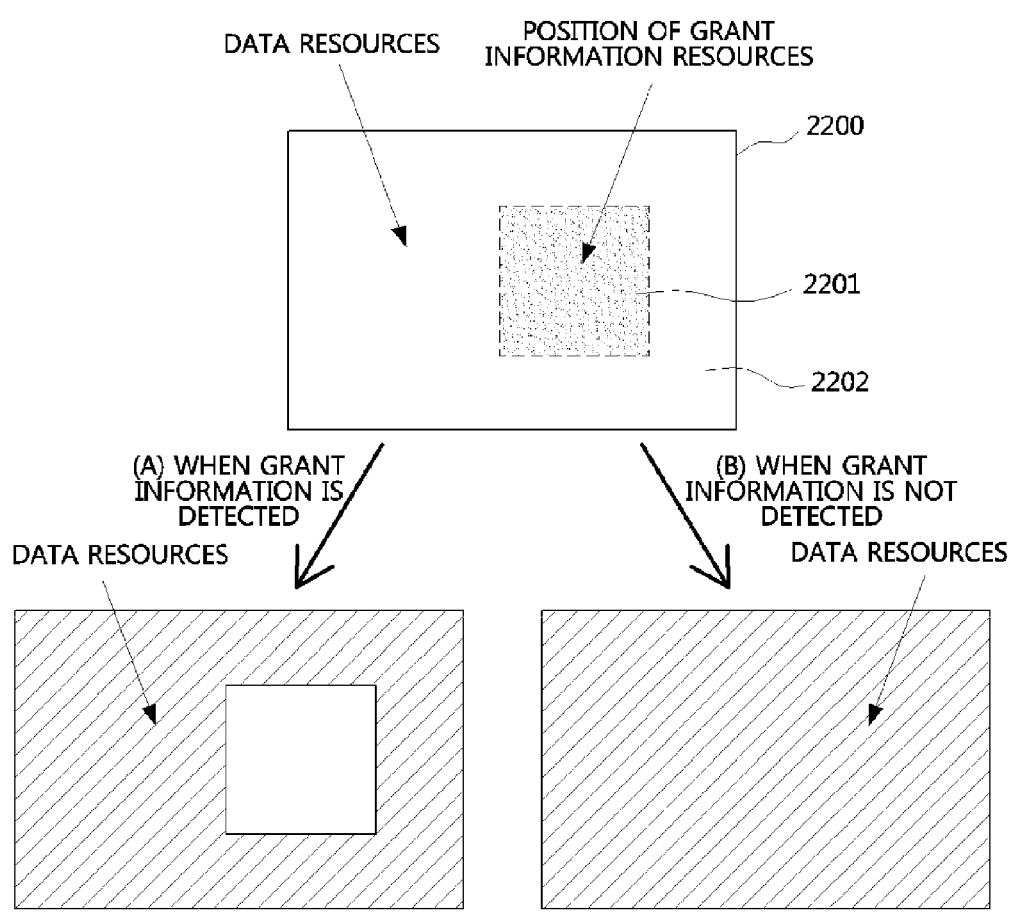
FIG. 22 is a conceptual diagram illustrating another example of multiplexing of data and grant information.

When a grant is detected, demodulation is attempted according to grant information assuming that data symbols have been mapped to data mapping resources other than resources occupied by the grant information. On the other hand, when no grant is detected, data demodulation is attempted on the basis of existing grant information (by increasing an RV index value by one in the case of retransmission) assuming that grant information occupies no data resources. FIG. 22 is a conceptual diagram illustrating another example of multiplexing of data and grant information. Referring to FIG. 22, grant information resources 2201 may or may not be positioned in data mapping resources 2200. In other words, according to whether or not the grant information resources 2201 are positioned in the data mapping resources 2200, operation of a case in which grant information is detected on a receiving side (case (A)) and a case in which no grant information is detected (case (B)) varies.

When the data demodulation succeeds, an ACK is transmitted to UE A, and when the data demodulation fails, an NACK is transmitted to UE A.

Whether or not the grant detection has succeeded is not transmitted to UE A.

In method 1, transmitting UE A does not know whether or not receiving UE B has detected a grant. When UE B transmits an NACK, UE A cannot determine whether the NACK has resulted from detection of no grant information, or success in detecting grant information and failure of data demodulation.

(Method 2)

Figure 23:
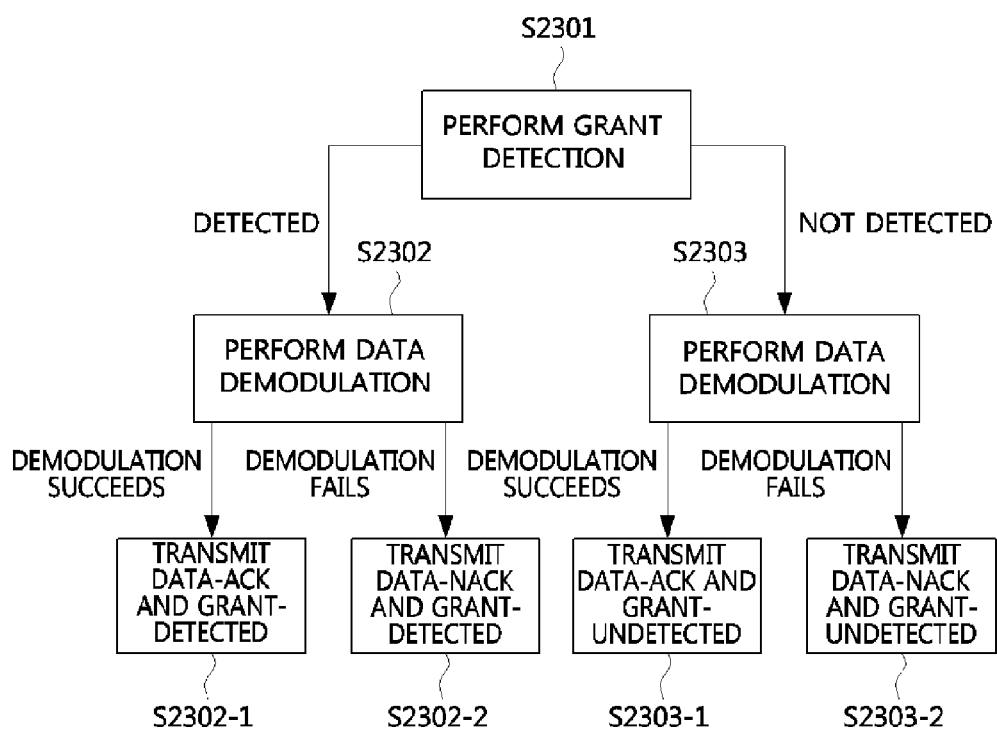
FIG. 23 is a conceptual diagram illustrating another example of an operation procedure of a UE for a subframe in which grant information and data are simultaneously transmitted.

FIG. 23 is a conceptual diagram illustrating another example of an operation procedure of a UE for a subframe in which grant information and data are simultaneously transmitted.

Receiving UE B attempts grant detection (S2301).

When a grant is detected, demodulation is attempted according to grant information assuming that data symbols have been mapped to data mapping resources other than resources occupied by the grant information (S2302). When no grant is detected, data demodulation is attempted on the basis of existing grant information (by increasing an RV index value by one in the case of retransmission) assuming that grant information occupies no data resources (S2303).

In each case, whether or not a grant has been detected (grant ACK/NACK) and whether or not the data demodulation has succeeded (data ACK/NACK) are transmitted to UE A (S2302-1, S2302-2, S2303-1, and S2303-2).

In method 2, transmitting UE A can know whether or not receiving UE B has detected a grant, but there is signaling overhead. This method delivers grant information only in case of need, thus having a merit in that it is possible to efficiently use resources and a demerit in that additional overhead is caused by signaling for reporting whether or not a grant has been detected.

(Rx and Feedback Procedure in Method in which Only Data is Transmitted without Grant)

Receiving UE B does not attempt grant detection. On the basis of already given information (by increasing an RV index value by one in the case of retransmission), receiving UE B attempts data demodulation. When the data demodulation succeeds, receiving UE B transmits an ACK to transmitting UE A, and when the data demodulation fails, receiving UE B transmits an NACK to transmitting UE A.

When grant information is transmitted in a data channel (i.e., D2D-PUSCH) together with data, for the purpose of link adaptation of grant information, a plurality of candidates for the amount of resources that can be occupied for a given MCS of the data by the grant information may be provided.

FIG. 24 is a conceptual diagram illustrating a concept of defining and using amounts of grant information resources as a plurality of levels.

Referring to FIG. 24, when a plurality of grant resource amount levels (a), (b), and (c) are provided, grant resource amounts of the respective resource amount levels are conceptually shown. In this way, a transmitting UE selects one of the plurality of resource amounts of grant information and performs Tx, and a receiving UE performs blind detection for the plurality of grant resource amount levels.

The receiving UE should know resource amounts of available grant resource amount levels and thereby can perform blind detection of grant information by assuming the available grant resource amounts when detecting grant information. Grant resources detected by blind detection are excluded from resources to which data is mapped.

(b) Transmitting Grant Information Using Control Channel

The following description concerns a grant and data Rx process of a UE when a separate grant channel is used instead of a D2D-PUSCH. In this case, grant information that includes the number of Tx layers and an MCS and is necessary for data demodulation is used for demodulation of data that is transmitted in the same subframe.

(Transmitting Grant Together in Data Rx Subframe)

(Method 1)

UE B attempts grant detection.

When a grant is detected, data demodulation is attempted according to grant information. When the data demodulation succeeds, an ACK is transmitted to UE A, and when the data demodulation fails, an NACK is transmitted to UE A.

When the grant detection fails, no ACK/NACK information is transmitted (DTX).

(Rx and Feedback Procedure in Method in which Grant May or May not be Transmitted in Data Rx Subframe)

(Method 1)

Receiving UE B attempts grant detection first.

When a grant is detected, data is demodulated according to grant information.

When no grant is detected, the data is demodulated on the basis of existing grant information (by increasing an RV index value by one in the case of retransmission).

When the data demodulation succeeds, an ACK is transmitted to UE A, and when the data demodulation fails, an NACK is transmitted to UE A.

In method 1, transmitting UE A cannot know whether receiving UE B has succeeded in grant detection. An NACK may result from detection of no grant information, or success in detecting grant information and failure of data demodulation, but it is impossible to distinguish between the two cases.

(Method 2)

Receiving UE B attempts grant detection first.

When a grant is detected, data is demodulated according to grant information.

When no grant is detected, the data is demodulated on the basis of existing grant information (by increasing an RV index value by one in the case of retransmission).

Whether or not a grant has been detected (grant ACK/NACK) and whether or not the data demodulation has succeeded (data ACK/NACK) are transmitted to UE A.

In method 2, transmitting UE A can know whether or not receiving UE B has succeeded in grant detection, but there is signaling overhead for reporting whether or not a grant has been detected.

(Rx and Feedback Procedure in Method in which Only Data is Transmitted without Grant)

UE B does not attempt grant detection. On the basis of existing grant information (by increasing an RV index value by one in the case of retransmission), UE B attempts data demodulation. When the data demodulation succeeds, UE B transmits an ACK to UE A, and when the data demodulation fails, UE B transmits an NACK to UE A.

12) Change in Tx Symbol Mapping According to Tx and Rx Switching (a) Tx and Rx Restriction for Ensuring Tx/Rx Switching Time In D2D communication, a UE should receive a downlink subframe transmitted by a counterpart UE.

Figure 25:
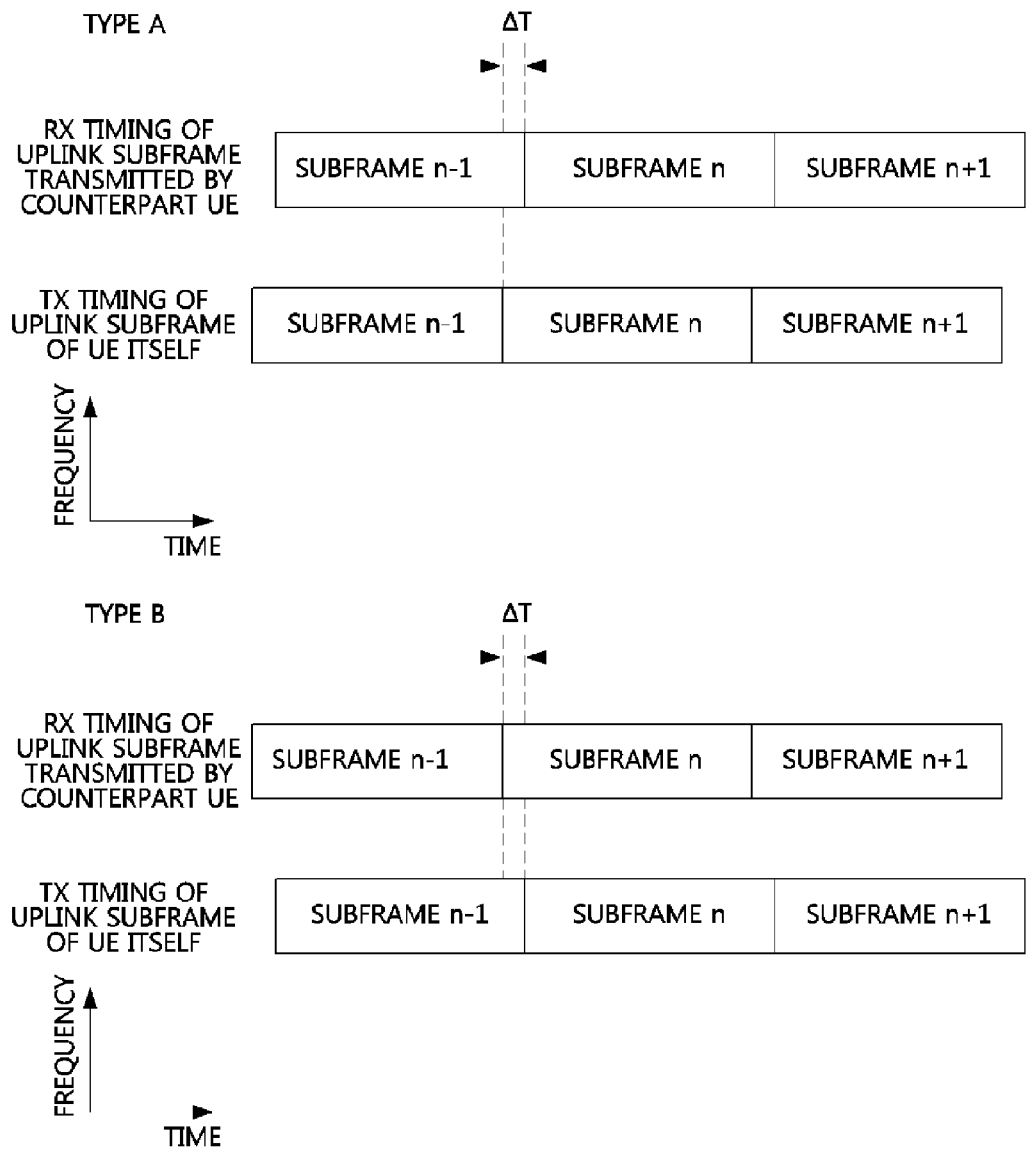
FIG. 25 is a conceptual diagram illustrating inconsistency in uplink subframe Tx timing between D2D communication UEs.

FIG. 25 is a conceptual diagram illustrating inconsistency in uplink subframe Tx timing between D2D communication UEs.

In general, an uplink Tx timing of a UE may not be the same as a timing at which a signal transmitted by a counterpart UE is received by the UE.

Figure 26:
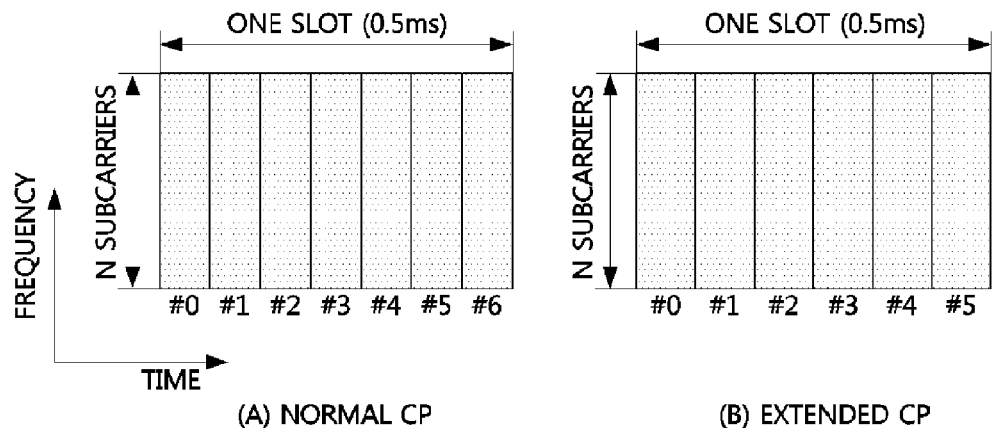
FIG. 26 shows slot structures of an uplink subframe.

FIG. 26 shows slot structures of an uplink subframe.

In the case of a normal CP, one slot consists of seven OFDM symbols (alternatively referred to as SC-FDMA symbols). For convenience, the following description assumes a normal CP.

Assuming that subframe n is used for D2D communication, when a receiving D2D UE performs cellular Tx (contention-based (C)-PUSCH, C-PUCCH, C-SRS, etc.) in subframe n−1, a Tx-to-Rx switching time should be ensured to perform D2D Rx (D2D-PUSCH Rx, D2D-HAQR ACK Rx, etc.) in subframe n from the viewpoint of the receiving D2D UE.

Thus, when the receiving UE performs cellular Tx in the last OFDM symbol of subframe n−1, a transmitting UE should exclude OFDM symbol #0 in a first slot of subframe n from D2D Tx to use a time period of OFDM symbol #0 in the first slot of subframe n for Tx-to-Rx switching.

When the receiving UE performs cellular Tx in the last OFDM symbol (OFDM symbol #6) in a second slot of subframe n, the transmitting UE should exclude OFDM symbol #5 from D2D Tx to use a time period of OFDM symbol #5 in the second slot of subframe n for Tx-to-Rx switching.

When the receiving D2D UE does not perform cellular Tx in the last OFDM symbol (OFDM symbol #6) in a second slot of subframe n but performs cellular Tx (C-PUSCH, C-PUCCH, C-SRS, etc.) in subframe n+1, an Rx-to-Tx switching time should be ensured to perform D2D Rx in subframe n. Thus, to use a time period of OFDM symbol #6 in the second slot of subframe n for Rx-to-Tx switching, the transmitting UE should exclude OFDM symbol #6 from D2D Tx.

(b) Rx Restriction for SRS Tx

Figure 27:
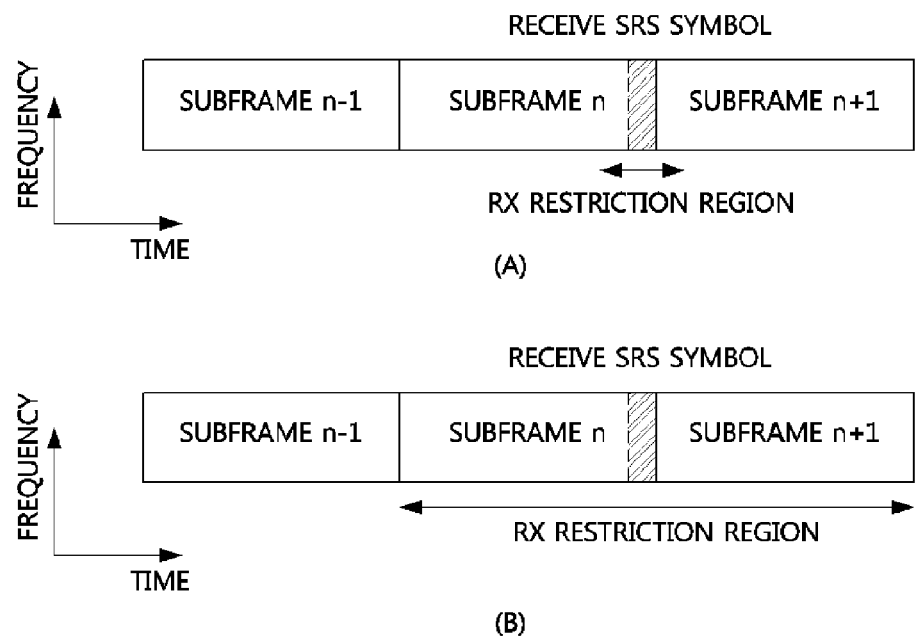
FIG. 27 and FIG. 28 are conceptual diagrams illustrating setup of an Rx restriction region and a Tx restriction region for an SRS.
Figures 28, 29:
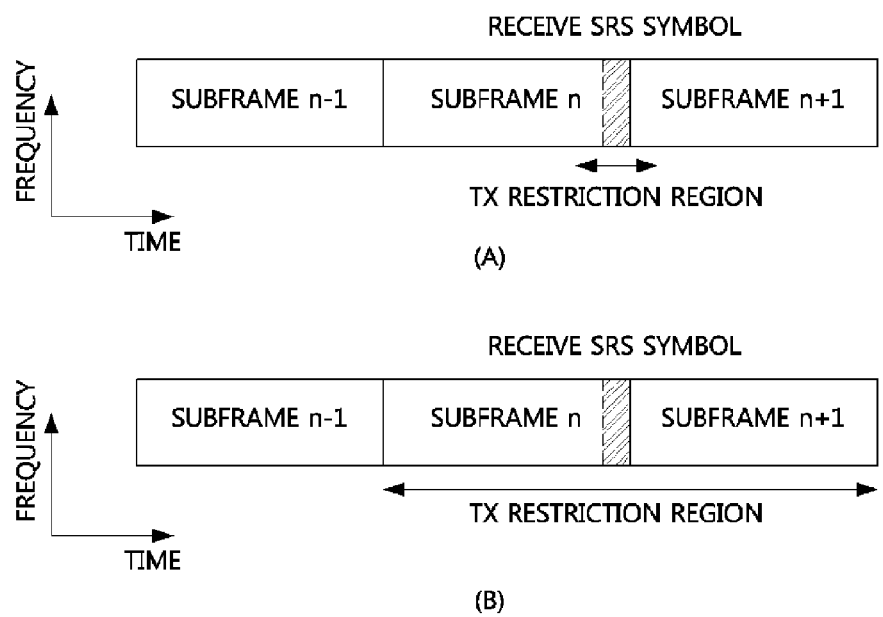
FIG. 29 is a table illustrating a Tx/Rx restriction method according to a type of a physical channel.

FIG. 27 and FIG. 28 are conceptual diagrams illustrating setup of an Rx restriction region and a Tx restriction region for an SRS.

A base station may set Rx restriction for the whole or a part of a specific subframe such that a UE can measure an SRS. The base station should provide Rx restriction setup information to each of transmitting D2D UE and receiving D2D UE, such that the transmitting D2D UE and receiving D2D UE have the same gain and loss from C-PUSCH mapping, a C-PUCCH Tx format, D2D-PUSCH mapping, and a D2D-PUCCH Tx format.

An Rx restriction method will be described below.

(Method 1) A UE excludes OFDM symbols corresponding to a Tx restriction region from Rx.

In (a) of FIG. 27, it is assumed that a UE transmits an SRS in OFDM symbol #6 in a second slot of subframe n. The UE does not need to perform Rx for OFDM symbol #5 in the second slot of subframe n and OFDM symbol #0 in a first slot of subframe n+1. The corresponding symbols are not used for Tx on the transmitting side.

(Method 2) A UE does not perform Tx for a whole subframe that partially overlaps a Tx restriction region.

In (b) of FIG. 27, it is assumed that a UE transmits an SRS in OFDM symbol #6 in a second slot of subframe n. The UE does not need to perform Rx in subframe n and subframe n+1. In other words, subframe n and subframe n+1 are not used for Tx on the transmitting side.

(c) Tx restriction for SRS Rx

A base station may set Tx restriction for the whole or a part of a specific subframe such that a UE can measure an SRS. The base station should provide Tx restriction setup information to each of a transmitting D2D UE and a receiving D2D UE, such that the transmitting D2D UE and the receiving D2D UE have the same gain and loss from C-PUSCH mapping, a C-PUCCH Tx format, D2D-PUSCH mapping, and a D2D-PUCCH Tx format.

A Tx restriction method will be described below.

(Method 1) A UE excludes OFDM symbols corresponding to a Tx restriction region from Tx.

In (a) of FIG. 28, it is assumed that a UE receives an SRS in OFDM symbol #6 in a second slot of subframe n. For the UE, Tx of OFDM symbol #5 in the second slot of subframe n is restricted. For the UE, Tx of OFDM symbol #0 in a first slot of subframe n+1 is restricted. In other words, the corresponding symbols are not used for Tx.

(Method 2) A UE does not perform Tx for a whole subframe that partially overlaps a Tx restriction region.

In (b) of FIG. 28, it is assumed that a UE receives an SRS in OFDM symbol #6 in a second slot of subframe n. For the UE, Tx in subframe n is restricted. For the UE, Tx in subframe n+1 is restricted. In other words, subframe n and subframe n+1 are not used for Tx.

FIG. 29 is a table illustrating a Tx/Rx restriction method according to a type of a physical channel.

When method 1 is used for a C-PUSCH, rate matching of excluding symbols in a restriction region from C-PUSCH RE mapping is performed.

Method 2 is preferred not to affect a C-PUCCH format. In particular, when code division multiplexing (CDM) is performed on a C-PUCCH and a C-PUCCH of another UE in the same resource, a change in the format may cause much interference between UEs.

When method 1 is used for a D2D-PUSCH, rate matching of excluding symbols in a restriction region from D2D-PUSCH RE mapping is performed.

It is preferred to use Method 1 for a D2D-PUCCH. To this end, it is necessary to design a new format.

(d) Introduction of New PUCCH Format Due to Tx and Rx Restriction

As described above, to ensure a Tx/Rx switching time of a UE, an OFDM symbol is excluded from Tx resource mapping, and resource mapping of a PUCCH is also affected by the excluded OFDM symbol. Thus, there is a case in which it is necessary to modify a PUCCH format.

For example, when OFDM symbol #0 in a first slot cannot be used, a shortened format should be used in the first slot, and when OFDM symbol #6 in a second slot cannot be used, a shortened format should be used in the second slot. When OFDM symbols #5 and #6 in a second slot cannot be used, a further shortened format should be used in the second slot.

In the case of a second slot, PUCCH format 1/1a/1b and PUCCH format 3 can be reused because shortened formats have been already used in a Long Term Evolution (LTE) standard. In the case of a first slot, it is necessary to define shortened formats of PUCCH format 1/1a/1b and PUCCH format 3. PUCCH format 2/2a/2b requires introduction of a shortened format. However, there is a case in which two symbols cannot be used, and thus a further shortened format is necessary.

Since there is a case in which CDM cannot be performed on a new shortened format or further shortened format and an existing LTE PUCCH format, resource allocation should be performed in consideration of this case.

13) Shortened Control Channel Format

As described above, a control channel for a D2D link needs to use a shortened format. Here, the shortened format will be described in further detail.

(a) Shortened Format of PUCCH Format 1/1a/1b

Slot structures of PUCCH format 1/1a/1b may be classified into a normal format, a shortened format, and a further shortened format according to the number of OFDM symbols (or SC-FDMA symbols) included in one slot.

PUCCH format 1/1a/1b is spread into a sequence having a length of 12 on the frequency axis. An RS block has a structure spread into a length-3 DFT sequence on the time axis, and a data block has a structure spread into a length-4 Walsh sequence (normal format) or a length-3 DFT sequence (shortened format) on the time axis.

FIG. 30 is a conceptual diagram showing shortened formats of a PUCCH format 1/1a/1b.

In a shortened format of type A, a block corresponding to OFDM symbol #0 (BL #0 in FIG. 30) is not used for Tx. In a shortened format of type B, a block corresponding to OFDM symbol #6 (BL #6 in FIG. 30) is not used for Tx.

In both of the shortened format of type A and the shortened format of type B, data symbol blocks are spread using a length-3 DFT sequence on the time axis.

FIG. 31 is a table showing a length-3 DFT sequence.

Referring to FIG. 31, when a symbol before time-axis spreading is applied is denoted by S(l, k) (l is an OFDM symbol number and k is a subcarrier index on the frequency axis), and DFT sequences used for the spreading are denoted by Di(0), Di(1), and Di(2) (i is a DFT sequence index), a symbol Q(l, k) after the spreading is presented as follows:

$$Q(1,k)=S(1,k) \times Di(0)$$

$$Q(5,k)=S(5,k) \times Di(1)$$

$$Q(6,k)=S(6,k) \times Di(2)$$

(b) Shortened Format of PUCCH Format 2

Slot structures of PUCCH format 2/2a/2b may be classified into a normal format, a shortened format, and a further shortened format according to the number of OFDM symbols (or SC-FDMA symbols) included in one slot.

FIG. 32 is a conceptual diagram showing shortened formats of PUCCH format 2.

In a shortened format of type A, a block corresponding to OFDM symbol #0 (BL #0 in FIG. 32) is not used for Tx. In a shortened format of type B, a block corresponding to OFDM symbol #6 (BL #6 in FIG. 32) is not used for Tx.

PUCCH format 2/2a/2b is spread into a sequence having a length of 12 on the frequency axis. In the case of the normal format, each slot transmits five data symbols. In the case of the shortened format, each slot transmits four data symbols.

(c) Shortened Format of PUCCH Format 3

PUCCH format 3 is based on DFT-spread (S)-OFDM, which is an LTE uplink Tx scheme.

Figure 33:
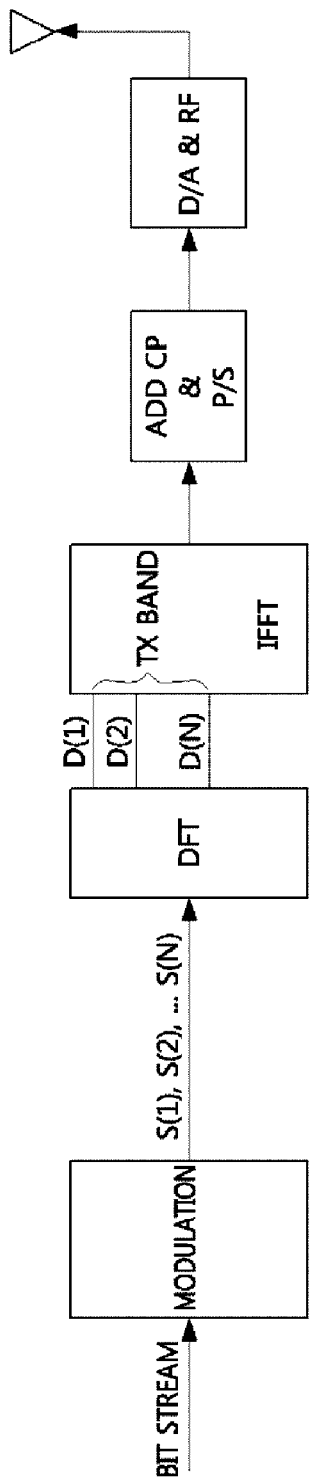
FIG. 33 is a block diagram illustrating a Tx process of a DFT-spread (S)-orthogonal frequency division multiplexing (OFDM) scheme.

FIG. 33 is a block diagram illustrating a Tx process of a DFT-S-OFDM scheme.

In the DFT-S-OFDM scheme, a signal is generated through a process illustrated in FIG. 33. Basically, N modulation symbols S(1), S(2), . . . , and S(N) are generated through modulation of a part of a codeword bit stream generated as a result of channel coding, subjected to DFT, and then converted into N symbols D(1), D(2), . . . , and D(N). These are mapped to N subcarriers. The N symbols D(1), D(2), . . . , and D(N) mapped to the N subcarriers will be referred to as a symbol block. Subsequently, the symbol block is converted into a signal in the time domain through IFFT, and then transmitted. It is possible to know that such a process is repeated in units of symbol blocks.

In a structure using a normal CP, each slot transmits seven symbol blocks, and a fourth symbol block among the symbol blocks is used for an RS. On the other hand, in a structure using an extended CP, each slot transmits six symbol blocks, and a third symbol block among the symbol blocks is used for an RS. Symbol blocks corresponding to an RS do not go through a DFT process, and directly map previously defined symbols to respective subcarriers in the frequency domain one by one.

Normal CP slot structures of PUCCH format 3 may be classified into a normal format, a shortened format, and a further shortened format according to the number of OFDM symbols (or SC-FDMA symbols) included in one slot.

Figure 34:
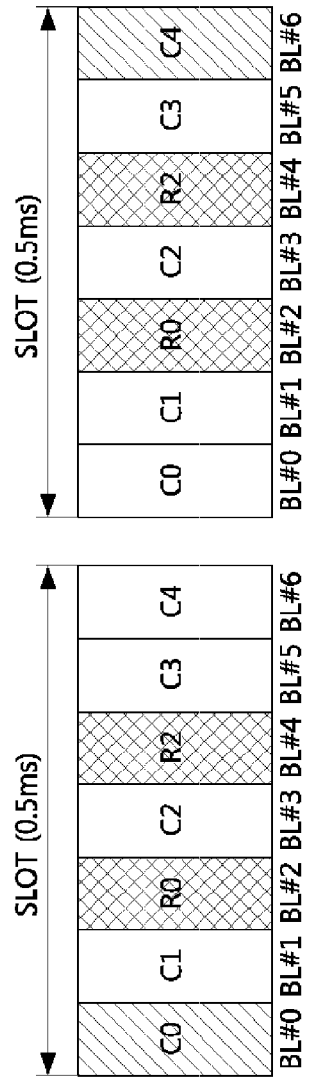
FIG. 34 is a conceptual diagram showing shortened formats of PUCCH format 4.

FIG. 34 is a conceptual diagram showing shortened formats of PUCCH format 4.

In a shortened format of type A, a block corresponding to OFDM symbol #0 (BL #0 in FIG. 34) is not used for Tx. In a shortened format of type B, a block corresponding to OFDM symbol #6 (BL #6 in FIG. 34) is not used for Tx.

In both the shortened format of type A and the shortened format of type B, data symbol blocks are spread using a length-4 Walsh sequence on the time axis.

FIG. 35 is a table showing a length-4 Walsh sequence.

Referring to FIG. 35, when a symbol before time-axis spreading is applied is denoted by S(l, k) (l is an OFDM symbol number, and k is a subcarrier index on the frequency axis), and Walsh sequences used for the spreading are denoted by Wi(0), Wi(1), Wi(2), and Wi(3) (i is an Walsh sequence index), a symbol Q(l, k) after the spreading is presented as follows:

$$Q(1,k)=S(1,k) \times Wi(0)$$

$$Q(3,k)=S(3,k) \times Wi(1)$$

$$Q(5,k)=S(5,k) \times Wi(2)$$

$$Q(6,k)=S(6,k) \times Wi(3)$$

In the table of FIG. 35, it is preferable to use a sequence index {0, 1}, {1, 2}, {2, 3}, or {3, 1} to maintain orthogonality in a high-speed environment. This is because elements constituting these sets have orthogonality with a length of 2 as well as a length of 4 between themselves. In other words, Walsh sequences 1 and 2 are orthogonal to each other as 1×1+(−1)×1=0 in an orthogonality test of their first two coefficients, and likewise orthogonal to each other as 1×(−1)+(−1)×(−1)=0 in an orthogonality test of their last two coefficients. Due to this characteristic, orthogonality can be maintained well even between high-speed UEs showing a drastic change in channel over time.

When a shortened format is used in a first slot and a second slot of one subframe, interference randomization is achieved by OCC remapping in units of slots. In other words, when a length-4 Walsh sequence used in the first slot and a length-4 Walsh sequence used in the second slot by a UE are appropriately selected, it is possible to achieve interference randomization.

It is assumed that one random Walsh sequence shown in FIG. 35 is denoted by Wi(0), Wi(1), Wi(2), or Wi(3) (i is a Walsh sequence index). In the table shown in FIG. 35, interference between sequences having neighboring indices is less than interference between sequences having indices that do not neighbor each other. Thus, when two UEs use neighboring Walsh sequences in first slots, the UEs are caused to use non-neighboring Walsh sequences in second slots if possible, and when two UEs use non-neighboring Walsh sequences in first slots, the UEs are caused to use neighboring Walsh sequences in second slots if possible, such that interference equalization can be achieved between the UEs. FIG. 36 and FIG. 37 are tables showing examples of the use of Walsh sequences for interference equalization.

14) Sequence and Hopping Configuration

According to a surrounding channel state, a D2D link should use orthogonal resources or reuse resources that are pseudo-used in another cellular or D2D link. Orthogonality support for use of orthogonal resources and pseudo-orthogonality support for reuse of resources both are required.

It is necessary to examine orthogonality/pseudo-orthogonality of the following signals and channel:

D2D-PUSCH DM RS
D2D-PUCCH (sequence, resource offset, etc.)
D2D-PUCCH DM RS
D2D-SRS 15) Avoidance of Collision with Cellular HARQ Process and Cellular Communication Priority When cellular communication priority is applied, cellular Tx is performed but D2D Tx is not performed in a subframe in which data and control information of D2D communication and a cellular link is transmitted. However, there can be some exceptions, for example, C-SRS Tx and/or C-CSI Tx.

A transmitting UE determines a Tx power and an MCS, and transmits control information such as the MCS (i.e., the size of a TB) to a receiving UE through a grant/assignment.

16) CSI Report Method and Content (a) CSI Report System

Figure 38:
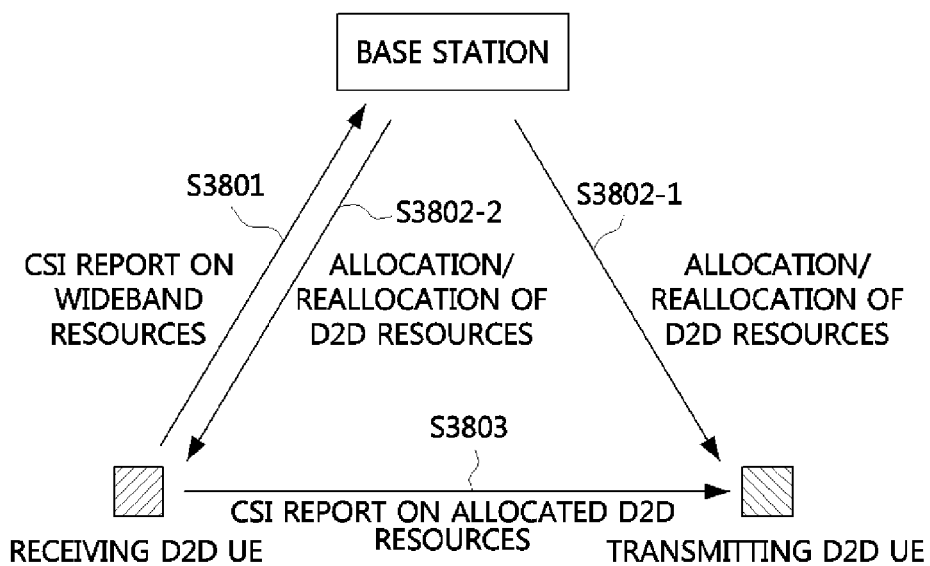
FIG. 38 is a conceptual diagram illustrating a channel state information (CSI) report system for D2D communication.

FIG. 38 is a conceptual diagram illustrating a CSI report system for D2D communication.

With reference to FIG. 38, a CSI report system in which a receiving D2D UE, a base station, and a transmitting D2D UE participate will be summarized below.

First, the receiving D2D UE reports CSI on wideband (the whole or a part of a cellular band) resources in response to a request of the base station (S3801). At this time, the receiving D2D UE may estimate the CSI on the wideband resources of a D2D link by measuring an SRS of the transmitting D2D UE. The CSI on the wideband resources may be reported to the base station periodically or at a request of the base station.

Next, the base station determines D2D resource allocation and reallocation with reference to the CSI report of the receiving D2D UE. In the case of allocation, or when reallocation is necessary, the base station transmits allocation/reallocation information to the D2D transmitting and receiving UEs (S3802-1 and S3802-2). S3802-1 indicates a process in which the base station transmits D2D resource allocation/reallocation information to the transmitting D2D UE, and S3802-2 indicates a process in which the base station transmits D2D resource allocation/reallocation information to the receiving D2D UE.

The receiving D2D UE reports CSI on allocated D2D resources to the transmitting UE (S3803). At this time, the receiving D2D UE may estimate the CSI on the allocated D2D resources by measuring a DM RS or an SRS of the transmitting D2D UE. The CSI on the allocated D2D resources may be periodically reported to the transmitting D2D UE, and the transmitting D2D UE performs link adaptation (selection of an MCS and power control) with reference to the reported CSI.

(b) CSI Feedback for Wideband Resources

When SC-FDMA is used, existing RI/PMI/CQI estimation in LTE needs to be modified according to characteristics of SC-FDMA. When consecutive resource allocation is assumed on the frequency axis, and Tx is performed through one DFT process, it should be noted that frequency-selective precoding cannot be used.

On the other hand, there is a need for a CSI feedback design to enable a base station to perform frequency domain scheduling.

b-1) Subband Feedback

A CSI report on subband feedback includes the following:
RI: This is a rank applied in common to a whole band.
Subband PMI (only in the case of multi-antenna port Tx): PMIs preferred for each subband according to respective layers are extracted on the assumption that Tx is performed using the subband only.
Subband CQI: This includes codeword-specific CQIs. When a rank is 1, a CQI of one codeword is included, and when a rank is 2 or higher, CQIs of two respective codewords are included.

b-2) Wideband Feedback

A CSI report on wideband feedback includes the following:
RI: This is a rank applied in common to a whole band.
Wideband PMI/CQI: PMIs (only in the case of multi-antenna port Tx) preferred for a whole band according to respective layers are included, and when a PMI preferred for the whole band is used, codeword-specific CQIs are included.

b-3) UE-Selected Subband Feedback

A CSI report on UE-selected subband feedback includes the following:
RI: This is a rank applied in common to a whole band.
Position information on selected subbands
Subband PMIs of each selected subband (only in the case of multi-antenna port Tx): PMIs preferred for each selected subband according to respective layers are extracted on the assumption that Tx is performed using the subband only.
CQI of each selected subband: This includes codeword-specific CQIs. When a rank is 1, a CQI of one codeword is included, and when a rank is 2 or higher, CQIs of two respective codewords are included.

(c) CSI Feedback for Allocated Resources

A receiving UE extracts CSI on D2D resources in which data is received, and transmits the CSI to a counterpart transmitting UE. The CSI report includes the following:
RI: This is a rank applied in common to a whole allocated resource area.
PMI (only in the case of multi-antenna port Tx): This is a preferred PMI. Here, it is possible to use one of two PMI report methods described later.
Codeword-specific CQIs: When a rank is 1, a CQI of one codeword is included, and when a rank is 2 or higher, CQIs of two respective codewords are included.

Figure 39:
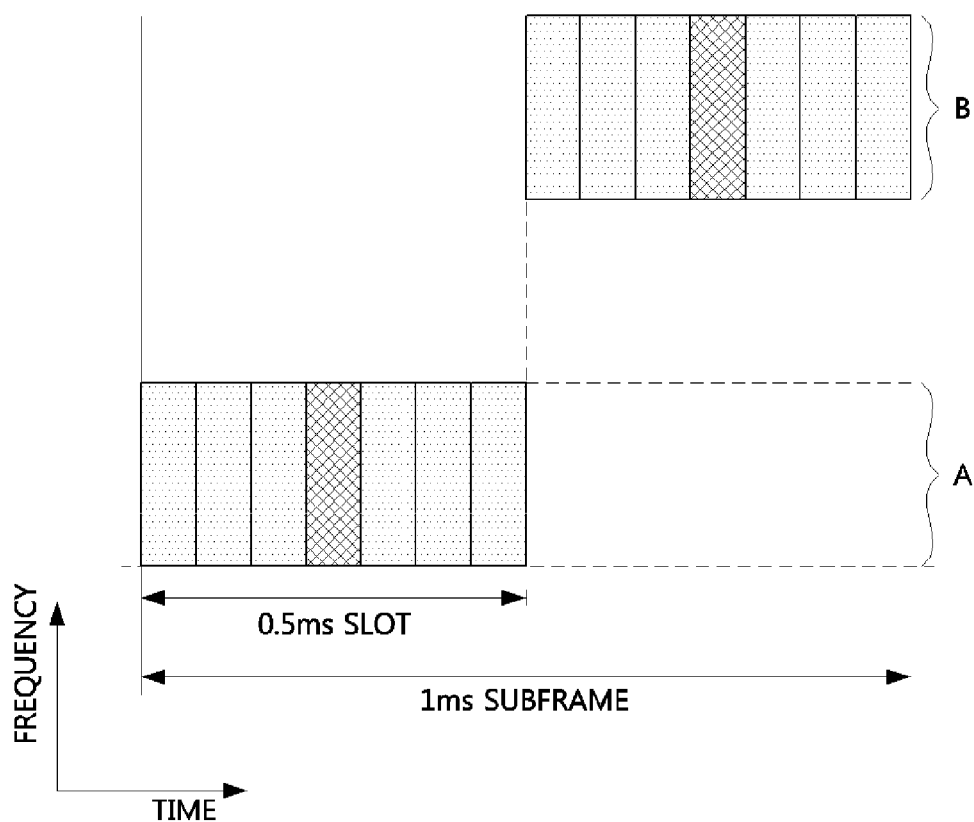
FIG. 39 to FIG. 41 are conceptual diagrams illustrating types of D2D resource allocation.
Figure 40:
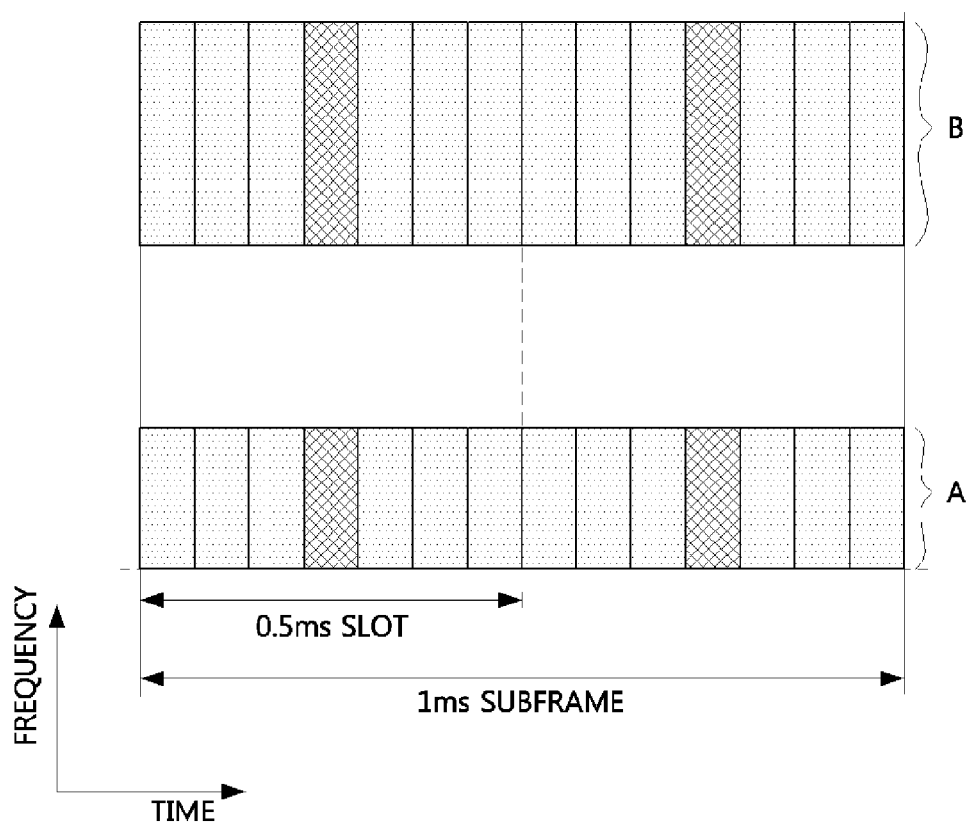
Figure 41:
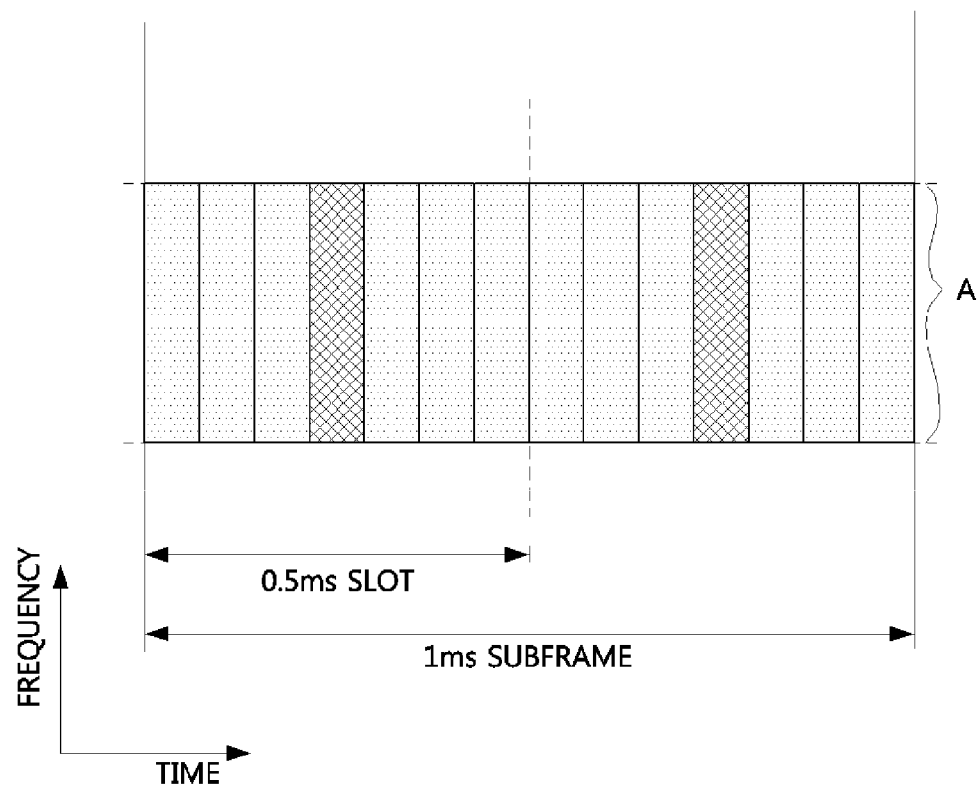

FIG. 39 to FIG. 41 are conceptual diagrams illustrating types of D2D resource allocation.

First, when D2D resources occupy a plurality of frequency mass areas as shown in FIG. 39 and FIG. 40, a preferred PMI can be obtained using the following method according to allocated resources.

PMIs preferred according to allocated frequency masses: A PMI preferred for area A and a PMI preferred for area B are obtained.

A PMI preferred for all allocated resources: One PMI to be applied in common to area A and area B is obtained.

Next, when D2D resources occupy consecutive resources in the frequency domain as shown in FIG. 41, a PMI preferred for all allocated resources may be obtained as a preferred PMI.

(d) PMI Report and No PMI Report

When a "PMI reporting" method is used, RI/PMI/CQI reporting is performed using a predetermined codebook.

When a transmitting UE uses two antenna ports, an estimated RI/PMI/CQI is reported using an existing LTE uplink 2 Tx codebook.

When a transmitting UE uses four antenna ports, an estimated RI/PMI/CQI is reported using an existing LTE uplink 4 Tx codebook.

When a "no PMI reporting" method is used, the following Tx process may be taken into consideration to calculate a CQI.

When a transmitting UE uses a single antenna port, a CQI is calculated on the assumption of single-antenna port Tx.

When a transmitting UE uses a plurality of antenna ports, a CQI is calculated on the assumption of precoding (e.g., precoding switching in units of slots).

17) Use of DM RS (a) DM RS Base Sequence and CS Hopping

For interference randomization and DM RS orthogonalization, a base sequence of a D2D-PUSCH DM RS and CS hopping (CSH) are allowed to be separately configured. To configure a PUSCH DM RS base sequence, a virtual cell ID $N_{ID}^{D2D-DMRS}$ is introduced. To configure PUSCH DM RS CSH, a parameter $C_{init}$ used for initializing generation of a hopping pattern is set. $N_{ID}^{D2D-DMRS}$ is a parameter used in sections 5.5.1.3 and 5.5.1.4 of LTE technical specification (TS) 36.211, and $C_{init}$ is a parameter used in section 5.5.2.1.1 of LTE TS 36.211.

For Tx and Rx of a DM RS, a UE should receive the above configuration information relating to DM RS Tx from a base station.

a) CSI Estimation Using DM RS

To estimate CSI on allocated D2D resources, a DM RS or an SRS may be used. Here, a method of estimating CSI on the basis of a DM RS will be described. A transmitting D2D UE transmits a DM RS in set resources, and a receiving-side UE receives the DM RS transmitted by the transmitting-side UE and estimates CSI.

A UE may multiplex and transmit a DM RS port using a CDM scheme. Each DM RS port is an RS corresponding to each Tx layer used for the UE to transmit data. A plurality of DM RS ports use the same base sequence and different CSs such that a receiving side can distinguish signals according to the DM RS ports.

To estimate CSI using a DM RS, the UE should know DM RS configuration information. A base station provides the following DM RS configuration information to the UE.

Subframes and RBs in which the DM RS is transmitted

Configuration information on a DM RS sequence: a virtual cell ID $N_{ID}^{D2D-DMRS}$ (determines a DM RS base sequence), a CSH initialization value $C_{init}$, the number of DM RS ports, and CSs of the respective DM RS ports.

The UE may perform channel estimation on each DM RS port, and estimate CSI for D2D communication using the channel estimation result. The estimated CSI is reported to a counterpart UE according to a feedback report configuration.

18) Resource Allocation Type and Tx Mode

Resource allocation of a D2D-PUSCH for D2D communication may be classified into three types.

Figure 42:
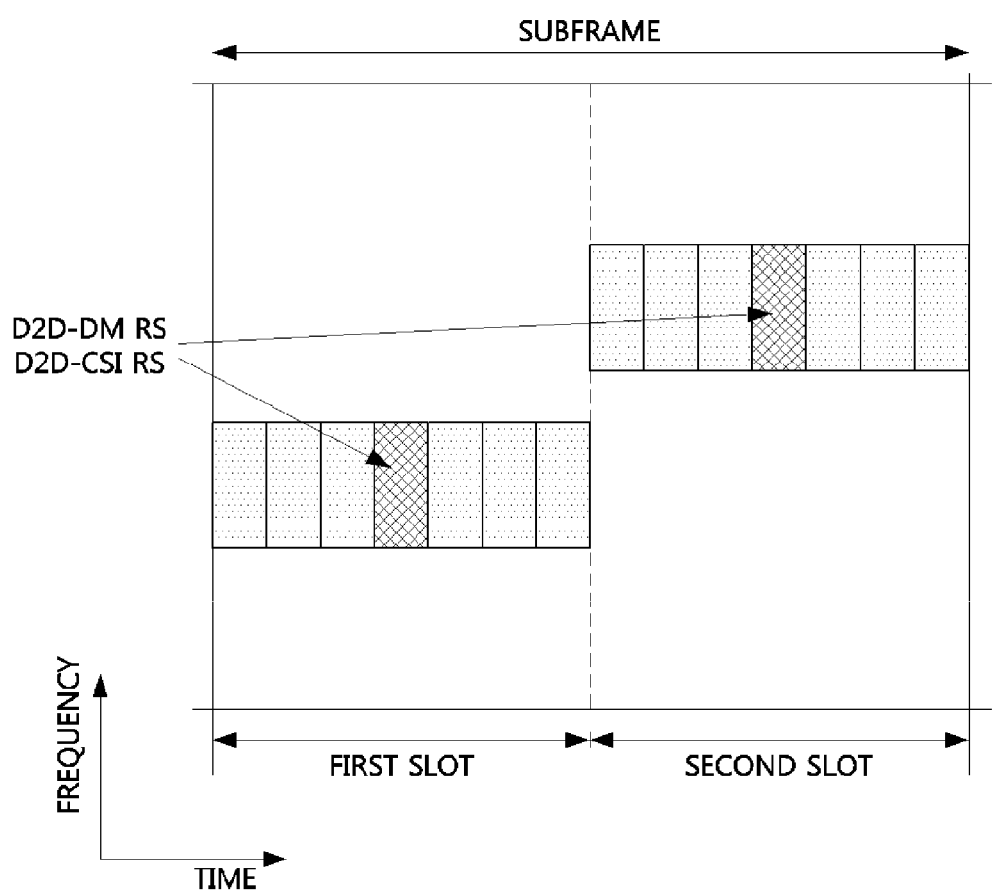
FIG. 42 to FIG. 44 are constitution diagrams of subframes illustrating examples of types of D2D-PUSCH resource allocation for D2D communication.
Figure 43:
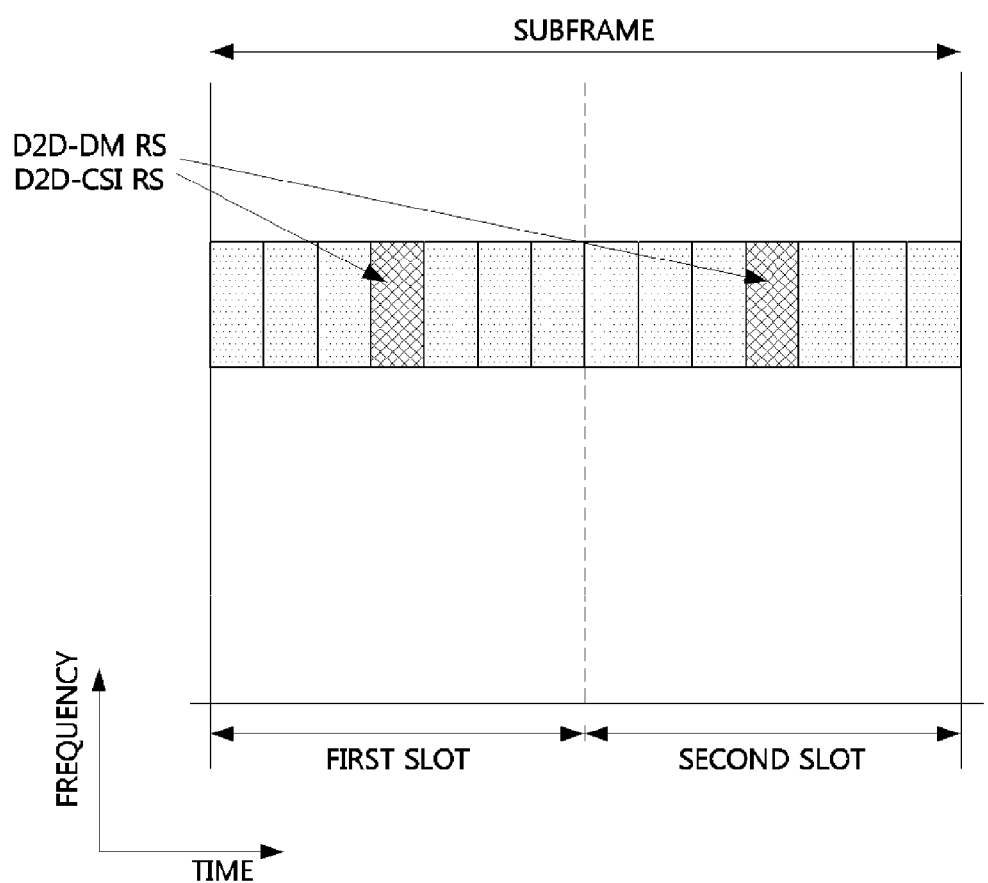
Figures 44, 45:
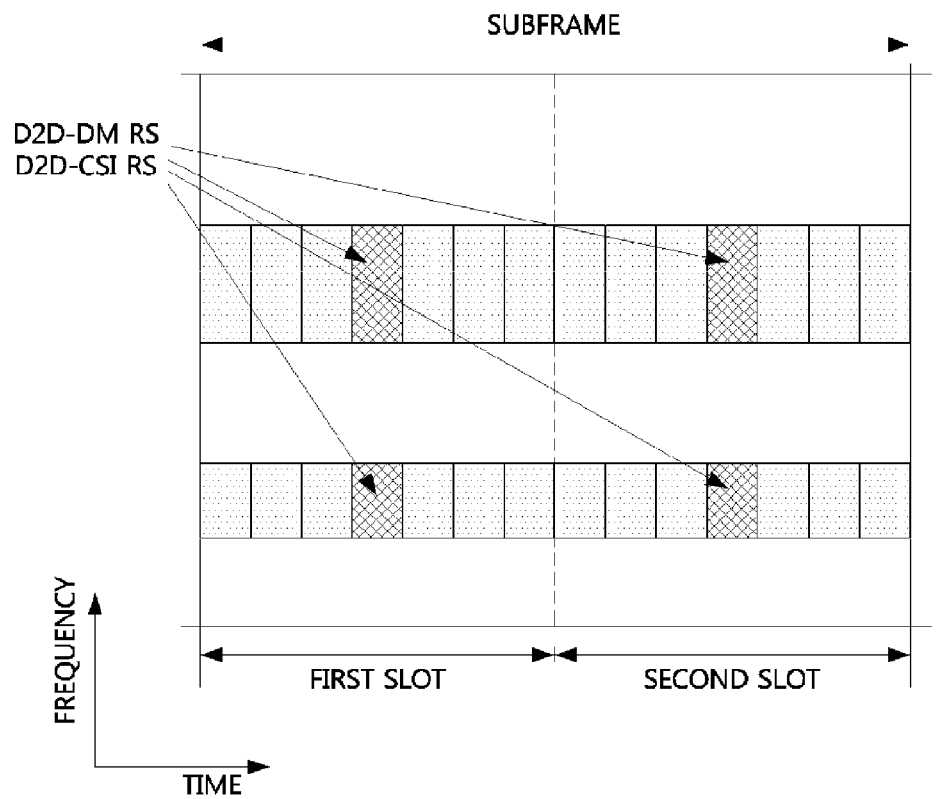
FIG. 45 is a table showing types of D2D-PUSCH resource allocation permitted according to the number of antenna ports used for Tx.

FIG. 42 to FIG. 44 are constitution diagrams of subframes illustrating examples of types of D2D-PUSCH resource allocation for D2D communication.

FIG. 42 shows an example of a consecutive allocation type in which there is frequency hopping in units of slots as resource allocation type A, FIG. 43 shows an example of a consecutive allocation type in which there is no frequency hopping in units of slots as resource allocation type B, and FIG. 44 shows an example of an inconsecutive allocation type in which there is no frequency hopping in units of slots as resource allocation type C.

FIG. 45 is a table showing types of D2D-PUSCH resource allocation permitted according to the number of antenna ports used for Tx.

(a) Single Antenna Transmission (SAT)

SAT denotes a method of transmitting data using one antenna port. A receiving UE demodulates data using a DM RS transmitted together with a D2D-PUSCH. The number of ports for the DM RS used in the data demodulation, that is, DM RS ports, is also one. The DM RS is transmitted in a fourth OFDM (SC-FDMA) symbol section of each slot. The DM RS port may also be used in D2D-CSI estimation.

(b) Multi-Antenna Transmission (MAT)

MAT denotes a method of transmitting data using a plurality of antenna ports. When the number of antenna ports is N, the number of Tx layers may be one of 1, 2, . . . , and N. A receiving UE demodulates data using a DM RS transmitted together with a D2D-PUSCH. As a port for Tx of the DM RS used in the data demodulation, one DM RS port is used per Tx layer, and the same precoding is applied to a Tx layer and the corresponding DM RS port. Thus, the number of DM RS ports should be the same as the number of Tx layers. A DM RS port may also be used in D2D-CSI estimation.

The DM RS is transmitted in a fourth OFDM (SC-FDMA) symbol section of each slot.

19) Resource Allocation of DM RS Port

FIG. 46 is a table showing the number of DM-RS ports necessary for demodulation of a D2D-PUSCH according to a Tx mode set in a UE.

As exemplified in FIG. 42 to FIG. 44, a DM RS is transmitted in a fourth OFDM (SC-FDMA) symbol section of each slot. A DM RS sequence is determined by a base sequence and a CS. To distinguish a plurality of DM RS ports transmitted in the same symbol section from each other, sequences used by the DM RS ports should differ from each other. The DM RS ports can be distinguished using the same base sequence and different CSs, or using different CSs and OCCs.

In each slot, as many DM RE ports as the number of Tx layers should be transmitted. Thus, in a two-antenna port Tx mode, one or two DM RS ports, that is, as many DM RS ports as the number of Tx layers, should be mapped to each slot. In a four-antenna port Tx mode, one to four DM RS ports should be mapped to each slot. At this time, it is preferable to maximize a CS interval between DM RS ports to maintain orthogonality.

Using an OCC together with a CS, it is possible to improve orthogonality between RS ports. Even when DM RS ports are distinguished through CS and OCC assignment, it is preferable to maximize a CS interval between DM RS ports to maintain orthogonality.

In the LTE standard, a PUSCH DM RS sequence is given by Equation 18 below. In D2D communication, an RS sequence is similarly generated as described below.

$$r_{u,v}^{(\alpha)}(n) = e^{j\alpha n}\bar{r}_{u,v}(n), \quad 0 \leq n < M_{sc}^{RS}$$ [Equation 18]

Here, $M_{sc}^{RS}$ is a length of the RS sequence, which is equal to the number of subcarriers to which a D2D-PUSCH is assigned. α is a CS value, u is a base sequence group number, and v is a base sequence number.

Since a minimum resource allocation unit is one RB, and one RB occupies 12 subcarriers, there are 12 values of α orthogonal to each other. When a CS of a DM RS port for a Tx layer λ is denoted by $\alpha_\lambda$, $\alpha_\lambda$ may be presented as Equation 19 below.

$$\alpha_\lambda = 2\pi n_{cs,\lambda}/12$$ [Equation 19]

Here, $n_{cs,\lambda} = (n_{DMRS}^{(1)} + n_{DMRS,\lambda}^{(2)} + n_{PN}(n_s)) \bmod 12$, $n_{DMRS}^{(1)}$ is a constant applied in common to DM RS ports corresponding to respective Tx layers and is given by an upper layer (RRC), and $n_{DMRS,\lambda}^{(2)}$ is a value assigned according to the Tx layer λ. As $n_{DMRS,\lambda}^{(2)}$, one of 0, 1, . . . , and 11 is selected and used.

FIG. 47 is a table showing an example of an OCC sequence applied to a DM-RS.

When an OCC sequence corresponding to OCC index i is denoted by $[W_0^i, W_1^i]$, a DM RS sequence $D^0(0)$, $D^0(1)$, . . . , $D^0(M_{sc}^{RS}-1)$ inserted into a first slot is obtained by multiplying the first elements of the OCC sequence and the RS sequence as shown in Equation 20 below.

$$D^0(n) = r_{u,v}^{(\alpha)}(n)W_0^i \quad 0 \leq n < M_{sc}^{RS}$$ [Equation 20]

A DM RS sequence $D^1(0)$, $D^1(1)$, . . . , $D^1(M_{sc}^{RS}-1)$ inserted into a second slot is obtained by multiplying the second element of the OCC sequence and the RS sequence as shown in Equation 21 below.

$$D^1(n) = r_{u,v}^{(\alpha')}(n)W_1^i \quad 0 \leq n < M_{sc}^{RS}$$ [Equation 21]

FIG. 48 to FIG. 50 are tables showing examples of preferable assignment of CSs and OCCs according to the number of Tx layers.

In each table, a row and a column corresponding to the position of a DM RS port number denote a value of $n_{DMRS,\lambda}^{(2)}$ and an OCC used by the corresponding DM RS port. For example, in the table of FIG. 48, DM RS port 0 denotes that CS-0 is used as $n_{DMRS,\lambda}^{(2)}$, and [1,1] is used as an OCC.

To maintain as much orthogonality between DM RS ports as possible, it is preferable to assign $n_{DMRS,\lambda}^{(2)}$ and cause an $n_{DMRS,\lambda}^{(2)}$ interval to be 12/N. More specifically, preferable $n_{DMRS,\lambda}^{(2)}$ assignment is as follows.

In the table of FIG. 48, it is preferable for an $n_{DMRS,\lambda}^{(2)}$ interval of DM RS ports 0 and 1 to be 6, and thus when CS-0 is given, CS-1 may be set to (CS-0+6) mod 12.

In the table of FIG. 49, it is preferable for an $n_{DMRS,\lambda}^{(2)}$ interval of DM RS ports 0, 1, and 2 to be 4, and thus when CS-0 is given, CS-1 and CS-2 may be set to (CS-0+4) mod 12 and (CS-1+4) mod 12, respectively.

In the table of FIG. 50, it is preferable for an $n_{DMRS,\lambda}^{(2)}$ interval of DM RS ports 0, 1, 2, and 3 to be 3, and thus when CS-0 is given, CS-1, CS-2, and CS-3 may be set to (CS-0+3) mod 12, (CS-1+3) mod 12, and (CS-2+3) mod 12, respectively.

20) Resource Allocation of CSI RS Port

An additional RS necessary for D2D-CSI estimation may be transmitted within a D2D-PUSCH resource range in an OFDM (SC-FDMA) symbol section in which a DM RS is transmitted.

FIG. 51 is a table showing the number of D2D-CSI RS ports necessary according to a Tx mode.

A DM RS port used in single-antenna port Tx can also be used in D2D-CSI estimation, and thus no D2D-CSI RS port needs to be transmitted. In other words, the DM RS port can serve as a D2D-CSI RS port.

Since one RB corresponds to the minimum resource allocation unit, a total number of CSs that can be used by an RS is at least 12. When an OCC is additionally used as needed, there are a total number of 24 resources.

FIG. 52 is a table showing a total number of RS ports (DM-RS+CSI-RS) necessary according to a Tx mode and the number of Tx layers.

The following should be taken into consideration:
For data demodulation, one DM RS port should be transmitted per Tx layer.
All DM RS ports for demodulation should be transmitted in a first slot and a second slot of a subframe.
One CSI RS port for D2D-CSI estimation should be transmitted per transmitting antenna.
A CSI RS port for D2D-CSI estimation may be transmitted in only one slot.

In the case of single-antenna port Tx, for the purpose of CS allocation of a DM RS port, one of 12 CSs may be determined and used, and the DM RS port may be used as a CSI RS port.

In the case of multi-antenna port Tx, when a DM RS port and a CSI RS port are multiplexed in the same OFDM (SC-FDMA) symbol, there may be problems such as an increase in a PAPR and a reduction in power per RS. When a UE is not in a power-limited state, it is possible to multiplex a DM RS port and a CSI RS port in the same OFDM (SC-1-DMA) symbol. However, it is preferable for a UE in the power-limited state to use an SRS port as a CSI RS port.

A method of performing CDM on an DM RS port and a CSI RS port in the same OFDM (SC-FDMA) symbol section will be described below.

For CSI RS ports, the following should be taken into consideration:
The CSI RS ports should be equally distributed to a first slot and a second slot.
In the case of two-antenna port Tx, one CSI RS port is mapped to each slot.
In the case of four-antenna port Tx, two CSI RS ports are mapped to each slot.
While an OCC can be applied to a DM RS port, an OCC cannot be applied to one CSI RS port when the CSI RS port is transmitted in one slot.

A CS $\alpha_i^{CSI}$ of a CSI RS port may be presented as shown in Equation 22 below.

$$\alpha_i^{CSI} = 2\pi n_{cs,i}^{CSI}/12$$ [Equation 22]

Here, $n_{cs,i}^{CSI} = (n_{DMRS}^{(1)} + n_{CSIRS,i} + n_{PN}(n_s)) \bmod 12$.

For a DM RS port and a CSI RS port, the same value should be used as each of $n_{DMRS}^{(1)}$ and $n_{PN}(n_s)$, such that orthogonality can be maintained between the different RS ports. As a CS value parameter $n_{CSIRS,i}$ of CSI RS port i corresponding to antenna port i, one of 0, 1, . . . , and 11 is selected and used.

In consideration of this, resource mapping of CSI RS ports can be performed as described below.

FIG. 53 is a table showing resource mapping of CSI-RS ports.

In the table of FIG. 53, a first column shows values of $n_{CSIRS,i}$, and a first row shows in which CSI RS ports are transmitted. For example, CSI RS port 1 uses CS-a as a value of $n_{CSIRS, i}$ in a second slot.

As mentioned above, in the case of DM RS ports, values of $n_{DMRS, \lambda}^{(2)}$ of DM RS ports corresponding to respective assigned Tx layers are denoted by CS-0, CS-1, CS-2, and CS-3. Here, values of $n_{CSIRS, i}$ of CSI RS ports corresponding to respective antenna ports i are denoted by CS-a and CS-b. To maximize orthogonality between RS ports, CS allocation as described below is preferable.

In the case of Tx of one layer using two antenna ports, CS-0 and CS-a are allocated to have an interval of 6, and in the case of Tx of two layers using two antenna ports, CS-0, CS-1, and CS-a are allocated to have an interval of 4.

In the case of Tx of one layer using four antenna ports, CS-0, CS-a, and CS-b are allocated to have an interval of 4, and in the case of Tx of two layers using four antenna ports, CS-0, CS-1, CS-a, and CS-b are allocated to have an interval of 3. In the case of Tx of three layers using four antenna ports, CS-0, CS-1, CS-2, CS-a, and CS-b are allocated to have an interval of 2 or 3, and in the case of Tx of four layers using four antenna ports, CS-0, CS-1, CS-2, CS-3, CS-a, and CS-b are allocated to have an interval of 2.

The following description concerns a method of performing FDM on a DM RS port and a CSI RS port in the same OFDM (SC-FDMA) symbol section.

DM RS ports are transmitted on even-numbered subcarriers, and CSI RS ports are transmitted on odd-numbered subcarriers, such that used resources do not overlap each other. Thus, a length $M_{sc}^{RS}$ of an RS sequence corresponds to half the number of subcarriers to which a D2D PUSCH is assigned.

FIG. 54 is a table showing slot assignment of CSI-RS ports.

For maintenance of orthogonality, it is preferable to maximize an assigned CS interval between CSI RS ports transmitted together in the same slot.

A CS $\alpha_p^{(s)}$ of CSI RS port p transmitted in slot s (s=0 indicates a first slot, and s=1 indicates a second slot) may use Equation 23 below.

$$\alpha_p^{(s)} = 2\pi \frac{n_{CSIPS}^{(s),p}}{M} \qquad \text{[Equation 23]}$$

$$\text{Here, } n_{CSIRS}^{(s),p} = \left(n_{CSIRS}^{(s)} + \frac{M \cdot \lfloor \frac{p}{2} \rfloor}{N_{CSIRS}}\right) \bmod M,$$

$N_{CSIRS}$ is the number of CSI RS ports, $p \in \{0, 1, \ldots, N_{CSIRS}-1\}$, and $n_{CSIRS}^{(s)}$ is a constant applied in common to CSI RS ports transmitted in the same slot and may be set to 0 or another value. M is the number of available CS values.

In two-antenna port Tx, one CSI port is transmitted in one slot, and thus $n_{CSIRS}^{(0),0}$ of CSI RS port 0 of the first slot corresponding to antenna port 0 is given by Equation 24 below.

$$n_{CSIRS}^{(0),0} = n_{CSIRS}^{(0)} \bmod M \qquad \text{[Equation 24]}$$

$n_{CSIRS}^{(1),1}$ of CSI RS port 1 of the second slot corresponding to antenna port 1 is given by Equation 25 below.

$$n_{CSIRS}^{(1),1} = n_{CSIRS}^{(1)} \bmod M \qquad \text{[Equation 25]}$$

In four-antenna port Tx, two CSI ports are transmitted in one slot, and thus $n_{CSIRS}^{(0),0}$ and $n_{CSIRS}^{(0),2}$ of CSI RS ports 0 and 2 of the first slot corresponding to antenna ports 0 and 2 are given by Equation 26 below.

$$n_{CSIRS}^{(0),0} = n_{CSIRS}^{(0)} \bmod M \qquad \text{[Equation 26]}$$

$$n_{CSIRS}^{(0),2} = \left(n_{CSIRS}^{(0)} + \frac{M}{2}\right) \bmod M$$

$n_{CSIRS}^{(1),1}$ and $n_{CSIRS}^{(1),3}$ of CSI RS ports 1 and 3 of the second slot corresponding to antenna ports 1 and 3 are given by Equation 27 below.

$$n_{CSIRS}^{(1),1} = n_{CSIRS}^{(1)} \bmod M \qquad \text{[Equation 27]}$$

$$n_{CSIRS}^{(1),3} = \left(n_{CSIRS}^{(1)} + \frac{M}{2}\right) \bmod M$$

In other words, regardless of a value of M, an interval between values of $\alpha_p^{(s)}$ of two CSI RS ports transmitted in the same slot becomes $\pi$.

The following description concerns a method of multiplexing only CSI RS ports in a specific OFDM (SC-FDMA) symbol section when a DM RS port and a CSI RS port are not transmitted in the same OFDM (SC-FDMA) symbol section.

A length $M_{sc}^{RS}$ of a CSI RS sequence corresponds to the number of subcarriers to which a D2D-PUSCH is assigned, and a CSI RS is transmitted in a frequency region occupied by the D2D-PUSCH.

For maintenance of orthogonality, it is preferable to maximize an assigned CS interval between CSI RS ports transmitted together in the same symbol section.

A CS $\alpha_p$ of CSI RS port p may be determined according to Equation 28 below.

$$\alpha_p = 2\pi \frac{n_{CSIPS}^p}{M} \qquad \text{[Equation 28]}$$

$$\text{Here, } n_{CSIRS}^p = \left(n_{CSIRS} + \frac{M \cdot p}{N_{CSIRS}}\right) \bmod M,$$

$N_{CSIRS}$ is the number of CSI RS ports, $p \in \{0, 1, \ldots, N_{CSIRS}-1\}$, and $n_{CSIRS}$ is a constant applied in common to CSI RS ports transmitted in the same slot section and may be set to 0 or another value. M is the number of available CS values.

In two port Tx, two CSI ports are transmitted. $n_{CSIRS}^0$ of CSI RS port 0 corresponding to antenna port 0 is given by Equation 29 below.

$$n_{CSIRS}^0 = n_{CSIRS} \bmod M \qquad \text{[Equation 29]}$$

$n_{CSIRS}^{(1),1}$ of CSI RS port 1 corresponding to antenna port 1 is given by q 30 below.

$$n_{CSIRS}^1 = \left(n_{CSIRS} + \frac{M}{2}\right) \bmod M \qquad \text{[Equation 30]}$$

In four-antenna port Tx, four CSI ports are transmitted. $n_{CSIRS}^0$, $n_{CSIRS}^1$, $n_{CSIRS}^2$, and $n_{CSIRS}^3$ of CSI RS ports 0, 1, 2, and 3 corresponding to antenna ports 0, 1, 2, and 3 are given by Equation 31 below.

$$n_{CSIRS}^0 = n_{CSIRS} \bmod M \qquad \text{[Equation 31]}$$

-continued
$$n_{CSIRS}^1 = \left(n_{CSIRS} + \frac{M}{4}\right) \bmod M$$
$$n_{CSIRS}^2 = \left(n_{CSIRS} + \frac{M}{2}\right) \bmod M$$
$$n_{CSIRS}^3 = \left(n_{CSIRS} + \frac{3M}{4}\right) \bmod M$$

In other words, regardless of a value of M, an interval between values of $\alpha_p$ of four CSI RS ports transmitted in the same symbol section becomes $$\frac{\pi}{2}.$$

21) CSI Report (a) Problem of Handling Collision Between CSI Reports

D2D CSI reporting and cellular CSI reporting to a base station may occur in the same subframe. A method of setting priority and selecting and making only one report when a collision occurs is used. For example, priority may be given to the cellular CSI report, and when a collision occurs, the D2D CSI report may be dropped, and only the cellular CSI report may be transmitted.

(b) CSI Report on Wideband Resources for D2D Communication

A CSI report on wideband resources for D2D communication is transmitted using cellular resources. The CSI report has a similar configuration to an existing LTE CSI report.

(c) CSI Report on Allocated D2D Resources

In the case of one-way D2D communication, CSI reporting resources are positioned in a D2D HARQ ACK Tx subframe if possible, and a reporting period is in accordance with a setting.

ACK/NACK
CSI+ACK/NACK
CSI

In the case of two-way D2D communication, CSI reporting resources are positioned in D2D data Tx resources if possible, and a reporting period is in accordance with a setting.

When there is data
(Data+Grant)
(Data+Grant)+ACK/NACK
(Data+Grant)+CSI
(Data+Grant)+CSI+ACK/NACK
When there is no data
ACK/NACK
CSI+ACK/NACK
CSI Tx Format of Base Station Tx Control Channel 1) Link Identification Using Only DCI Format The following description concerns a method of achieving link identification when CRC is scrambled with a cell (C)-RNTI instead of an additional RNTI (D2D-RNTI) for a PDCCH (or EPDCCH; a PDCCH mentioned below can be replaced by an EPDDCH) used for D2D-PUSCH scheduling.

An additional DCI format may be provided for control information signaling between a base station and D2D transmitting and receiving UEs, but in this case, the number of blind decoding times of a UE may increase. Thus, not to increase the number of blind decoding times, it is preferable to use a DCI format of the same size regardless of a link.

Since D2D communication occurs in an uplink subframe, an uplink DCI format is used to deliver control information for the D2D communication. DCI formats for an uplink grant defined in 3$^{rd}$ Generation Partnership Project (3GPP) LTE/LTE-Advanced standards include DCI format 0 and DCI format 4.

For each of DCI format 0 and DCI format 4, the following configuration is used.

When a DCI format of the same size is used regardless of a link, and a UE performs communication through a cellular link and at least one D2D link, the UE should be able to identify a link targeted by a PDCCH. To this end, a link indicator field (LIF) is provided in DCI. A base station signals configuration information on a link corresponding to each LIF value to the UE in advance using RRC signaling. Also, the base station notifies the UE of what kind of link a grant or assignment is for using a LIF value in the DCI.

FIG. 55 and FIG. 56 are tables showing meanings of values of a LIF.

FIG. 55 shows examples of a case in which Tx and Rx are performed by one

UE, and FIG. 56 shows examples of a case in which Tx and Rx are performed by several UEs.

In the case of a UE for which cross-carrier scheduling is set, a LIF indicates a link in a carrier indicated by a carrier indicator field (CIF). In other words, the LIF serves to notify the UE of whether a link is a cellular link or a D2D link, and what kind of D2D link a D2D link is (including whether Tx or Rx is performed) when the link is the D2D link.

In the case of a UE for which cross-carrier scheduling is not set, a LIF indicates a link belonging to the corresponding uplink carrier indicated in system information block 1 (SIB-1) in a downlink carrier in which a PDCCH is transmitted.

When a base station transmits DCI, a CRC of DCI transmitted to UE A is scrambled with a C-RNTI of UE A, and a CRC of DCI transmitted to UE B is scrambled with a C-RNTI of UE B.

Each UE checks a link targeted by the DCI from a carrier in which a PDCCH is transmitted and a LIF or a CIF and a LIF.

2) Link Identification Using DCI Format and D2D-RNTI

The following description concerns a method of achieving link identification using a PDCCH (or EPDCCH; a PDCCH mentioned below can be replaced by an EPDDCH) whose CRC is scrambled with an additional RNTI (D2D-RNTI) for D2D-PUSCH scheduling.

A CRC of a PDCCH that transmits control information for D2D-PUSCH Tx or D2D-PUSCH Rx scheduling is scrambled with a D2D-RNTI.

FIG. 57 is a table showing PDCCH formats and D2D-PUSCH Tx methods set according to D2D-RNTIs.

FIG. 57 shows DCI formats transmitted through a PDCCH that is CRC-scrambled with a D2D-RNTI, Tx methods used for a D2D-PUSCH that is scheduled according to DCI, and search spaces of the PDCCH.

A D2D-RNTI is included in D2D link configuration information and delivered to a D2D UE by a base station. In other words, respective D2D UEs receive UE-specific D2D-RNTIs from the base station. When transmitting a PDCCH, the base station scrambles a CRC of the PDCCH with a D2D-RNTI assigned to a UE to which the PDCCH is delivered.

Since a CRC of a PDCCH is scrambled with a C-RNTI for cellular communication and a D2D-RNTI for D2D communication, a UE can identify whether a PDCCH is for cellular communication or D2D communication through CRC detection.

Here, it should be noted that, to not increase the number of times of blind detection of a PDCCH, format 0 and format 4 used for scheduling a cellular uplink should have the same sizes as format 0 and format 4 used for scheduling a D2D link.

In each DCI format for D2D communication, a control field of one-bit size for distinguishing between Tx and Rx is provided in the DCI format to distinguish between PUSCH-Tx and PUSCH-Rx.

In the case of DCI format 0, when a CRC is scrambled with a D2D-RNTI, the one-bit control field is used for distinguishing between PUSCH-Tx and PUSCH-Rx.

In the case of DCI format 4, when a CRC is scrambled with a D2D-RNTI, the one-bit control field is used for distinguishing between PUSCH-Tx and PUSCH-Rx.

Each of two UEs performing D2D communication may perform bit-level scrambling with D2D-RNTIs assigned to the UE while generating a D2D-PUSCH and a D2D-PUCCH transmitted by the UE itself. In this case, a D2D UE should receive a D2D-RNTI used by the counterpart UE from a base station to demodulate a D2D-PUSCH and a D2D-PUCCH transmitted by the counterpart UE. Since the two D2D UEs may belong to different cells and use different cell IDs, a D2D UE should additionally know a cell ID or a virtual cell ID that is used for bit-level scrambling by the counterpart UE. To this end, cell ID or virtual cell ID information on the counterpart UE may be received from the base station.

Although it is possible to assign the same D2D-RNTI to the two D2D UEs, it is preferable to assign different D2D-RNTIs because it is impossible to determine which UE a PDCCH is intended for in a portion in which PDCCH search spaces of the two UEs overlap.

The description below concerns DCI formats that are used according to Tx modes and should be detected by each UE.

DCI detection for D2D-PUSCH Tx of a UE itself:
In a single-antenna port Tx mode, DCI format 0 is detected.
In a multi-antenna port Tx mode (spatial multiplexing mode), DCI formats 0 and 4 are detected.
It is assumed that a CRC of a PDCCH is scrambled with a D2D-RNTI assigned to the UE itself DCI detection for D2D-PUSCH Rx of a UE itself:
When a D2D-PUSCH Tx UE is set to the single-antenna port Tx mode, DCI format 0 is detected.
When a D2D-PUSCH Tx UE is set to the multi-antenna port Tx mode (spatial multiplexing mode), DCI format 0 is detected.
It is assumed that a CRC of a PDCCH is scrambled with a D2D-RNTI assigned to the UE itself.

Between the above-described two link identification methods, the link identification method using a DCI format and a D2D-RNTI together is preferable in consideration of an increase in overhead of a DCI format.

Procedure of Using D2D Link

1) D2D Link Configuration, Activation, Reactivation, and Deactivation Process

A process between a base station and a UE for D2D communication is divided into the three following processes:

(1) The base station delivers D2D link configuration information to the D2D UE through RRC signaling.

(2) The base station delivers scheduling or rescheduling information such as frequency domain resource allocation and an MCS to the UE through PDCCH signaling.

(3) The base station delivers information on scheduling release through PDCCH signaling to the UE.

A D2D UE receives D2D link configuration information through RRC signaling of a base station. Additional scheduling or rescheduling information on a D2D link is included in an activation or reactivation PDCCH and transmitted.

From the D2D link configuration information and the additional scheduling information, the D2D UE knows positions of resources, an MCS, a Tx method, etc., to be used for D2D communication.

A point in time at which D2D Tx and Rx are started by applying the scheduling information included in the activation/deactivation PDCCH is determined according to an activation/reactivation PDCCH Tx time point.

Release of already activated D2D scheduling is achieved through Tx of the deactivation PDCCH.

(a) D2D Link Configuration Information

D2D link configuration information is transmitted to each D2D UE through UE-specific RRC signaling by a base station. D2D link configuration information transmitted to each D2D UE includes necessary information among the following pieces of information according to characteristics of a D2D link.

D2D-RNTI: A D2D-RNTI is used for CRC scrambling of an activation/reactivation/deactivation PDCCH. A D2D-RNTI is used for bit-level scrambling of a D2D-PUSCH and a D2D-PUCCH. Different D2D-RNTIs may be set for respective UEs. In this case, each UE should receive a D2D-RNTI that is used by a counterpart UE to generate a D2D-PUSCH and a D2D-PUCCH from a base station.

Tx link virtual cell ID: This is a virtual cell ID used in a Tx link, and used to generate a D2D-PUSCH, a D2D-PUCCH, a D2D-PUSCH DM RS, and a D2D-PUCCH DM RS instead of a cell ID. A plurality of cell IDs may be set in advance by RRC signaling, and then a value in use may be indicated through a PDCCH.

Rx link virtual cell ID: This is a virtual cell ID used in an Rx link, and used to generate a D2D-PUSCH, a D2D-PUCCH, a D2D-PUSCH DM RS, and a D2D-PUCCH DM RS, instead of a cell ID. A plurality of cell IDs may be set in advance by RRC signaling, and then a value in use may be indicated through a PDCCH.

Tx link $C_{init}$: This is $C_{init}$ used in a Tx link, and used to initialize D2D-PUSCH DM RS and D2D-PUCCH DM RS CSH. A plurality of $C_{init}$ may be set in advance by RRC signaling, and then a value in use may be indicated through a PDCCH.

Rx link $C_{init}$: This is $C_{init}$ used in an Rx link, and used to initialize D2D-PUSCH DM RS and D2D-PUCCH DM RS CSH. A plurality of $C_{init}$ may be set in advance by RRC signaling, and then a value in use may be indicated through a PDCCH.

Parameters for power control of D2D-PUSCH Tx: Maximum permissible Tx power $P_{D2D,max}$, P_D2D_0_Nominal_PUSCH $P_{D2D\_O\_Nominal\_PUSCH}$, P_D2D_0_UE_PUSCH $P_{D2D\_O\_UE\_PUSCH}$, and P_D2D_0_PUCCH $P_{D2D\_O\_PUSCH}$ D2D-PUCCH Rx resource allocation information: D2D-grant information Rx resources (e.g., a resource allocation parameter of PUCCH format 3), D2D-HARQ ACK Rx resources (e.g., a resource allocation parameter of PUCCH format 1a/1b), D2D-SR Tx resources (e.g., a resource allocation parameter of PUCCH format 1), and D2D-CSI Rx configuration information (information on Rx resources (e.g., a resource allocation parameter of PUCCH format 2 or PUCCH format 3), and a period and offset of a D2D-CSI report subframe).

D2D-PUCCH Tx resource allocation information: D2D-grant information Tx resources (e.g., a resource allocation parameter of PUCCH format 2 or PUCCH format 3), D2D-HARQ ACK Tx resources (e.g., a resource allocation parameter of PUCCH format 1a/1b), D2D-SR Tx resources (e.g., a resource allocation parameter of PUCCH format 1), and D2D-CSI Tx configuration information (information on Tx resources (e.g., a resource allocation parameter of PUCCH format 2 or PUCCH format 3), and a period and offset of a D2D-CSI report subframe).

D2D-PUSCH Tx resource allocation information: In the case of SPS resource allocation, an initial Tx occurrence interval (in units of subframes). In the case of periodic resource allocation in units of HARQ processes, a subframe interval of D2D-PUSCH Tx resources (corresponding to a D2D-HARQ RTT), and D2D-HARQ ACK Rx time point k (an ACK/NACK of a D2D-PUSCH transmitted in subframe n is received in subframe n+k).

D2D-PUSCH Rx resource allocation information: In the case of SPS resource allocation, this is an interval between subframes in which initial Tx occurs. In the case of periodic resource allocation in units of HARQ processes, this is a subframe interval of D2D-PUSCH Rx resources (corresponding to a D2D-HARQ RTT), and D2D-HARQ ACK Tx time point k (an ACK/NACK of a D2D-PUSCH received in subframe n is transmitted in subframe n+k).

D2D-SRS Tx configuration information: This includes a subframe period and offset, a Tx position in the frequency domain, and a Tx power regarding type-1 D2D-SRS (D2D-SRS for path loss estimation), and a subframe period and offset, a Tx position in the frequency domain, and an offset $P_{D2D\_SRS\_OFFSET}$ $P_{D2D\_SRS\_OFFSET}$ (dB) between a type-2 D2D-SRS Tx power and a D2D-PUSCH Tx power regarding type-2 D2D-SRS (D2D-SRS for D2D-CSI estimation).

D2D-SRS Rx configuration information: This includes a subframe period and offset, an Rx position in the frequency domain, and a Tx power regarding type-1 D2D-SRS (D2D-SRS for path loss estimation), and a subframe period and offset, a Tx position in the frequency domain, and an offset $P_{D2D\_SRS\_OFFSET}$ $P_{D2D\_SRS\_OFFSET}$ (dB) between a type-2 D2D-SRS Tx power and a D2D-PUSCH Tx power regarding type-2 D2D-SRS (D2D-SRS for D2D-CSI estimation).

(b) Details of Virtual Cell ID and $C_{init}$

The following description concerns details of a case in which a virtual cell ID and $C_{init}$ are applied to a D2D-PUSCH DM-RS and a D2D-PUCCH DM-RS.

(D2D-PUSCH DM RS)

A virtual cell ID is used to configure a DM RS base sequence of a D2D-PUSCH, and $C_{init}$ is used to initialize generation of a D2D-PUSCH DM RS CSH pattern. In other words, a virtual cell ID is used instead of a cell ID in sections 5.5.1.3 and 5.5.1.4 of LTE TS 36.211, and $C_{init}$ corresponds to a parameter Cinit used in section 5.5.2.1.1 of LTE TS 36.211.

More specifically, in section 5.5.1.3 of TS 36.211, a sequence group number u in slot ns is determined according to a group hopping pattern $f_{gh}(n_s)$ and a sequence shift pattern $f_{ss}$ as Equation 32 below.

$$u=(f_{gh}(n_s)+f_{ss}) \bmod 30 \quad \text{[Equation 32]}$$

Here, when group hopping is used, the group hopping pattern $f_{gh}(n_s)$ for a D2D-PUSCH DM RS is given by a pseudo-random sequence c(i), and at this time, an equation below is used to initialize a pseudo-random sequence generator. In other words, using a virtual cell ID $N_{ID}^{PUSCH\ DM\ RS}$ instead of an existing physical layer cell ID, initialization is performed using Equation 33 below at the beginning of each radio frame.

$$c_{init} = \left\lfloor \frac{N_{ID}^{PUSCHDMRS}}{30} \right\rfloor \quad \text{[Equation 33]}$$

A D2D-PUSCH DM RS sequence shift pattern $f_{ss}^{PUSCH}$ is given by Equation 34 below.

$$f_{ss}^{PUSCH}=N_{ID}^{PUSCH\ DM\ RS} \bmod 30 + \Delta_{ss}) \bmod 30 \quad \text{[Equation 34]}$$

In the above equation, a base station transmits values of $N_{ID}^{PUSCH\ DM\ RS}$ to a UE using UE-specific signaling.

During generation of a PUSCH DM RS sequence in section 5.5.2.1.1 of TS 36.211, a CS of the DM RS sequence is changed through cell-specific hopping with a change in a slot number. This CSH is determined by $n_{PN}(n_s)$, and defined according to a slot number $n_s$ using Equation 35 below.

$$n_{PN}(n_s)=\Sigma_{i=0}^{7} c(8N_{symb}^{UL} \cdot n_s+i) \cdot 2^i \quad \text{[Equation 35]}$$

In the existing LTE Release-10 standard, Equation 36 below is used to initialize the pseudo-random sequence c(i), and the value is determined according to each cell.

$$c_{init} = \left\lfloor \frac{N_{ID}^{cell}}{30} \right\rfloor \cdot 2^5 + f_{ss}^{PUSCH} \quad \text{[Equation 36]}$$

Here, values of $c_{init}$ are signaled to UEs, respectively.

(D2D-PUCCH DM RS)

A virtual cell ID $N_{ID}^{PUCCH}$ for a D2D-PUCCH is used to generate a D2D-PUCCH DM RS base sequence and a CSH pattern. Here, it should be noted that the virtual cell ID $N_{ID}^{PUCCH}$ for a D2D-PUCCH and a virtual cell ID $N_{ID}^{PUCCH\ DM\ RS}$ for a D2D-PUSCH DM RS may be set differently from each other.

2) D2D Link Activation (Scheduling)

FIG. 58 is a conceptual diagram illustrating a procedure for D2D link scheduling between a base station and a UE.

Using a PDCCH, a base station allocates D2D-PUSCH Tx resources and D2D-PUSCH Rx resources to D2D UEs.

When a D2D link activation PDCCH is detected in subframe n, a UE transmits an Rx ACK in subframe n+k to the base station. Like in dynamic ACK/NACK resource mapping according to the LTE standard, k=4 is preferable to use PUCCH format 1a/1b resources mapped by the lowest control channel element (CCE) index of the PDCCH as Tx resources of the Rx ACK.

The activation PDCCH includes all or some of the following pieces of information:

Information indicating whether grant information below is about D2D-PUSCH Tx resources or Rx resources Grant information: information on frequency domain D2D-PUSCH resource allocation, the number of Tx layers in the case of multi-antenna spatial multiplexing Tx, and precoding information on each Tx layer and codeword-specific MCS information in the case of multi-antenna spatial multiplexing Tx (necessary for a transmitting-side UE only).

When an activation PDCCH is detected in subframe n, it is possible to start D2D Tx or Rx beginning with subframe (n+q+4) according to activation information. Here, q is 0 or a positive integer. In the case of SPS assignment, Tx and Rx of a first initial Tx occurs in subframe (n+q+4). Since Tx of an Rx ACK of the activation PDCCH and Tx and Rx of a D2D-PUSCH should not occur in the same subframe, q≠0 is preferable.

When a transmitting UE takes a time necessary for data Tx preparation into consideration, and the base station does not receive an Rx ACK of the activation PDCCH from the two UEs (when DTX occurs in at least one UE), q>2 is preferable in general, such that the base station transmits the activation PDCCH again.

For example, if q=4, when the activation PDCCH is detected in subframe n, it is possible to start D2D Tx or Rx beginning with subframe (n+8) according to activation information. In the case of SPS assignment, Tx and Rx of a first initial Tx occur in subframe (n+8).

A value of q may use a fixed value determined in a standard, may be included in D2D link configuration information and reported to the D2D UEs by RRC signaling, or may be included in an activation or reactivation PDCCH as control information and reported to the D2D UEs.

3) D2D Link Reactivation (Rescheduling)

Using a PDCCH, D2D-PUSCH Tx resources and D2D-PUSCH Rx resources are reallocated.

A UE receiving a reactivation PDCCH stops already assigned D2D Tx, and restarts D2D Tx according to reactivation PDCCH information.

When a D2D link reactivation PDCCH is detected in subframe n, a UE transmits an Rx ACK in subframe n+k to the base station. k=4 is preferable to use PUCCH format 1a/1b resources mapped by the lowest CCE index of the PDCCH as Tx resources of the Rx ACK.

Control information included in the reactivation PDCCH and a UE process for the reactivation PDCCH are the same as in the case of an activation PDCCH.

4) D2D Link Deactivation (Scheduling Release)

Using a PDCCH, the allocation of D2D-PUSCH Tx resources and D2D-PUSCH Rx resources is released.

When a D2D link deactivation PDCCH is detected in subframe n, a UE transmits an Rx ACK in subframe n+k to a base station.

In the deactivation PDCCH, information indicating whether the deactivation PDCCH is about D2D-PUSCH Tx resources or Rx resources is included.

When the deactivation PDCCH is detected in subframe n, the corresponding D2D-PUSCH resource allocation is released beginning with the next subframe, and D2D Tx and Rx using the corresponding D2D-PUSCH are terminated.

5) Various Link Adaptation Methods

As described above, D2D grant information exchanged for link adaptation includes the following:

The number of Tx layers
Codeword-specific NDIs
Codeword-specific RVs
Codeword-specific MCSs
A TPC command for a D2D-PUCCH In the case of single-antenna port Tx, the number of Tx layers is always one, and thus information on the number of Tx layers is necessary only for the case of multi-antenna port Tx. It is assumed that a mapping relationship between Tx layers and codewords has been determined in advance. In the case of non-adaptive Tx in which an MCS is fixed by a base station, the MCS is not transmitted. A TPC command for a D2D-PUCCH may not be transmitted according to a configuration.

According to the degree of link adaptation by a D2D UE, link adaptation methods are classified as described below.

(a) Non-Adaptive SPS

In non-adaptive SPS, D2D communication is performed on the basis of grant information that is set through an activation/reactivation PDCCH by a base station. Since the communication is performed according to an MCS determined by the base station, it is unnecessary to exchange D2D-grant information and D2D-CSI reports between UEs.

(b) Adaptive SPS

In adaptive SPS, a data transmitting UE performs link adaptation by transmitting a D2D-grant to a counterpart UE when needed. D2D-CSI reports are exchanged between UEs.

(c) Periodic Resource Allocation in Units of HARQ Processes and Non-Adaptive Retransmission In the case of periodic resource allocation in units of HARQ processes, an occurrence position of a HARQ initial Tx is determined according to a buffer status, and thus a data transmitting UE always transmits the HARQ initial Tx to a counterpart UE together with D2D-grant information. In the case of non-adaptive retransmission, D2D communication is performed on the basis of the D2D-grant information used in the initial Tx. Thus, in the case of retransmission, no D2D-grants are exchanged between the UEs. For link adaptation of the initial Tx, D2D-CSI reports are exchanged between the UEs.

(d) Periodic Resource Allocation in Units of HARQ Processes and Adaptive Retransmission In the case of periodic resource allocation in units of HARQ processes, an occurrence position of a HARQ initial Tx is determined according to a buffer status, and thus a data transmitting UE always transmits a HARQ initial Tx to a counterpart UE together with D2D-grant information. In the case of adaptive retransmission, the data transmitting UE performs link adaptation by transmitting a D2D-grant to the counterpart UE in case of need. D2D-CSI reports are exchanged between the UEs.

6) PHR of D2D Link

In order to check whether a D2D communication UE has sufficient extra power for D2D communication and perform link adaptation of D2D communication (resource allocation, power control, determination of an MCS, etc.), a base station needs to check power headroom. To this end, the base station receives a report on the power headroom from the UE.

The UE calculates the power headroom for a D2D link, and reports the power headroom to the base station. In subframe i of serving cell c, power headroom of the D2D link is calculated using Equations 37 below. In the case of type 1, the power headroom is calculated using a first of Equations 37, and in the case of type 2, the power headroom is calculated using a second of Equations 37.

$$PH_{D2D,c,type\ 1}(i) = \tilde{P}_{CMAX,c}(i) - \{P_{O\_D2D-PUSCH,c} + \alpha_{D2D,c} \cdot PL_{D2D,c} + f_{D2D,c}(i)\}$$

$$PH_{D2D,c,type\ 2}(i) = \tilde{P}_{CMAX,c}(i) - 10\log_{10}\left(10^{(P_{0,D2D-PUSCH,c} + \alpha_{D2D,c} \cdot PL_{D2D,c} + f_{D2D,c}(i))/10} + 10^{(P_{0,D2D-PUCCH} + PL_{D2D,c} + g_{D2D,c}(i))/10}\right)$$

[Equation 37]

In an initial state in which no TPC command for the D2D link is received from the base station, $f_{D2D,c}(i)=0$, and $g_{D2D,c}(i)=0$. When a TPC command for the D2D link is received from the base station, a value of $f_{D2D,c}(i)$ and a value of $g_{D2D,c}(i)$ determined by the TPC command are used.

A type 2 PHR is applied to a UE that is configured to be able to simultaneously transmit a D2D-PUSCH and a D2D-PUCCH in the same subframe. On the other hand, a type 1 PHR is applied to a UE that transmits a D2D-PUSCH regardless of whether or not the UE is configured to be able to simultaneously transmit a D2D-PUSCH and a D2D-PUCCH.

$\tilde{P}_{CMAX,c}(i)$ is a maximum Tx power set in subframe i of serving cell c by the UE.

$\alpha_{D2D,c}$ is a value set for the UE by the base station, and may be 1 or a positive value less than 1.

$P_{O\_D2D\text{-}PUSCH,\ c}$ is calculated as the sum of $P_{D2D\_0\_NOMINAL\_PUSCH}$ and $P_{D2D\_0\_UE\_PUSCH}$ set by the base station.

$P_{O\_D2D\text{-}PUSCH}$ is a value set for the UE by the base station.

$PL_{D2D,c}$ is path loss of the D2D link estimated by the D2D UE.

7) Configuration of D2D-CSI Report

A UE may be configured to perform CSI reporting on allocated D2D resources. CSI reporting on the D2D resources (simply referred to as D2D-CSI herein) is periodically performed. It is preferable for the D2D UE to transmit the D2D-CSI in a subframe in which data or control information is transmitted. In general, a subframe in which Tx of a D2D-CSI report occurs may be presented using a Tx interval and an offset presented in units of subframes.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A device-to-device (D2D) communication method as an operation method of a first user equipment (UE) performing D2D communication through a D2D link in which the first UE and a second UE participate, the D2D communication method comprising:
   detecting grant information in subframe n received from the second UE; and
   when grant information is detected, demodulating data included in subframe n on the basis of the detected grant information, and transmitting positive acknowledgement/negative acknowledgement (ACK/NACK) information on whether or not demodulation of the data has succeeded to the second UE in subframe n+k, and
   when no grant information is detected, data demodulation is attempted on the basis of existing grant information.

2. The D2D communication method of claim 1, wherein the grant information includes at least some of a number of transmission (Tx) layers of the D2D link, codeword-specific new data indicators (NDIs) of the D2D link, codeword-specific redundancy versions (RVs) of the D2D link, codeword-specific modulation and coding schemes (MCSs) of the D2D link, and a power control command.

3. The D2D communication method of claim 1, wherein the ACK information on whether or not demodulation of the data has succeeded also indicates success in detecting the grant information.

4. The D2D communication method of claim 1, further comprising transmitting additional ACK/NACK information on whether or not grant information has been detected to the second UE in subframe n+k.

5. The D2D communication method of claim 1, wherein the grant information is received through a separate control channel region different from a D2D data channel (D2D-physical uplink shared channel (PUSCH)) region of subframe n.

6. The D2D communication method of claim 1, wherein the grant information is included in a D2D data channel (D2D-physical uplink shared channel (PUSCH)) region of subframe n together with the data and received, and received through resources in the D2D-PUSCH region other than resources occupied by the data.

7. A device-to-device (D2D) communication method as an operation method of a first user equipment (UE) performing D2D communication through a D2D link in which the first UE and a second UE participate, the D2D communication method comprising:
   detecting grant information in subframe n received from the second UE; and
   when grant information is detected, demodulating data included in subframe n on the basis of the detected grant information, and transmitting positive acknowledgement/negative acknowledgement (ACK/NACK) information on whether or not demodulation of the data has succeeded to the second UE in subframe n+k,
   wherein the grant information is included in a D2D data channel (D2D-physical uplink shared channel (PUSCH)) region of subframe n together with the data and received, and received through resources in the D2D-PUSCH region other than resources occupied by the data, and
   wherein the grant information is received using the same number of transmission (Tx) layers and the same modulation and coding scheme (MCS) as the data in the D2D data channel (D2D-PUSCH) region of subframe n.

8. The D2D communication method of claim 1, further comprising, when detection of grant information fails, transmitting the ACK/NACK information on whether or not demodulation of the data has succeeded to the second UE in subframe n+k.

9. The D2D communication method of claim 1, further comprising, when detection of grant information fails, transmitting no ACK/NACK information on whether or not demodulation of the data has succeeded to the second UE.

* * * * *